US012760135B2

(12) United States Patent
Jessop et al.

(10) Patent No.: US 12,760,135 B2
(45) Date of Patent: Oct. 13, 2026

(54) FORMING A TREATED SWITCHABLE POLYMER AND USE THEREOF IN A FORWARD OSMOSIS SYSTEM

(71) Applicants: Queen's University at Kingston, Ontario (CA); Forward Water Technologies Inc., Ontario (CA)

(72) Inventors: Philip G. Jessop, Ontario (CA); Michael Cunningham, Ontario (CA); Pascale Champagne, Ontario (CA); Sarah Ellis, Ontario (CA); Ryan Dykeman, Ontario (CA); Charles Honeyman, Ontario (CA); Amy Holland, Ontario (CA); Tobias Robert, Braunschweig (DE); Bhanu Mudraboyina, Ontario (CA)

(73) Assignees: Queen's University at Kingston, Kingston (CA); Forward Water Technologies Corp., Sarnia (CA)

( * ) Notice: Subject to any disclaimer, the term of this patent is extended or adjusted under 35 U.S.C. 154(b) by 738 days.

(21) Appl. No.: 17/271,069

(22) PCT Filed: Aug. 23, 2019

(86) PCT No.: PCT/CA2019/051166
§ 371 (c)(1),
(2) Date: Feb. 24, 2021

(87) PCT Pub. No.: WO2020/037432
PCT Pub. Date: Feb. 27, 2020

(65) Prior Publication Data

US 2021/0323844 A1 Oct. 21, 2021

Related U.S. Application Data

(60) Provisional application No. 62/722,275, filed on Aug. 24, 2018.

(51) Int. Cl.
*C08F 226/04* (2006.01)
*C08F 26/02* (2006.01)
(Continued)

(52) U.S. Cl.
CPC ............ *C08F 226/04* (2013.01); *C08F 26/02* (2013.01); *C08F 26/04* (2013.01); *C08F 226/02* (2013.01);
(Continued)

(58) Field of Classification Search
CPC ......... A23L 2/085; A23L 2/74; B01D 61/002; B01D 61/005; B01D 69/02; C02F 1/445;
(Continued)

(56) References Cited

U.S. PATENT DOCUMENTS

| | | | | |
|---|---|---|---|---|
| 6,395,849 B1 * | 5/2002 | Kato | ........................ | C08F 26/02 526/310 |
| 2001/0007064 A1 * | 7/2001 | Mitchell | ................. | A61L 15/60 525/327.4 |

(Continued)

FOREIGN PATENT DOCUMENTS

| | | |
|---|---|---|
| EP | 2988853 A1 | 3/2016 |
| WO | 2011097727 A1 | 8/2011 |

(Continued)

OTHER PUBLICATIONS

Fukuda et al. (Polymer Journal, 2016, 48, 1065-1072). (Year: 2016).*

(Continued)

*Primary Examiner* — Clare M Perrin
(74) *Attorney, Agent, or Firm* — Angela Lyon; Kazim Agha

(57) ABSTRACT

A forward osmosis system is disclosed which use a polymer switchable between a neutral form and an ionized form. The switchable polymer has a higher osmotic pressure at the
(Continued)

ionized form than the neutral form, the ratio between the former and the latter is ≥2. There is also disclosed a method for treating the polymer such that the ratio is improved. Use of polymers for forward osmosis is also disclosed.

18 Claims, 8 Drawing Sheets

(51) Int. Cl.

| | |
|---|---|
| ***C08F 26/04*** | (2006.01) |
| ***C08F 226/02*** | (2006.01) |
| ***C08L 79/02*** | (2006.01) |
| *B01D 61/00* | (2006.01) |
| *C02F 1/44* | (2023.01) |
| *C02F 101/30* | (2006.01) |
| *C02F 103/08* | (2006.01) |
| *C02F 103/20* | (2006.01) |
| *C02F 103/26* | (2006.01) |
| *C02F 103/30* | (2006.01) |
| *C02F 103/32* | (2006.01) |
| *C02F 103/34* | (2006.01) |

(52) U.S. Cl.

CPC ............ *C08L 79/02* (2013.01); *B01D 61/005* (2013.01); *C02F 1/445* (2013.01); *C02F 2101/30* (2013.01); *C02F 2103/08* (2013.01); *C02F 2103/20* (2013.01); *C02F 2103/26* (2013.01); *C02F 2103/30* (2013.01); *C02F 2103/32* (2013.01); *C02F 2103/343* (2013.01)

(58) Field of Classification Search

CPC .............. C02F 2101/30; C02F 2103/08; C02F 2103/20; C02F 2103/26; C02F 2103/30; C02F 2103/32; C02F 2103/343; C08L 79/02; A23C 1/00; C13B 20/16

See application file for complete search history.

(56) References Cited

U.S. PATENT DOCUMENTS

| | | | | |
|---|---|---|---|---|
| 2013/0105377 A1* | 5/2013 | Jessop | C02F 1/68 | 422/243 |
| 2014/0076810 A1* | 3/2014 | Jessop | C08F 22/14 | 210/207 |
| 2014/0217026 A1 | 8/2014 | Han et al. | | |
| 2016/0074810 A1* | 3/2016 | Hu | C08F 120/34 | 526/307.3 |

FOREIGN PATENT DOCUMENTS

| | | | | |
|---|---|---|---|---|
| WO | 2012079175 A1 | 6/2012 | | |
| WO | 2014175833 A1 | 10/2014 | | |
| WO | 2017024376 A1 | 2/2017 | | |
| WO | WO-2017045114 A1 * | 3/2017 | B01D 61/005 | |

OTHER PUBLICATIONS

Drean et al. (Polymer Chemistry, 2016, 7, 69-78). (Year: 2016).*

Marhefka et al. (Biomacromolecules, 2006, 7, 1597-1603). (Year: 2006).*

Lei et al. (Langmuir, 2015, 31, 2196-2201). (Year: 2015).*

Johnson et al., "Osmotic's potential: An overview of draw solutes for forward osmosis", Elsevier, Desalination, 2018, vol. 434, pp. 100-120.

The extended European search report, Application No. PCT/CA2019051166, dated Apr. 26, 2022.

PCT International Report on Patentability and Written Opinion, Application No. PCT/CA2019/051166, dated Mar. 2, 2021.

Jenkins et al., "International Union of Pure and Applied Chemistry, Macromolecular Division Commission on Macromolecular Nomenclature*, Glossary of Basic Terms in Polymer Science", IUPAC Recommendations 1996, Pure and Applied Chemistry, vol. 68, No. 12, pp. 2287-2311.

Alshamrani et al., "A guide to the selection of switchable functional groups for CO2-switchable compounds", Phys. Chem. Chem. Phys., 2016, vol. 18, pp. 19276-19288.

Chung et al., "Forward osmosis processes: Yesterday, today and tomorrow", Elsevier, Desalination, 2012, vol. 287, pp. 78-81.

Altaee et al., "Comparison between Forward Osmosis-Reverse Osmosis and Reverse Osmosis processes for seawater desalination", Elsevier, Desalination, 2014, vol. 336, pp. 50-57.

Wilson et al., "Structure-function study of tertiary amines as switchable polarity solvents", Royal Society of Chemistry, 2014, vol. 4, pp. 11039-11049.

Wilson et al., "Deriving osmotic pressures of draw solutes used in osmotically driven membrane processes", Elsevier, Journal of Membrane Science, 2013, vol. 431, pp. 205-211.

Cai et al., "CO2 switchable dual responsive polymers as draw solutes for forward osmosis desalination", Chem Comm, 2013, vol. 49, 8377-8379.

Wetering et al., "A Mechanistic Study of the Hydrolytic Stability of Poly(2-(dimethylamino)ethyl methacrylate)", Macromolecules, 1998, vol. 31, pp. 8063-8068.

Vink, "Precision Measurements of Osmotic Pressure in Concentrated Polymer Solutions", European Polymer Journal, 1971, vol. 7, pp. 1411-1419.

Barbosa-Canovas, "Food Engineering", Encyclopedia of Life Support Systems, 2009, vol. 1, pp. 1-26.

Isaure et al., "Facile synthesis of branched water-soluble poly(dimethylacrylamide)s in conventional and parallel reactors using free radical polymerisation", Elsevier, Reactive & Functional Polymers, 2006, vol. 66, pp. 65-79.

Kharchenko et al., "Role of Architecture on the Conformation, Rheology, and Orientation Behavior of Linear, Star, and Hyperbranched Polymer Melts. 1. Synthesis and Molecular Characterization", Macromolecules, 2003, vol. 36, pp. 399-406.

Robert et al., "Nitrogen-containing polymers as potent ionogens for aqueous solutions of switchable ionic strength: application to separation of organic liquids and clay particles from water", Green Chemistry, 2012, vol. 14, pp. 3053-3062.

Tanaka et al., "Synthesis of Linear Poly(N-Methylethylenimine) and Related Polymers by Reductive N-Methylation", Journal of Polymer Science: Polymer Letters Edition, 1978, vol. 16, pp. 13-19.

Sanders et al., "A spectroscopic and conductivity comparison study of linear poly(N-methylethylenimine) with lithium triflate and sodium triflate", Pergamon, Electrochimica Acta, 2003, vol. 48, pp. 2247-2253.

Bloksma et al., "Thermoresponsive Poly(2-oxazine)s", Macromolecular Journals, 2012, vol. 33, pp. 92-96.

Papadopoulos et al., "Heterocycles from N-Ethoxycarbonylthioamides and Dinucleophilic Reagents. 3. Six- and Seven-Membered Rings with Two or Three Heteroatoms", J. Org. Chem., 1977, vol. 42, No. 14, pp. 2530-2532.

Lorson et al., "A Thermogelling Supramolecular Hydrogel with Sponge-Like Morphology as a Cytocompatible Bioink", American Chemical Society, BioMacromolecules, 2017, vol. 18, pp. 2161-2171.

Kobayashi et al., "Ring-Opening Polymerization of 5,6-Dihydro-4H-1,3-oxazin-6-ones, Six-Membered "Azlactones", to Poly(N-acyl-B-peptide)s", Macromolcules, 1990, vol. 23, pp. 2609-2612.

Tanaka et al., "High Molecular Weight Linear Poly(ethylenimine) and Poly(N-methylethylenimine)", Macromolecules, 1983, vol. 16, pp. 849-853.

Hu et al., "Linear poly(propylenimine)/lithium triflate as a polymer electrolyte system", Elsevier, Solid State Ionics, 2008, vol. 179, pp. 401-408.

Saegusa et al., "Isomerization Polymerization of 1,3-Oxazine. I. Polymerization of Unsubstituted 5,6-Dihydro-4H-1,3-oxazine Giving Poly(N-formyltrimethlenimine) and Its Alkaline Hydrolysis to Poly(trimethlenimine)" Macromolecules, 1973, vol. 6, No. 4, pp. 495-498.

(56) References Cited

OTHER PUBLICATIONS

Lambermont-Thijs et al., "Linear poly(alkyl ethylene imine) with varying side chain length: synthesis and physical properties", The Royal Society of Chemistry, Polymer Chemistry, 2010, vol. 1, pp. 747-754.
Mason et al., "Infrared spectroscopic and conductivity studies of poly(N-methylpropylenimine)/lithium triflate electrolytes", Elsevier, Solid State Ionics, 2010, vol. 180, pp. 1626-1632.
Yasukawa et al., "Effect of DS Concentration on the PRO Performance Using a 5-Inch Scale Cellulose Triacetate-Based Hollow Fiber Membrane Module", Membranes, 2018, vol. 8, No. 22, pp. 1-15.
Timofeeva et al., "Synthesis of High-Molecular Weight Polymers Based on N,N-Diallyl-N-Methylamine", Macromolecular Chemistry and Physics, 2002, vol. 203, pp. 2296-2304.
Matsumoto et al., "Evident Solvent Effect on Propagation Reactions during Radical Copolymerization of Maleimide and Alkene", Department of Applied Chemistry, 1997, pp. 1515-1525.
Caminade et al., "Dendrimers and hyperbranched polymers", Royal Society of Chemistry, Chemical Society Reviews, 2015, vol. 44, pp. 3870-3873.
Zhao et al., "A Dendrimer-Based Forward Osmosis Draw Solute for Seawater Desalination", Industrial & Engineering Chemistry Research, 2014, vol. 53, pp. 16170-16175.
Zhiryakova et al., "Water-Soluble Polyelectrolyte Complexes of Astramol Poly(propyleneimine) Dendrimers with Poly(methacrylate) Anion", The Journal of Physical Chemistry B, 2014, vol. 118, pp. 13760-13769.
Harris et al., "Osmotic Coefficient Data for the System Benzene-Benzoic Acid at 25 degree", The Journal of Physical Chemistry, 1967, vol. 71, No. 3, 483-486.
Cho et al., "Osmotically driven membrane processes: Exploring the potential of branched polyethyleneimine as draw solute using porous FO membranes with NF separation layers", Elsevier, Journal of Membrane Science, 2016, vol. 511, pp. 278-288.
Grattoni et al., "Fast Membrane Osmometer as Alternative to Freezing Point and Vapor Pressure Osmometry", Analytical Chemistry, 2008, vol. 80, No. 7, pp. 2617-2622.
Mercer, "The Development of CO2-Switchable Technologies for Separation of Organic Compounds", Thesis, Queen's University, Department of Chemistry, 2012, pp. 1-269.
Fukuda et al., "Solution properties of poly(N-methylethylene imine), a highly hydrophilic polycation", The Society of Polymer Science, Polymer Journal, 2016, vol. 48, pp. 1065-1072.
Vanderveen et al., "Characterizing the Effects of a "Switchable Water" Additive on the Aqueous Solubility of Small Molecules", ChemPhysChem, 2018, vol. 19, pp. 2093-2100.
Oss et al., "Interfacial Tension and the Osmotic Pressure of Solutions of Polar Polymers", Journal Macromolecular Science Chemistry, 1990, vol. A27, No. 5, pp. 563-580.
Jun et al., "The application of polyethyleneimine draw solution in a combined forward osmosis/nanofiltration system", Journal of Applied Polymer Science, 2015, vol. 42198, pp. 1-9.
Striolo et al., "Osmotic second virial coefficient for linear and star poly(ethylene oxide)", Elsevier, Polymer, 2001, vol. 42, pp. 4773-4775.
Lewis, "The Osmotic Pressure of Concentrated Solutions, and the Laws of the Perfect Solution.", Journal of American Chemistry, 1908, pp. 668-683.
Stone et al., "Switchable polarity solvents as draw solutes for forward osmosis", Elsevier, Desalination, 2013, vol. 312, pp. 124-129.
Kyba et al., "Host-Guest Complexation. 7. The Binaphthyl Structural Unit in Host Compounds1,2", The Journal of Organic Chemistry, 1977, vol. 42, No. 26, pp. 4173-4184.

* cited by examiner

FORMING A TREATED SWITCHABLE POLYMER AND USE THEREOF IN A FORWARD OSMOSIS SYSTEM

FIELD

The present disclosure relates generally to switchable polymers. More particularly, the present disclosure relates to process of forming a treated switchable polymer and use thereof in a forward osmosis system.

BACKGROUND

Currently, food, beverage and dairy industries need more affordable and less energy intensive technologies for concentrating food and/or juice products for transportation and storage. Traditional methods of concentration require heating a product or exposing it to UV light, which have been shown to have detrimental effects on the flavor and nutritional value of the food product. Furthermore, the use of ultrafiltration in purifying liquid food and dairy products can require applications of high hydraulic pressures which can cause membrane fouling. Similarly, oil extraction, fracking and mining industries are seeking water purification technologies that go beyond concentrating generated streams of 'process' and 'waste' water to having a capacity to produce high quality drinking water to cope with diminishing fresh water sources. One technology that is increasingly being explored to cope with these demands on an industrial scale is Forward Osmosis (FO). FO is an emerging water purification process with a potential to offer less membrane fouling, to be applicable to feed solutions having relatively higher osmotic pressures, and to be more cost-effective than other technologies [e.g., nanofiltration, distillation, pervaporation, or Reverse Osmosis (RO)], as it can require a lower energy input. This is largely because the driving force behind FO is an ability of a draw solution to generate an internal osmotic pressure ($\pi$), which causes water in a feed solution to diffuse naturally (without any applied pressure) across a membrane to the draw solution, forming a dilute draw solution. A feed solution may comprise impure water, waste water, or an aqueous solution comprising water and a variety of other components, while a draw solution comprises an aqueous solution of a draw solute.

Many FO draw solutes have been developed, ranging from simple inorganic salts to stimuli-responsive materials. Examples of such solutes include sodium chloride, magnesium sulphate, switchable amine salts (e.g., trimethylammonium bicarbonate), and ammonium bicarbonate. These solutes are considered effective because they can generate large osmotic pressures and significant water flux values, where water flux is defined as the rate at which water permeates the membrane during forward osmosis. There are drawbacks to these draw agents, however, including high volatility, low odor thresholds, high reverse salt flux, and/or a difficulty being removed from diluted draw solutions.

Certain switchable polymers, and their use as FO draw solutes and in FO systems for the concentration of aqueous liquids are described in WO 2012/079175.

There is still a need in the art for a FO draw solute that offers effective osmotic pressures and water flux rates, at least partially addresses some of the drawbacks experienced with other solutes, and minimizes risk of contamination from the draw.

This section is intended to introduce various aspects of the art, which may be associated with the present disclosure. This discussion is believed to assist in providing a framework to facilitate a better understanding of particular aspects of the present disclosure. Accordingly, it should be understood that this section should be read in this light, and not necessarily as admissions of prior art.

SUMMARY

In an aspect, the present disclosure provides a process of forming a treated switchable polymer, comprising:

providing a switchable polymer that is switchable between a first form and a second form, the switchable polymer comprising switchable moieties, each switchable moiety being switchable between a neutral form associated with the first form of the switchable polymer, and an ionized form associated with the second form of the switchable polymer, the switchable polymer (i) having ≥3 mmol switchable moieties per gram of switchable polymer, (ii) having a $pK_{aH}$ of about 7 to about 14, and (iii) being resistant to hydrolysis;

treating the switchable polymer to remove non-polymeric and/or oligomeric contaminants; and forming a treated switchable polymer that is switchable between a third form and a fourth form, the neutral form of each switchable moiety being associated with the third form of the treated switchable polymer, and the ionized form of each switchable moiety being associated with the fourth form of the treated switchable polymer, the third form of the treated switchable polymer having a first osmotic pressure in aqueous solution, and the fourth form of the treated switchable polymer having a second osmotic pressure in aqueous solution, the ratio of the second osmotic pressure divided by the first osmotic pressure being ≥2 the treated switchable polymer (iv) being substantially water soluble in the fourth form.

In an embodiment of the present disclosure, there is provided a process further comprising preparing the switchable polymer by a controlled polymerization method.

In another embodiment, there is provided a process wherein the treated switchable polymer has a number fraction of polymer below 1000 g/mol of ≤0.5, or ≤0.4, or ≤0.3, or ≤0.2, or ≤0.1; or, a number fraction of polymer below 3500 g/mol of ≤0.5, or ≤0.4, or ≤0.3, or ≤0.2, or ≤0.1.

In another embodiment, there is provided a process wherein treating the switchable polymer comprises dialysis, precipitation, vacuum treatment, ultra-filtration, reverse osmosis, washing with solvent, or any combination thereof.

In another embodiment, there is provided a process wherein the switchable polymer has ≥3 mmol, >5.5 mmol, about 3 mmol to about 24 mmol, about 3 mmol to about 23.3 mmol, about 3 mmol to about 18 mmol, or about 5.5 mmol to about 24 mmol, or about 5.5 mmol to about 23.3 mmol, or about 5.5 mmol to about 18 mmol of switchable moieties per gram of switchable polymer In another embodiment, there is provided a process wherein the switchable polymer has a $pK_{aH}$ of about 7.5 to about 14; or, about 8 to about 13; or, about 8 to about 12; or, about 7 to about 10.

In another embodiment, there is provided a process wherein the treated switchable polymer is substantially water soluble in the third form.

In another embodiment, there is provided a process wherein the switchable polymer is resistant to hydrolysis by comprising non-hydrolysable moieties. In an embodiment, a hydrolysable moiety includes acid chlorides carbonate esters, epoxides, or imines. In another embodiment, a hydrolysable moiety includes esters, amidines, or guanidines.

In another embodiment, there is provided a process wherein the switchable polymer is resistant to hydrolysis and does not comprise hydrolysable moieties. In an embodiment, a hydrolysable moiety includes acid chlorides carbonate esters, epoxides, or imines. In another embodiment, a hydrolysable moiety includes esters, amidines, or guanidines.

In another embodiment, there is provided a process wherein the third form of the treated switchable polymer has a viscosity in aqueous solution of about 1 cP to about 100 cP; or about 20 cp to about 100 cP. In another embodiment, there is provided a process wherein the fourth form of the treated switchable polymer has a viscosity in aqueous solution of about 1 cP to about 100 cP; or about 20 cP to about 100 cP.

In another embodiment, there is provided a process wherein the non-polymeric contaminants comprise a solvent, a catalyst, an initiator, a monomer, a salt, a side-product, an initiator residue, a crosslinker, a linking agent, or a combination thereof. In another embodiment, there is provided a process wherein the oligomeric contaminants comprise oligomers having a molecular weight of ≤10 000 g/mol; or, ≤3500 g/mol; or, ≤1000 g/mol.

In another embodiment, there is provided a process wherein the controlled polymerization method includes a controlled radical polymerization, a step-growth polymerization, or an anionic polymerization.

In another embodiment, there is provided a process wherein the switchable polymer switches to or is maintained in the second form when the switchable moieties are exposed to $CO_2$ at an amount sufficient to maintain the switchable moieties in the ionized form, and wherein the switchable polymer switches to or is maintained in the first form when $CO_2$ is removed or reduced to an amount insufficient to maintain the switchable moieties in the ionized form. In another embodiment, there is provided a process wherein the treated switchable polymer switches to or is maintained in the fourth form when the switchable moieties are exposed to $CO_2$ at an amount sufficient to maintain the switchable moieties in the ionized form, and wherein the treated switchable polymer switches to or is maintained in the third form when $CO_2$ is removed or reduced to an amount insufficient to maintain the switchable moieties in the ionized form. In another embodiment, the $CO_2$ is removed or reduced by exposing the fourth form of the treated switchable polymer to reduced pressures, heat, agitation, and/or an inert flushing gas.

In another embodiment, there is provided a process wherein the ratio of the second osmotic pressure divided by the first osmotic pressure is ≥2, ≥6; or, is ≥10; or, is about 15; or, is ≥15, or is ≥16.

In another embodiment, there is provided a process wherein the switchable polymer is poly(N-methyl-N,N-diallylamine), poly(N, N-dimethylallylamine) (PDMAAm), poly(N,N-dimethylvinylamine) (PDMVAm), linear-poly(N-methylethylenimine) (l-PMEI), branched-PMEI (b-PMEI), poly(N-methylpropenimine) (PMPI), poly(diallylmethylamine) (PDAMAm), poly(N-[3-(dimethylamino) propyl]-methacrylamide) (PDMAPMAm), reduced-poly(N,N-dimethylaminopropyl methacrylamide) (red-PDMAPMAm), poly(1,4-bis(dimethylamino)-2-butene) also known as poly (dimethylmethylamine) (PDMMA), poly(N,N-di(N',N'-dimethylbutylamine) allylamine), poly(N,N,N',N'-tetramethyl-1,2-ethylenediamine), poly(N-methylbutyleneimine) (PMBI), Poly(tert-butylaminoethylamino methacrylate) (P(tBAEMA)), Poly(N,N—(N',N'-dimethylaminopropyl) allylamine) (PDMAPAAm), Poly(N,N,N',N'-tetramethyl-2-butene-1,4-diamine) (PTMBD), poly(vinylamine), poly(N-methylvinylamine), poly(N-tertbutylallylamine)), poly(dimethylmethylamine) (PDMMA), N1,N1'-(butane-1,4-diyl)bis (N1-(3-(dimethylamino) propyl)-N3,N3-dimethylpropane-1,3-diamine) (DGEN1), N1,N1',N1",N1'"-((Butane-1,4-diylbis(azanetriyl))tetrakis(propane-3,1-diyl))tetrakis(N1-(3 (dimethylamino) propyl)-N3,N3-dimethylpropane-1,3-diamine) (DGEN2), poly(N—R-allylamine) wherein R is a bulky alkyl group, a polymer comprising bulky secondary or primary amines; or a branched polymer thereof; or a copolymer thereof.

In another aspect of the present disclosure, there is provided a process of forming a treated switchable polymer, comprising:

- providing a switchable polymer that is switchable between a first form and a second form,
- the switchable polymer comprising switchable moieties, each switchable moiety being switchable between a neutral form associated with the first form of the switchable polymer, and an ionized form associated with the second form of the switchable polymer,
- the switchable polymer
  - (i) having ≥5.5 mmol of switchable moieties per gram of switchable polymer,
  - (ii) having a $pK_{aH}$ of about 7 to about 10, and
  - (iii) being resistant to hydrolysis;
- treating the switchable polymer to remove non-polymeric and/or oligomeric contaminants; and
- forming a treated switchable polymer that is switchable between a third form and a fourth form,
- the neutral form of each switchable moiety being associated with the third form of the treated switchable polymer, and the ionized form of each switchable moiety being associated with the fourth form of the treated switchable polymer,
- the third form of the treated switchable polymer having a first osmotic pressure in aqueous solution, and the fourth form of the treated switchable polymer having a second osmotic pressure in aqueous solution, the ratio of the second osmotic pressure divided by the first osmotic pressure being ≥6,
- the treated switchable polymer
  - (iv) being substantially water soluble in the third form and fourth form, and
  - (v) having a number fraction of polymer below 1000 g/mol of ≤0.3 or a number fraction of polymer below 3500 g/mol of ≤0.3.

In an embodiment of the present disclosure, there is provided a process further comprising preparing the switchable polymer by a controlled polymerization method.

In another embodiment, there is provided a process wherein the treated switchable polymer has a number fraction of polymer below 1000 g/mol of ≤0.2, or ≤0.1; or a number fraction of polymer below 3500 g/mol of ≤0.2, or ≤0.1.

In another embodiment, there is provided a process wherein treating the switchable polymer comprises dialysis, precipitation, vacuum treatment, ultra-filtration, reverse osmosis, washing with solvent, or any combination thereof.

In another embodiment, there is provided a process wherein the switchable polymer has about 5.5 mmol to about 18 mmol of switchable moieties per gram of switchable polymer.

In another embodiment, there is provided a process wherein the switchable polymer is resistant to hydrolysis by comprising non-hydrolysable moieties. In an embodiment, a hydrolysable moiety includes acid chlorides carbonate esters, epoxides, or imines. In another embodiment, a hydrolysable moiety includes esters, amidines, or guanidines.

In another embodiment, there is provided a process wherein the switchable polymer is resistant to hydrolysis and does not comprise hydrolysable moieties. In an embodiment, a hydrolysable moiety includes acid chlorides carbonate esters, epoxides, or imines. In another embodiment, a hydrolysable moiety includes esters, amidines, or guanidines.

In another embodiment, there is provided a process wherein the third form of the treated switchable polymer has a viscosity in aqueous solution of about 1 cP to about 100 cP; or about 20 cP to about 100 cP. In another embodiment, there is provided a process wherein the fourth form of the treated switchable polymer has a viscosity in aqueous solution of about 1 cP to about 100 cP; or about 20 cP to about 100 cP.

In another embodiment, there is provided a process wherein the non-polymeric contaminants comprise a solvent, a catalyst, an initiator, a monomer, a salt, a side-product, an initiator residue, a crosslinker, a linking agent, or a combination thereof. In another embodiment, there is provided a process wherein the oligomeric contaminants comprise oligomers having a molecular weight of ≤10 000 g/mol; or, ≤3500 g/mol; or, ≤1000 g/mol In another embodiment, there is provided a process wherein the controlled polymerization method includes a controlled radical polymerization, a step-growth polymerization, or an anionic polymerization.

In another embodiment, there is provided a process wherein the switchable polymer switches to or is maintained in the second form when the switchable moieties are exposed to $CO_2$ at an amount sufficient to maintain the switchable moieties in the ionized form, and wherein the switchable polymer switches to or is maintained in the first form when $CO_2$ is removed or reduced to an amount insufficient to maintain the switchable moieties in the ionized form. In another embodiment, there is provided a process wherein the treated switchable polymer switches to or is maintained in the fourth form when the switchable moieties are exposed to $CO_2$ at an amount sufficient to maintain the switchable moieties in the ionized form, and wherein the treated switchable polymer switches to or is maintained in the third form when $CO_2$ is removed or reduced to an amount insufficient to maintain the switchable moieties in the ionized form. In an embodiment, the $CO_2$ is removed or reduced by exposing the fourth form of the treated switchable polymer to reduced pressures, heat, agitation, and/or an inert flushing gas.

In another embodiment, there is provided a process wherein the ratio of the second osmotic pressure divided by the first osmotic pressure is ≥2, ≥6, ≥10; or, is about 15; or, is ≥15, or ≥16.

In another embodiment, there is provided a process wherein the switchable polymer is poly(N-methyl-N,N-diallylamine), poly(N,N-dimethylallylamine) (PDMAAm), poly(N,N-dimethylvinylamine) (PDMVAm), linear-poly(N-methylethylenimine) (l-PMEI), branched-PMEI (b-PMEI), poly(N-methylpropenimine) (PMPI), poly(diallylmethylamine) (PDAMAm), poly(N-[3-(dimethylamino) propyl]-methacrylamide) (PDMAPMAm), reduced-poly(N,N-dimethylaminopropyl methacrylamide) (red-PDMAPMAm), poly(1,4-bis(dimethylamino)-2-butene) also known as poly (dimethylmethylamine) (PDMMA), poly(N,N-di(N',N'-dimethylbutylamine) allylamine), poly(N,N,N',N'-tetramethyl-1,2-ethylenediamine), poly(N-methylbutyleneimine) (PMBI), Poly(tert-butylaminoethylamino methacrylate) (P(tBAEMA)), Poly(N,N—(N',N'-dimethylaminopropyl) allylamine) (PDMAPAAm), Poly(N,N,N',N'-tetramethyl-2-butene-1,4-diamine) (PTMBD), poly(vinylamine), poly(N-methylvinylamine), poly(N-tertbutylallylamine)), poly(dimethylmethylamine) (PDMMA), N1,N1'-(butane-1,4-diyl)bis (N1-(3-(dimethylamino) propyl)-N3,N3-dimethylpropane-1,3-diamine) (DGEN1), N1,N1',N1",N1'"-((Butane-1,4-diylbis(azanetriyl))tetrakis(propane-3,1-diyl))tetrakis(N1-(3 (dimethylamino) propyl)-N3,N3-dimethylpropane-1,3-diamine) (DGEN2), poly(N—R-allylamine) wherein R is a bulky alkyl group, a polymer comprising bulky secondary or primary amines; or a branched polymer thereof; or a copolymer thereof.

In another aspect of the present disclosure, there is provided a use of a treated switchable polymer as prepared by a process as described herein as a draw solute.

In another aspect of the present disclosure, there is provided a use of a treated switchable polymer as prepared by a process as described herein in an aqueous draw solution.

In another aspect of the present disclosure, there is provided a use of a treated switchable polymer as prepared by a process as described herein in a forward osmosis system.

In another aspect of the present disclosure, there is provided a use of a treated switchable polymer as prepared by a process as described herein as a draw solute in an aqueous draw solution in a forward osmosis system.

In an embodiment of the present disclosure, there is provided a use in processing a precursor consumable. In another embodiment, there is provided a use in processing waste water or process water.

In another aspect of the present disclosure, there is provided a forward osmosis system, comprising:

- a first aqueous draw solution having as a draw solute the treated switchable polymer as formed by a process herein;
- at least one port to bring the first aqueous draw solution in fluid communication with a source of $CO_2$ to form a second aqueous draw solution having as a draw solute the fourth form of the treated switchable polymer; and
- at least one forward osmosis element, comprising
  - a semi-permeable membrane that is selectively permeable to water, having a first side and a second side;
  - at least one port to bring a feed solution in fluid communication with the first side of the membrane; and
  - at least one port to bring the second aqueous draw solution in fluid communication with the second side of the membrane,
  - where water flows from the feed solution through the semi-permeable membrane into the draw solution to form a concentrated feed solution and a first diluted draw solution.

In an embodiment of the present disclosure, there is provided a system wherein the feed solution comprises a precursor consumable.

In another embodiment, there is provided a system wherein the precursor consumable is a food product precursor, a dairy product precursor, a beverage product precursor, a syrup precursor, an extracts precursor, or a juice concentrate precursor.

In another embodiment, the beverage product precursor is a fruit juice, a beer, a wine, a tea, or a coffee. In another embodiment, the juice concentrate precursor is an orange juice, a lemon juice, a lime juice, an apple juice, a grape juice, a fig juice, or a sugar cane juice. In another embodiment, the syrup precursor is a tree sap. In another embodiment, the tree sap is a maple tree sap. In another embodiment, the food product precursor is a whey, a nut milk, or soup precursor, stock precursor, or broth precursor. In another embodiment, the dairy product precursor is a milk. In another embodiment, the extracts precursor includes beans, vanilla beans, seeds, roots, leaves, spices, fragrances, berries, coffee, tea, cannabis, hemp, tobacco, vegetables, or seaweed.

In another embodiment, there is provided a system wherein the concentrated feed solution comprises a concentrated or partially concentrated consumable. In another embodiment, the consumable is a food product, a dairy product, a beverage product, a syrup, an extract, or a juice concentrate. In another embodiment, the beverage product is a concentrated or partially concentrated fruit juice, beer, wine, tea, or coffee. In another embodiment, the juice concentrate is a concentrated or partially concentrated orange juice, lemon juice, lime juice, apple juice, grape juice, fig juice, or sugar cane juice. In another embodiment, the syrup is a concentrated or partially concentrated tree sap or tree syrup. In another embodiment, the tree sap is a maple sap or the tree syrup is a maple syrup. In another embodiment, the food product is a concentrated or partially concentrated soup, stock, or broth. In another embodiment, the dairy product is a condensed or partially condensed milk. In another embodiment, the extract includes concentrated or partially concentrated extracts from beans, vanilla beans, seeds, roots, leaves, spices, fragrances, berries, coffee, tea, cannabis, hemp, tobacco, vegetables, or seaweed.

In another embodiment, there is provided a system wherein the feed solution is a waste water or process water.

In another embodiment, there is provided a system further comprising a regeneration system for regenerating the first aqueous draw solution, the regeneration system comprising

- at least one port to bring the first diluted draw solution in fluid communication with a source of vacuum, heat, agitation, and/or inert flushing gas to form a second dilute draw solution having as a draw solute the third form of the treated switchable polymer; and
- at least one port to bring the second dilute draw solution in fluid communication with a RO system, a nanofiltration system, an ultrafiltration system, a microfiltration system, a dialysis system, a vacuum source, or a precipitation system to remove water from the second dilute draw solution and to regenerate the first aqueous draw solution.

In another aspect of the present disclosure, there is provided a use of a herein described forward osmosis system for concentrating or partially concentrating a precursor consumable.

In an embodiment of the present disclosure, there is provided a use wherein the precursor consumable is a food product precursor, a dairy product precursor, a beverage product precursor, a syrup precursor, an extracts precursor, or a juice concentrate precursor. In another embodiment, the beverage product precursor is a fruit juice, a beer, a wine, a tea, or a coffee. In another embodiment, the juice concentrate precursor is an orange juice, a lemon juice, a lime juice, an apple juice, a grape juice, a fig juice, or a sugar cane juice. In another embodiment, the syrup precursor is a tree sap. In another embodiment, the tree sap is a maple tree sap. In another embodiment, the food product precursor is a soup, stock, or broth precursor. In another embodiment, the dairy product precursor is a milk. In another embodiment, the extracts precursor includes beans, vanilla beans, seeds, roots, leaves, spices, fragrances, berries, coffee, tea, cannabis, hemp, tobacco, vegetables, or seaweed.

In another aspect of the present disclosure, there is provided a use of a herein described forward osmosis system for concentrating or partially concentrating a waste water or process water.

In an aspect, it is disclosed a forward osmosis system, comprising:

- a draw solution comprising a switchable polymer switchable between a neutral form and an ionized form, wherein
- the neutral form is associated with a first osmotic pressure,
- the ionized form is associated with a second osmotic pressure, and
- the second osmotic pressure is higher than the first osmotic pressure; and
- a feed solution in fluid communication with the draw solution, the feed solution comprising a feed solvent that is the same as the solvent of the draw solution, and the feed solution being separated from the draw solution by a semipermeable membrane that is selectively permeable to the solvent,
- wherein at least a portion of the feed solvent permeates from the feed solution to the draw solution when the polymer is in the ionized form to produce a concentrated feed solution and a diluted draw solution,
- wherein a ratio between the second osmotic pressure and the first osmotic pressure is ≥2, ≥6, ≥10, about 15, or ≥15, or ≥16.

In some embodiments, the switchable polymer is treated to remove impurities before the draw solution is prepared.

In some embodiments, the impurities comprise a solvent, a catalyst, an initiator, a monomer, a salt, a side-product, an initiator residue, a crosslinker, a linking agent, an oligomeric contaminant, or a combination thereof.

In some embodiments, the switchable polymer is treated by dialysis, precipitation, vacuum treatment, ultra-filtration, reverse osmosis, washing with solvent, or any combination thereof.

In some embodiments, the forward osmosis system further comprises a first subsystem for removing the concentrated feed solution.

In some embodiments, the forward osmosis system further comprises a regeneration system for switching the switchable polymer in the diluted draw solution from the ionized form to the neutral form after removal of the concentrated feed solution such that a restored draw solution is produced. In some embodiments, the regeneration system is further configured to remove at least a portion of the solvent from the restored draw solution after the polymer has switched from the ionized form to the neutral form such that a second draw solution is produced. In some embodiments, the removal of the solvent is by filtration, RO, precipitation, dialysis, vacuum treatment, ultrafiltration, decomposition, or a combination thereof.

In some embodiments, the forward osmosis system further comprises a recycling system for recycling at least a portion of the second draw solution as the draw solution.

In some embodiments, the switchable polymer comprises switchable moieties, each of the switchable moieties being switchable between a moiety neutral form associated with the neutral form of the switchable polymer and a moiety ionized form associated with the ionized form of the polymer. In some embodiments, the switchable polymer comprises about ≥3 mmol, >5.5 mmol, about 3 mmol to about 24 mmol, about 3 mmol to about 23.3 mmol, about 3 mmol to about 18 mmol, or about 5.5 mmol to about 24 mmol, or about 5.5 mmol to about 23.3 mmol, or about 5.5 mmol to about 18 mmol of the switchable moieties per gram of the polymer.

In some embodiments, more than about 30%, more than about 50%, more than about 75%, more than about 90%, or more than about 95%, or about 95% of the switchable moieties are switched from the moiety neutral form to the moiety ionized form when the polymer is switched from the neutral form to the ionize form.

In some embodiments, the switchable moieties comprises an amine group.

In some embodiments, switching from the moiety neutral form to the moiety ionized form is effected by protonation of the amine group.

In some embodiments, switching from the moiety ionized form to the moiety neutral form is effected by deprotonation.

In some embodiments, the protonation is effected by exposing the switchable moiety to an ionizing trigger.

In some embodiments, the deprotonation is effected by removal of the ionizing trigger.

In some embodiments, the removal of the ionizing trigger is effected by subjecting the diluted draw solution to a source of vacuum, heat, agitation, and/or inert flushing gas.

In some embodiments, the ionizing trigger is $CO_2$, $CS_2$, COS, or a combination thereof.

In some embodiments, a ratio between nitrogen atoms and carbon atoms in the switchable polymer is between 1:5 and 1:3.

In some embodiments, the switchable polymer has a concentration ≤50 wt. %, between about 0.5 wt. % to about 50 wt. %, between about 5 wt. % to 50 wt. %, between about 5 wt. % to about 45 wt. %, between about 5 wt. % to about 40 wt. %, between about 5 wt. % to about 35 wt. %, between about 10 wt. % to about 35 wt. %, between about 10 wt. % to about 30 wt. %, between about 10 wt. % and about 25 wt. %, or between about 15 wt. % and about 25 wt. % in the draw solution.

In some embodiments, the solvent is water.

In some embodiments, the switchable polymer is substantially resistant to hydrolysis.

In some embodiments, the feed solution is a food product precursor, which may be a dairy product precursor, a beverage product precursor, a syrup precursor, an extracts precursor, a juice concentrate precursor, a whey, a nut milk, or soup precursor, stock precursor, or broth precursor. In some embodiments, the beverage product precursor is a fruit juice, a beer, a wine, a tea, or a coffee. In some embodiments, the juice concentrate precursor is an orange juice, a lemon juice, a lime juice, an apple juice, a grape juice, a fig juice, a sugar cane juice, or a combination thereof. In some embodiments, the syrup precursor is a tree sap, for example, a maple tree sap. In some embodiments, the dairy product precursor is milk. In some embodiments, the extracts precursor includes beans, vanilla beans, seeds, roots, leaves, spices, fragrances, berries, coffee, tea, cannabis, hemp, tobacco, vegetables, or seaweed.

In some embodiments, the feed solution is waste water, sea water, brackish water, or industrial aqueous solutions. In some embodiments, the industrial aqueous solutions are from dyeing of fabrics, pharmaceutical processing, biomass conversion, algae growth, agriculture, fermentation, nuclear power generation, or geothermal power generation.

In some embodiments, the feed solution comprises sugar, polysaccharide, wood, lignocellulose, grass, microalgae, macroalgae, bacteria, bagasse, stover, agricultural waste, compost, or manure. In some embodiments, the sugar is sucrose, xylose, glucose, fructose, or a combination thereof. In some embodiments, the polysaccharide is cellulose, starch, hemicellulose, inulin, xylan, chitin, or a combination thereof.

In some embodiments, the feed solution comprises protein, for example, bio-therapeutic protein, food protein, monoclonal antibody (MAb), and/or therapeutic protein.

In an aspect, there is disclosed a process for treating a switchable polymer switchable from a neutral form associated with a first osmotic pressure and a ionized form associated with a second osmotic pressure such that a ratio between the second osmotic pressure and the first osmotic pressure is increased, the process comprising treating the switchable polymer to remove non-polymeric and/or oligomeric contaminants.

In some embodiments, treating the switchable polymer comprises dialysis, precipitation, vacuum treatment, ultrafiltration, reverse osmosis, washing with solvent, or any combination thereof.

In some embodiments, the switchable polymer comprises switchable moieties, each of the switchable moieties switchable between a moiety neutral form associated with the neutral form, and an ionized form associated with the second form of the switchable polymer. In some embodiments, the switchable polymer comprises ≥3 mmol of the switchable moieties per gram of switchable polymer. In some embodiments, the switchable polymer has about 3 mmol to about 18 mmol of switchable moieties per gram of switchable polymer; or, about 5.5 mmol to about 18 mmol of switchable moieties per gram of switchable polymer.

In some embodiments, the switchable polymer has a pKaH of about 7 to about 14, about 7.5 to about 14; or, about 8 to about 13; or, about 8 to about 12; or, about 7 to about 10.

In some embodiments, the switchable polymer is substantially resistant to hydrolysis. In some embodiments, the switchable polymer is substantially free of hydrolysable moiety. For example, (i) the hydrolysable moiety includes acid chlorides carbonate esters, epoxides, or imines; or (ii) the hydrolysable moiety includes esters, amidines, or guanidines.

In some embodiments, the ratio between the second osmotic pressure and the first osmotic pressure is ≥2, ≥6; or, is ≥10; or, is about 15; or, is ≥15, or ≥16.

In some embodiments, the neutral switchable polymer has a viscosity in aqueous solution of about 1 cP to about 100 cP; or about 20 cp to about 100 cP.

In some embodiments, the ionized form of the treated switchable polymer has a viscosity in aqueous solution of about 1 cP to about 100 cP; or about 20 cP to about 100 cP.

In some embodiments, the non-polymeric contaminants comprise a solvent, a catalyst, an initiator, a monomer, a salt, a side-product, an initiator residue, a crosslinker, a linking agent, or a combination thereof. In some embodiments, the oligomeric contaminants comprise oligomers having a molecular weight of ≤10 000 g/mol; or, ≤3500 g/mol; or, ≤1000 g/mol.

In some embodiments, the switchable polymer switches to or is maintained in the ionized form when the switchable polymer is exposed to $CO_2$ at an amount sufficient to maintain the switchable polymer in the ionized form, and wherein the switchable polymer switches to or is maintained in the neutral form when the $CO_2$ is removed or reduced to an amount insufficient to maintain the switchable polymer in the ionized form.

In some embodiments, the $CO_2$ is removed or reduced by exposing the fourth form of the treated switchable polymer to reduced pressures, heat, agitation, and/or an inert flushing gas.

In an aspect, there is disclosed use of a polymer for forward osmosis, wherein the polymer is switchable between a neutral form associated with a first osmotic pressure and an ionized form associated with a second osmotic pressure, and a ratio between the second osmotic pressure and the first osmotic pressure is ≥2, ≥6, ≥10, about 15, or ≥15, or ≥16.

In some embodiments, the polymer is treated to remove impurities.

In some embodiments, the polymer has a Mw in the range of about 2 kDa to about 50 kDa, about 2 kDa to 45 kDa, about 2 kDa to 40 kDa, about 2 kDa to about 35 kDa, about 2 kDa to 35 Kda, about 2 kDa to about 30 kDa, about 2 kDa to about 25 kDa, about 2 kDa to about 20 kDa, or about 2 kDa to about 15 kDa, about 2 kDa to about 10 kDa, about 2 kDa to about 9 kDa, or about 4 kDa to about 9 kDa.

BRIEF DESCRIPTION OF THE DRAWINGS

Embodiments of the present disclosure will now be described, by way of example only, with reference to the attached Figures.

Figure 1:
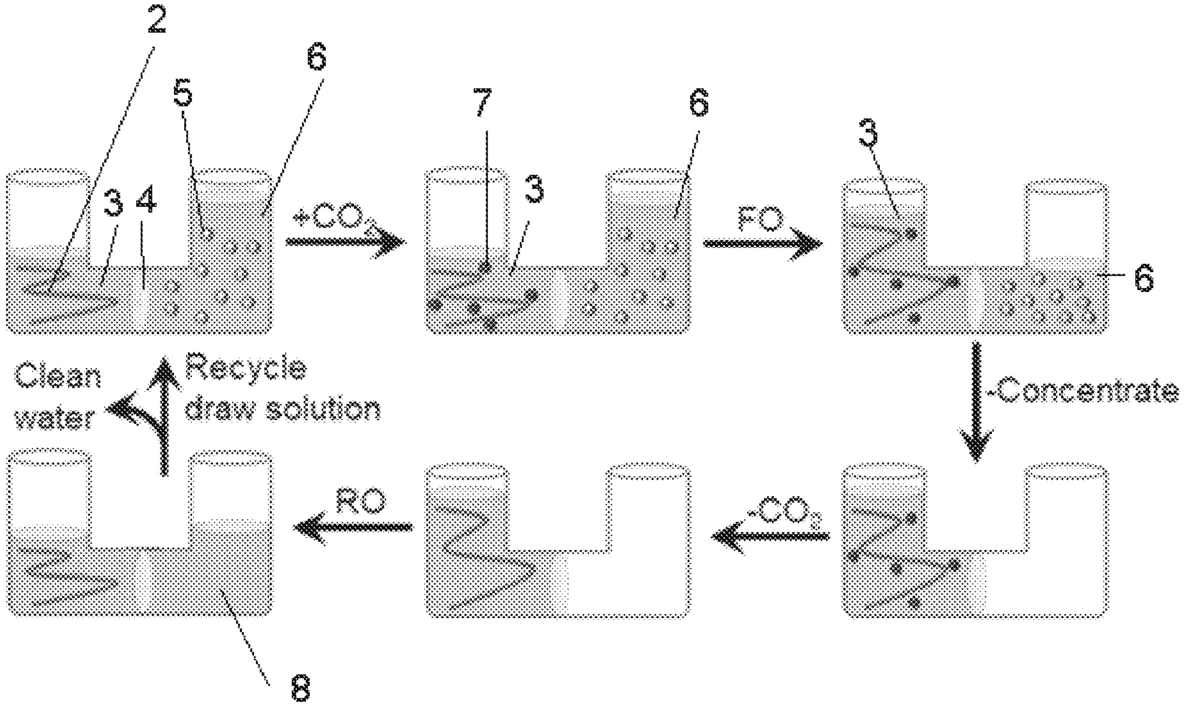
FIG. 1 shows an example FO and RO processes of the disclosure.

It should be noted that the figures are merely examples and no limitations on the scope of the present disclosure are intended thereby. Further, the figures are generally not drawn to scale, but are drafted for purposes of convenience and clarity in illustrating various aspects of the disclosure.

DETAILED DESCRIPTION

Generally, the present disclosure provides a process of forming a treated switchable polymer, comprising: providing a switchable polymer that is switchable between a first form and a second form, the switchable polymer comprising switchable moieties, each switchable moiety being switchable between a neutral form associated with the first form of the switchable polymer, and an ionized form associated with the second form of the switchable polymer, the switchable polymer having ≥3 mmol switchable moieties per gram of switchable polymer, having a $pK_{aH}$ of about 7 to about 14, and being resistant to hydrolysis; treating the switchable polymer to remove non-polymeric and/or oligomeric contaminants; and forming a treated switchable polymer that is switchable between a third form and a fourth form, the neutral form of each switchable moiety being associated with the third form of the treated switchable polymer, and the ionized form of each switchable moiety being associated with the fourth form of the treated switchable polymer, the third form of the treated switchable polymer having a first osmotic pressure in aqueous solution, and the fourth form of the treated switchable polymer having a second osmotic pressure in aqueous solution, the ratio of the second osmotic pressure divided by the first osmotic pressure being ≥2, the treated switchable polymer being substantially water soluble in the fourth form.

Generally, the present disclosure also provides a process of forming a treated switchable polymer, comprising: providing a switchable polymer that is switchable between a first form and a second form, the switchable polymer comprising switchable moieties, each switchable moiety being switchable between a neutral form associated with the first form of the switchable polymer, and an ionized form associated with the second form of the switchable polymer, the switchable polymer having ≥5.5 mmol of switchable moieties per gram of switchable polymer, having a $pK_{aH}$ of about 7 to about 10, and being resistant to hydrolysis; treating the switchable polymer to remove non-polymeric and/or oligomeric contaminants; and forming a treated switchable polymer that is switchable between a third form and a fourth form, the neutral form of each switchable moiety being associated with the third form of the treated switchable polymer, and the ionized form of each switchable moiety being associated with the fourth form of the treated switchable polymer, the third form of the treated switchable polymer having a first osmotic pressure in aqueous solution, and the fourth form of the treated switchable polymer having a second osmotic pressure in aqueous solution, the ratio of the second osmotic pressure divided by the first osmotic pressure being ≥6, the treated switchable polymer being substantially water soluble in the third form and fourth form, and having a number fraction of polymer below 1000 g/mol of ≤0.3 or a number fraction of polymer below 3500 g/mol of ≤0.3.

Generally, the present disclosure also provides use of a treated switchable polymer, as prepared by a process as described herein, as a draw solute, in an aqueous draw solution; in a forward osmosis system; or as a draw solute in an aqueous draw solution in a forward osmosis system.

Generally, the present disclosure also provides a forward osmosis system, comprising: a first aqueous draw solution having as a draw solute the treated switchable polymer as formed by a process as described herein; at least one port to bring the first aqueous draw solution in fluid communication with a source of $CO_2$ to form a second aqueous draw solution having as a draw solute the fourth form of the treated switchable polymer; and at least one forward osmosis element, comprising a semi-permeable membrane that is selectively permeable to water, having a first side and a second side; at least one port to bring a feed solution in fluid communication with the first side of the membrane; and at least one port to bring the second aqueous draw solution in fluid communication with the second side of the membrane, where water flows from the feed solution through the semi-permeable membrane into the draw solution to form a concentrated feed solution and a first diluted draw solution.

The present disclosure also provides a forward osmosis system further comprising a regeneration system for regenerating the first aqueous draw solution, the regeneration system comprising at least one port to bring the first diluted draw solution in fluid communication with a source of vacuum, heat, agitation, and/or inert flushing gas to form a second dilute draw solution having as a draw solute the third form of the treated switchable polymer; and at least one port to bring the second dilute draw solution in fluid communication with one or more of a RO system, a nanofiltration system, an ultrafiltration system, a microfiltration system, a dialysis system, a vacuum source, and a precipitation system to remove water from the second dilute draw solution and to regenerate the first aqueous draw solution.

Generally, the present disclosure also provides use of a forward osmosis system as described herein for concentrating or partially concentrating a precursor consumable. Generally, the present disclosure also provides use of a forward osmosis system as described herein for concentrating or partially concentrating a wastewater or process water.

Definitions

Unless defined otherwise, all technical and scientific terms used herein have the same meaning as commonly understood by one of ordinary skill in the art to which this invention belongs.

As used in the specification and claims, the singular forms "a", "an" and "the" include plural references unless the context clearly dictates otherwise.

The term "comprising" as used herein will be understood to mean that the list following is non-exhaustive and may or may not include any other additional suitable items, for example one or more further feature(s), component(s) and/or ingredient(s) as appropriate.

As used herein, the term "unsubstituted" refers to any open valence of an atom being occupied by hydrogen. Also, if an occupant of an open valence position on an atom is not specified then it is hydrogen.

As used herein, "substituted" or "functionalized" means having one or more substituent moieties present that either facilitates or improves desired reactions and/or functions of the invention, or does not impede desired reactions and/or functions of the invention. A "substituent" is an atom or group of bonded atoms that can be considered to have replaced one or more hydrogen atoms attached to a parent molecular entity. Examples of substituents include alkyl, alkenyl, alkynyl, aryl, aryl-halide, heteroaryl, cyclyl (non-aromatic ring), $Si(alkyl)_3$, $Si(alkoxy)_3$, halo, alkoxyl, amino, amide, hydroxyl, thioether, alkylcarbonyl, carbonate, aminocarbonyl, alkylthiocarbonyl, phosphate, phosphonato, phosphinato, cyano, acylamino, sulfhydryl, alkylthio, arylthio, thiocarboxylate, dithiocarboxylate, sulfate, sulfato, sulfamoyl, sulfonamide, nitro, nitrile, azido, heterocyclyl, ether, silicon-containing moieties, thioester, or a combination thereof.

As used herein, "alkyl" refers to a linear, branched or cyclic, saturated hydrocarbon, which consists solely of single-bonded carbon and hydrogen atoms, which can be unsubstituted or is optionally substituted with one or more substituents; for example, a methyl or ethyl group. Examples of saturated straight or branched chain alkyl groups include, but are not limited to, methyl, ethyl, 1-propyl, 2-propyl, 1-butyl, 2-butyl, 2-methyl-1-propyl, 2-methyl-2-propyl, 1-pentyl, 2-pentyl, 3-pentyl, 2-methyl-1-butyl, 3-methyl-1-butyl, 2-methyl-3-butyl, 2,2-dimethyl-1-propyl, 1-hexyl, 2-hexyl, 3-hexyl, 2-methyl-1-pentyl, 3-methyl-1-pentyl, 4-methyl-1-pentyl, 2-methyl-2-pentyl, 3-methyl-2-pentyl, 4-methyl-2-pentyl, 2,2-dimethyl-1-butyl, 3,3-dimethyl-1-butyl and 2-ethyl-1-butyl, 1-heptyl and 1-octyl. As used herein the term "alkyl" encompasses cyclic alkyls, or cycloalkyl groups. As used herein, "cycloalkyl" refers to a non-aromatic, saturated monocyclic, bicyclic or tricyclic hydrocarbon ring system containing at least 3 carbon atoms. Examples of C3-Cn cycloalkyl groups include, but are not limited to, cyclopropyl, cyclobutyl, cyclopentyl, cyclohexyl, cycloheptyl, cyclooctyl, norbornyl, adamantyl, bicyclo [2.2.2]oct-2-enyl, and bicyclo[2.2.2]octyl.

As used herein, the term "polymer" or "polymeric amine" means a molecule of various high relative molecular mass, the structure of which essentially comprises multiple repetition of units derived from molecules of low relative molecular mass. As used herein, the term "oligomer" means a molecule of intermediate relative molecular mass, the structure of which essentially comprises a small plurality of units derived from molecules of low relative molecular mass. A molecule can be regarded as having a high relative molecular mass if the addition or removal of one or a few of the units has a negligible effect on the molecular properties. A molecule can be regarded as having an intermediate relative molecular mass if it has molecular properties which do vary significantly with the removal of one or a few of the units. (See IUPAC Recommendations 1996 in (1996) *Pure and Applied Chemistry* 68:2287-2311). Unless otherwise specified, 'polymer' may also refer to a 'copolymer'.

As used herein, the term "copolymer" refers to a polymer, as defined above, composed of one or more structurally different monomeric repeat units.

As used herein, "D" or "dispersity" (also called "PDI" or "polydispersity index") refers to is a measure of the distribution of molecular mass in a given polymer sample. D (PDI) of a polymer is calculated by:

$$PDI=M_w/M_n$$

where $M_w$ is the weight average molecular weight and $M_n$ is the number average molecular weight. $M_n$ is more sensitive to molecules of low molecular mass, while $M_w$ is more sensitive to molecules of high molecular mass. The dispersity indicates the distribution of individual molecular masses in a batch of polymers. D or PDI has a value equal to or greater than 1. As the polymer chains approach uniform chain length, PDI approaches unity.

As used herein, "number fraction of polymer below X g/mol" refers to the fraction of the total polymer chains having molecular weight below X g/mol; for example, below 1000 g/mol, or below 3500 g/mol.

As used herein, "controlled polymerization method" refers to a method of polymerizing one or more monomers to produce polymer chains with a narrow molecular weight distribution, and for which most of the polymer chains are able to add additional monomer units.

As used herein, the term "non-polymeric" refers to compounds or contaminants that are not a polymer or oligomer as defined above, or are not polymeric or oligomeric in nature; for example, small molecules such as catalysts, initiators, monomers, solvents, etc.

As used herein, the term "contaminant" refers to a compound or one or more non-polymeric compounds or oligomers that are intended to be removed from a mixture or from a switchable polymer, and is not intended to imply that said contaminant has no value.

As used herein, "switched" means that the physical properties, and in particular the ionic strength or osmotic pressure, have been modified. "Switchable" refers to being able to be converted from a first form with a first set of physical properties, e.g., a first state of a given ionic strength/osmotic pressure, to a second form with a second set of physical properties, e.g., a second state of a given ionic strength/osmotic pressure that is different from the first state. It should be understood, for the purposes of this disclosure, that any switch that can be induced by $CO_2$ may also in most cases be induced by COS, $CS_2$, a combination thereof, or a mixture of $CO_2$ with any one of, or both of, COS and $CS_2$.

As used herein, "switchable polymer" or "treated switchable polymer" refers to a polymer comprising at least one functional group that is sufficiently basic that, when it is in the presence of an aqueous solution and an ionizing trigger such as $CO_2$ (which forms carbonic acid), it becomes protonated. Non-limiting examples of such functional groups comprise amines. The switchable polymer or treated switchable polymer may be linear, branched, or dendrimeric. It may be a mixture of molecular weights. It may be a physical mixture of polymers, such as, for example, a mixture of a polymer of one kind of repeat unit, and a polymer of a different kind of repeat unit. When an aqueous solution that includes such a switchable polymer is subjected to an ionizing trigger, such as $CO_2$, the additive reversibly switches between two states, a non-ionized state where the functional group is charge-neutral (e.g. amine nitrogen is trivalent and is uncharged), and an ionized state where the functional group is charged (e.g. amine nitrogen is protonated making it a positively charged nitrogen atom). In some cases, the positive charge may be delocalized over more than one atom. For convenience herein, the uncharged or nonionic form of the switchable polymer is generally not specified, whereas the ionic form is generally specified. The terms "ionized", "ionic", or "carbonated" as used herein when identifying a form of the switchable polymer merely refer to the protonated or charged state of the functional group (e.g. amine nitrogen). For example, in some examples, the switchable polymer includes other groups that are ionized when the switchable moiety (e.g. amine nitrogen (s)) is in the uncharged or non-ionic form. As used herein, 'in the presence of $CO_2$' refers to $CO_2$ being used as a trigger at a partial pressure that is ≥0.1 bar (e.g., higher than the partial pressure of $CO_2$ present in air).

As used herein, "treated switchable polymer" refers to a switchable polymer that has undergone a treatment step to remove non-polymeric and/or oligomeric contaminants. Such contaminants may include, but are not limited to monomer(s), initiator(s), initiator residues, oligomer(s), solvent(s) (other than water), catalyst(s), salt(s), and reaction residues or by-products. The treatment step includes, for example, dialysis, precipitation, vacuum treatment, ultrafiltration, reverse osmosis, washing with solvent, or any combination thereof. Counting all molecules in the treated switchable polymer—other than water, hydroxide anion, bicarbonate anion, carbonate anion, sulfur-containing analogs of bicarbonate anion, sulfur-containing analogs of carbonate anion, hydronium cation, or dissolved gases—the mole % of remaining contaminants after the treatment step may be no greater than 60% and preferably may be no greater than 30%. Alternatively, the weight percent (wt %) of remaining contaminants after the treatment step may be ≤1 wt %, or ≤0.2 wt %.

As used herein, "switchable moiety" refers to a N-containing functional group that exists in a first form, such as a neutral form, at a first partial pressure of a trigger, such as $CO_2$ (i.e., <0.1 bar), in the presence of water or other aqueous solutions; and exists in a second form, such as an ionized form, in the presence of water or other aqueous solutions at a second partial pressure of the trigger, such as $CO_2$ (i.e., ≥0.1 bar; for example, higher than the partial pressure of $CO_2$ present in air), that is higher than the first partial pressure. This term also applies to cases wherein COS, $CS_2$, or a mixture of any or all of $CO_2$, COS, or $CS_2$, is employed in place of $CO_2$.

As would be readily appreciated by a skilled person in the art, since few protonation reactions proceed to completion, when a switchable polymer is referred to herein as being "protonated" or "ionized" it means that all, or a majority, or less than a majority of the switchable moieties of the polymer are protonated. For example, more than about 30%, or more than about 50%, or more than about 75%, or more than about 90%, or more than about 95%, or about 95% of the switchable moieties are protonated or ionized by carbonic acid. As would be further appreciated by a skilled person in the art, a switchable polymer is considered ionized when the % protonation is sufficient to cause a switch in ionic strength/osmotic pressure.

As used herein, the term "a basic nitrogen" or "a nitrogen that is sufficiently basic to be protonated by carbonic acid" is used to denote a nitrogen atom that has a lone pair of electrons available and susceptible to protonation. Although carbonic acid ($CO_2$ in aqueous solution) is mentioned, such a nitrogen would also be protonated by $CS_2$ or COS in an aqueous solution. This term is intended to denote the nitrogen's basicity and it is not meant to imply which of the three trigger gases ($CO_2$, $CS_2$ or COS) is used.

As used herein, a "trigger" or "ionizing trigger" is a change of conditions (e.g., introduction or removal of a gas, change in temperature, etc.) that causes a change in the physical properties, e.g., ionic strength/osmotic pressure. The term "reversible" means that the reaction can proceed in either direction (backward or forward) depending on the reaction conditions.

"Carbonated water" means an aqueous solution in which $CO_2$ has been dissolved at a partial pressure that is higher than the partial pressure of $CO_2$ present in air. "$CO_2$ saturated water" means an aqueous solution in which $CO_2$ is dissolved to a maximum extent at a particular temperature and a particular partial pressure of $CO_2$.

As used herein, "a gas that has substantially no carbon dioxide" or an "inert gas" or an "inert flushing gas" refers to a gas that has insufficient $CO_2$ or other ionizing trigger content to interfere with the removal of $CO_2$ or other ionizing trigger from the solution. For some applications, air may be a gas that has substantially no $CO_2$ or other ionizing trigger. Untreated air may be successfully employed, i.e., air in which the $CO_2$ content is unaltered; this would provide a cost saving. For instance, air may be a gas that has substantially no $CO_2$ because in some circumstances, the approximately 0.04% by volume of $CO_2$ present in air is insufficient to maintain a compound in a switched form, such that air can be a trigger used to remove $CO_2$ from a solution and cause switching. Similarly, "a gas that has substantially no $CO_2$, $CS_2$ or COS" has insufficient $CO_2$, $CS_2$ or COS content to interfere with the removal of $CO_2$, $CS_2$ or COS from the solution.

As used herein, "ionic" means containing or involving or occurring in the form of positively or negatively charged ions, i.e., charged moieties. "Nonionic" or "neutral" means comprising substantially of molecules with no formal charges. Nonionic does not imply that there are no ions of any kind, but rather that a substantial amount of basic nitrogens are in an unprotonated or neutral state. "Salts" as used herein are compounds with no net charge formed from positively and negatively charged ions.

"Ionic strength" of a solution is a measure of the concentration of ions in the solution. Ionic compounds (i.e., salts), which dissolve in water will dissociate into ions, increasing the ionic strength of a solution. The total concentration of dissolved ions in a solution will affect important properties of the solution such as the dissociation or solubility of different compounds. The ionic strength, I, of a solution is a function of the concentration of all ions present in the solution and is typically given by the equation (A), $$I = \frac{1}{2}\sum_{i=1}^{n} c_i z_i^2 \quad \text{(A)}$$

in which c is the molar concentration of ion i in mol/dm$^3$, z is the charge number of that ion and the sum is taken over all ions dissolved in the solution. In non-ideal solutions, volumes are not additive such that it is preferable to calculate the ionic strength in terms of molality (mol/kg $H_2O$), such that ionic strength can be given by equation (B), $$I = \frac{1}{2}\sum_{i=1}^{n} m_j z_j^2 \quad \text{(B)}$$

in which m is the molality of ion i in mol/kg $H_2O$, and z is as defined for equation (A).

The term "wastewater" means water that has been used by a domestic or industrial activity and therefore now includes waste products. However, the term 'waste' is not intended to imply that the water or product has no value.

As used herein, a switchable polymer being "resistant to hydrolysis" refers to a switchable polymer having a chemical structure or comprising chemical bonds that are unlikely to hydrolyze under standard conditions for hydrolysis. In some embodiments, a switchable polymer having such a chemical structure, or comprising such chemical bonds is a polymer that does not comprise a hydrolysable moiety such as, but not limited to, acid chlorides, carbonate esters, epoxides, or imines. In other embodiments, a switchable polymer having such a chemical structure, or comprising such chemical bonds is a polymer that does not comprise a hydrolysable moiety such as, but not limited to, esters, amidines, or guanidines.

As used herein, a "precursor consumable" or 'precursor' refers to a dilute consumable that has yet to be concentrated or partially concentrated by forward osmosis to form a target concentrated or partially concentrated consumable product. As used herein "consumable" refers to substance such as a concentrated or partially concentrated liquid, such as but not limited to liquid mixtures, solutions, emulsions, liquid/solid mixtures, foams, and/or suspensions, that may be used, ingested, or otherwise consumed by flora or fauna, including mammals such as humans, or can serve as an ingredient or additive in a material that may be used, ingested, or otherwise consumed by flora or fauna, including mammals such as humans.

As used herein, '$pK_{aH}$' refers to the negative log (base 10) of the dissociation constant ($K_a$) of the conjugate acid of a switchable moiety (e.g., an amine).

As used herein, 'cP' refers to centipoise, a measurement unit of viscosity.

Switchable Polymers

A switchable polymer is a polymer comprising a switchable moiety, e.g., an amine group, which is sufficiently basic to be protonated when in the presence of an aqueous solution and an ionizing trigger. The aqueous solution may refer to pure water, or any aqueous solution. The ionizing trigger may be $CO_2$, COS, or $CS_2$, or a combination thereof. In embodiments, the switchable polymer contains one or more switchable moieties in the repeating unit of the polymer. In embodiments, the one or more switchable moieties are within the backbone of the polymer. In other embodiments, one or more switchable moieties are in a pendant group that is part of the repeating unit, but that is not situated along the backbone of the polymer.

When an aqueous solution that includes such a switchable polymer is subjected to a trigger, the polymer reversibly switches between two forms, a non-ionic or neutral form where the switchable moiety is uncharged/neutral (e.g. amine nitrogen is trivalent and is uncharged), and an ionic form where the switchable moiety is protonated or ionized (e.g. amine nitrogen is a 4-coordinate positively charged nitrogen atom). Exposing the switchable polymer to an ionizing trigger, such as $CO_2$, switches the polymer to an ionic form where the switchable moiety is protonated or ionized; and exposing the ionized form of the switchable polymer to reduced pressures, heat, agitation, and/or an inert flushing gas (e.g., air, nitrogen) causes deprotonation of the switchable moiety, returning the polymer to its non-ionic or neutral form where the switchable moiety is uncharged/neutral. For example, the following scheme shows the protonation and deprotonation of poly(N,N-dimethylvinylamine) (PDMVAm):

Scheme 1

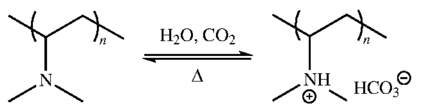

Accordingly, the ionized switchable moiety has a negatively charged counter ion that is associated with it in solution, the nature of which depends on the ionizing trigger used. Further, the switchable polymer must be sufficiently water-soluble such that it can switch between a non-ionic form and an ionic form in order to increase or decrease the ionic strength and osmotic strength of the aqueous solution respectively, relative to the ionic strength of aqueous solutions without the ionic form of the switchable polymer present. In embodiments, the switchable polymer is at least partially or fully water-soluble in both its neutral/non-ionic and ionic forms. The neutral form of the switchable polymer is typically more easily isolable from the aqueous solution, as compared to its ionic counterpart.

In embodiments, the switchable polymer is a polymeric amine, wherein the switchable moiety is an amine group, and the ionizing trigger is $CO_2$. Addition of $CO_2$ at 1 bar, for example, lowers the pH of an aqueous phase. Pure water, having a pH of 7 at room temperature, has its pH lowered to 3.9 when exposed to 1 bar of $CO_2$ for long enough for equilibrium to be reached. A solution of an amine or polymeric amine in water at room temperature would have a pH higher than 7 before exposure to 1 bar of $CO_2$, and a pH that is lower than the starting pH and yet greater than 3.9 after such exposure. Such lowering of the pH by $CO_2$ is sufficient to protonate an amine group having a $pK_{aH}$ of 7.2-10, or a $pK_{aH}$ of 7-12 [A. K. Alshamrani, J. R. Vanderveen and P. G. Jessop, *Phys. Chem. Chem. Phys.,* 2016, 18, 19276-19288].

In embodiments, the switchable polymer is a switchable polymer having a chemical structure, or comprising chemical bonds that do not comprise a hydrolysable moiety such as, but not limited to, acid chlorides, carbonate esters, epoxides, imines, or other functional groups known by a skilled person in the art to decompose or hydrolyze in water. In other embodiments, the switchable polymer is a switchable polymer having a chemical structure, or comprising chemical bonds that do not comprise a hydrolysable moiety such as, but not limited to, esters, amidines, or guanidines.

In some embodiments, the switchable polymer is poly(N, N-dimethylallylamine) (PDMAAm), poly(N,N-dimethylvinylamine) (PDMVAm), linear-poly(N-methylethylenimine) (I-PMEI), branched-PMEI (b-PMEI), poly(N-methylpropenimine) (PMPI), poly(N-methyl-N,N-diallylamine), (PDAMAm), poly(N-[3-(dimethylamino) propyl]-methacrylamide) (PDMAPMAm), poly(1,4-bis(dimethylamino)-2-butene) also known as poly(dimethylmethylamine) (PDMMA), poly(N,N-di(N',N'-dimethylbutylamine) allylamine), poly(N,N,N',N'-tetramethyl-1,2-ethylenediamine), poly(N-methylbutyleneimine), poly(N—R-allylamine) (where R is a bulky alkyl group), polymers containing secondary or primary amines in which the bulk of one or two substituents on the N atom and/or the bulk of the polymeric chain itself is sufficient to largely prevent formation of carbamate salt or carbamic acid groups from a substantial proportion of the amine groups (e.g., poly(vinylamine), poly(N-methylvinylamine), and poly(N-tertbutylallylamine)), or a copolymer thereof, or a branched version thereof. In some embodiments, the polymer has a Mw in the range of about 2 kDa to about 50 kDa, about 2 kDa to 45 kDa, about 2 kDa to 40 kDa, about 2 kDa to about 35 kDa, about 2 kDa to 35 Kda, about 2 kDa to about 30 kDa, about 2 kDa to about 25 kDa, about 2 kDa to about 20 kDa, or about 2 kDa to about 15 kDa, about 2 kDa to about 10 kDa, about 2 kDa to about 9 kDa, about 4 kDa to about 9 kDa.

Forward Osmosis

Typical methods for processing aqueous solutions (e.g., purifying, concentrating, etc.) include distillation and other thermal evaporative methods, reverse osmosis, and forward osmosis. Distillation and other thermal evaporative methods cause stress to a feed solution, and are typically not feasible for large scale use (e.g., desalination), due to high energy costs associated with boiling water. Further, high temperatures required for distillation or other thermal evaporative methods limit its applications; for instance, with food processing (e.g., providing juice concentrates), because high temperatures denature proteins and other naturally occurring biomolecules, reducing the nutritional content and negatively affecting taste. Reverse osmosis (RO) is among the most common methods for processing aqueous solutions, where an aqueous solution is forced through a semipermeable membrane, producing pure water and a concentrated solution. RO is effective but requires use of high pressures; for example, pressures greater than 50 bar, or greater than 200 bar may be required, depending on the aqueous solution to be processed [T. S. Chung, S. Zhang, K. Y. Wang, J. Su and M. M. Ling, *Desalination,* 2012, 287, 78-81; A. Altaee, G. Zaragoza and H. R. van Tonningen, *Desalination,* 2014, 336, 50-57].

Forward osmosis (FO) is an alternative filtration process that relies on water flowing in an energetically preferred direction, from a region of low solute concentration to a region of high solute concentration. Instead of applying external pressure, "draw solutes" are used to create a high solute concentration, which passively draws water through a membrane. The ability of a draw agent to perform osmosis is characterized by the osmotic pressure it exerts at a given concentration in water. Osmotic pressure is defined as the minimum pressure applied to a solution, which will prevent water from passing through a membrane in the energetically preferred direction and is, as a rough approximation, proportional to the number of solute species in solution. In practice, an observed osmotic pressure can deviate significantly from such proportionality, especially at higher concentrations or in the presence of hydrophilic and/or hygroscopic materials. Such materials tend to increase the observed osmotic pressure above that which would be expected based upon merely the number of solute molecules. This additional osmotic pressure can, in cases involving water/polymer mixtures, be referred to as a swelling pressure. In FO, a feed solution, such as wastewater, is placed opposite a draw solution separated by a membrane. Water will flow, with no external pressure applied, from the side with a lower osmotic pressure (feed solution) to the side with the higher osmotic pressure (draw solution). The draw solute is then removed or isolated as a concentrated solution (e.g., by filtration, RO, precipitation, dialysis, vacuum treatment, ultrafiltration, decomposition, etc.), leaving water [T. S. Chung, S. Zhang, K. Y. Wang, J. Su and M. M. Ling, *Desalination,* 2012, 287, 78-81]. Many draw solutes for FO have been tested, ranging from simple inorganic salts to highly designed stimuli-responsive materials, to magnetic nanoparticles. However, while some current state-of-the-art organic draw solutes can induce high osmotic pressures, their complete recovery from a diluted draw solution following FO is not typically possible without the use of energy-intensive, high-cost recovery approaches.

Switchable Polymers as Forward Osmosis Draw Solutes

Jessop et al. first described use of switchable N-containing salts as draw solutes for forward osmosis in 2010 [Jessop, P. G. et al, International Patent application PCT/CA2011/050075, 2011, which is incorporated herein in its entirety], and continued their work focusing on switchable polymers as draw solutes for forward osmosis [Jessop, P. G. et al, International Patent application PCT/CA2011/050777, 2011, which is incorporated herein in its entirety].

Since this early work, others have described the use of switchable N-containing salts or switchable polymers as draw solutes in forward osmosis systems. For example, switchable trimethylamine (TMA), a volatile amine, is currently employed as a draw solute in a process being developed by Forward Water Technologies [Holland, A. M. et al., International Patent application PCT/CA2015/050908, 2015, which is incorporated herein in its entirety]. Bicarbonate salts of liquid amines have been used in FO systems (Stone, M. L.; Rae, C.; Stewart, F. F.; Wilson, A. D. Switchable polarity solvents as draw solutes for forward osmosis. *Desalination* 2013, 312, 124-129; Wilson, A. D.; Stewart, F. F. Deriving osmotic pressures of draw solutes used in osmotically driven membrane processes. *Journal of Membrane Science* 2013, 431, 205-211; Wilson, A. D.; Stewart, F. F. Structure-function study of tertiary amines as switchable polarity solvents. *RSC Advances* 2014, 4, 11039-

11049; Reimund, 2016) where use of the amines enabled the draw solute to be separated from dilute draw solutions (in the form of a liquid) when $CO_2$ was removed. Polymers, such as poly[2-(dimethylamino)ethylmethacrylate] (PDMAEMA), have been used as $CO_2$ and thermal dual-responsive polymers. For example, Cai, Y.; Shen, W.; Wang, R.; Krantz, W. B.; Fane, A.; Hu, X. Dual responsive polymers as draw solutes for forward osmosis desalination. *Chem. Commun.* 2013, 49, 8377-8379 used PDMAEMA with a low molecular weight, as a draw solute for FO desalination. The neutral form of the polymer was water soluble below 40° C. (the lower critical solution temperature, LCST) and water-insoluble above the LCST, such that the polymer could be removed by precipitation by changing the temperature conditions of the system. However, PDMAEMA lacks hydrolytic stability due to the use of a polymer comprising a hydrolysable ester group (van de Wetering, P.; Zuidam, N. J.; van Steenbergen, M. J.; van der Houwen, O. A. G. J.; Underberg, W. J. M.; Hennink, W. E. A Mechanistic Study of the Hydrolytic Stability of Poly(2-(dimethylamino)ethyl methacrylate). *Macromolecules* 1998, 31, 8063-8068). Further, while Cai et al. did not measure osmotic pressure directly, they did determine osmolalities by freezing point depression; and Cai et al. did not obtain a high ratio of osmolalities under $CO_2$ vs under air—a ratio expected to be comparable to a ratio of osmotic pressures. While the polymer was purified by precipitation and freeze drying, the measured osmolalities by freezing point osmometry showed a poor ratio. This poor ratio suggests that there were still contaminants present, or that the polymer had partly hydrolyzed.

Typically, in a forward osmosis system, such switchable draw solutes are added to water or an aqueous solution to form a switchable FO draw solution. This draw solution is put in contact with one side of a semi-permeable FO membrane; a feed solution is placed on the other side. Either before or after being put in contact with the FO membrane, the switchable draw solution is exposed to an ionizing trigger that switches the switchable draw solute from its first, neutral form to its second, ionized form, thereby increasing the draw solution's ionic strength and osmotic pressure. Such conversion of the switchable draw solute to its ionic form also has the effect of increasing the hydrophilicity of the switchable draw solute, potentially further increasing the observed osmotic pressure. Consequently, water moves from the feed solution into the draw solution, across the membrane via forward osmosis, generating a dilute draw solution and a concentrated feed solution. The excess water can then be extracted from the dilute draw solution, to produce fresh water and the switchable FO draw solution; a non-limiting means by which the water can be extracted is RO.

An example embodiment is shown in FIG. 1, where the switchable draw solute 2 is a switchable polymer (Pol); in a draw solution 3. The draw solution 3 is separated from a feed solution 6 by a semi-permeable membrane 4. The feed solution comprises solute 5. After $CO_2$ is injected into the draw solution, bicarbonate anions 7 are formed. The membrane 4 used in the FO step is typically not the same membrane that is used in the RO step. A representative chemical reaction in this process is:

$$Pol_{(aq)}+nCO_2+nH_2O \rightleftharpoons H_nPol^{n*}{}_{(aq)}+nHCO_3^-$$

Figure 2:
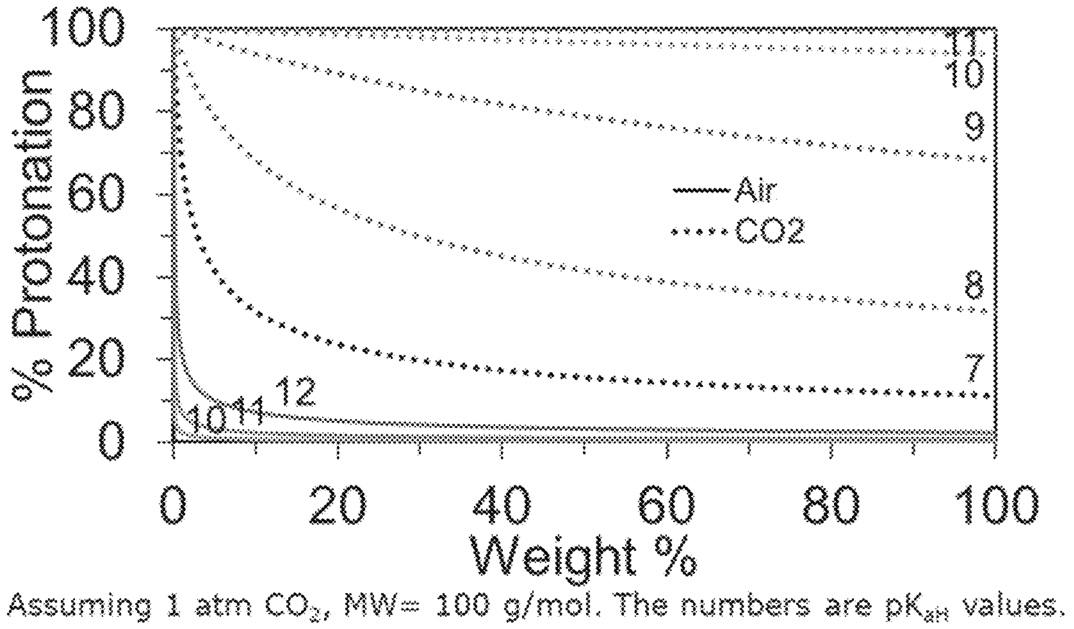
FIG. 2 shows the relationship between the percentage of protonation and the wt % concentration of the polymers in aqueous solutions, and the numbers are $pK_{aH}$ values.

Before exposure to $CO_2$, at least a portion of the switchable polymers in an aqueous solution is a neutral form. When the switchable polymer solution is exposed to $CO_2$, an acid-base reaction takes place such that a higher portion of the switchable polymer is ionized compared to before exposure to $CO_2$. The osmotic pressure of the aqueous solution of the switchable polymer increases when higher portion of the polymer becomes ionized. In some embodiments, the osmotic pressure is controlled by controlling the portion of switchable polymer that is ionized. For example, the time the polymer solution is exposed to $CO_2$ may be controlled, the pressure of $CO_2$ that the polymer solution is exposed to, or the concentration of $CO_2$ in the polymer solution may be controlled. In other words, any applicable common means in chemistry to control the equilibrium of the acid-base reaction can be utilized to control the extent of the ionization of the polymer. For example, FIG. 2 shows the effect of basicity (pKaH) of a molecule (MW=100 g/n) on the percentage of protonation in the presence and absence of 1 atm of $CO_2$. The percent protonation decreases with increasing concentration and decreasing pKaH.

As a result, FO from the feed solution 6 to the draw solution 3, takes place such that at least a portion of water in the feed solution 6 permeates to the draw solution. After at least some water permeates to the polymer solution, the feed solution becomes concentrated with respect to the solutes 5 in the feed solution 6. In some embodiments, the extent of the concentration is controlled by controlling the osmotic pressure of the draw solution. The concentrated feed solution 6 may be removed for further processing or consumption. At the same time, the draw solution 3 is diluted. To restore at least a portion of the switchable polymer, applicable means for drive the equilibrium of the acid-base reaction in favor of the neutral form of the polymer may be employed. For example, $CO_2$ may be removed to drive the equilibrium. In some embodiments, $CO_2$ is removed by reducing the pressure the polymer solution is exposed to, by heating the polymer solution, by agitating the polymer solution, and/or flushing the polymer solution with an inert gas. The inert gas may be nitrogen or argon. By controlling the equilibrium of the reaction, the portion of polymer that is neutral can be controlled. After the portion of the polymer that is neutral increases, at least a portion of water in the draw solution 3 may be removed. In some embodiments, water 8 is removed from the polymer solution by an RO process as shown in FIG. 1. In some embodiments, water is removed from the polymer solution by evaporation, ultrafiltration (UF), microfiltration, or nanofiltration. After removal of water, the remaining polymer solution can be reused for the process, as shown in FIG. 1.

Figure 3:
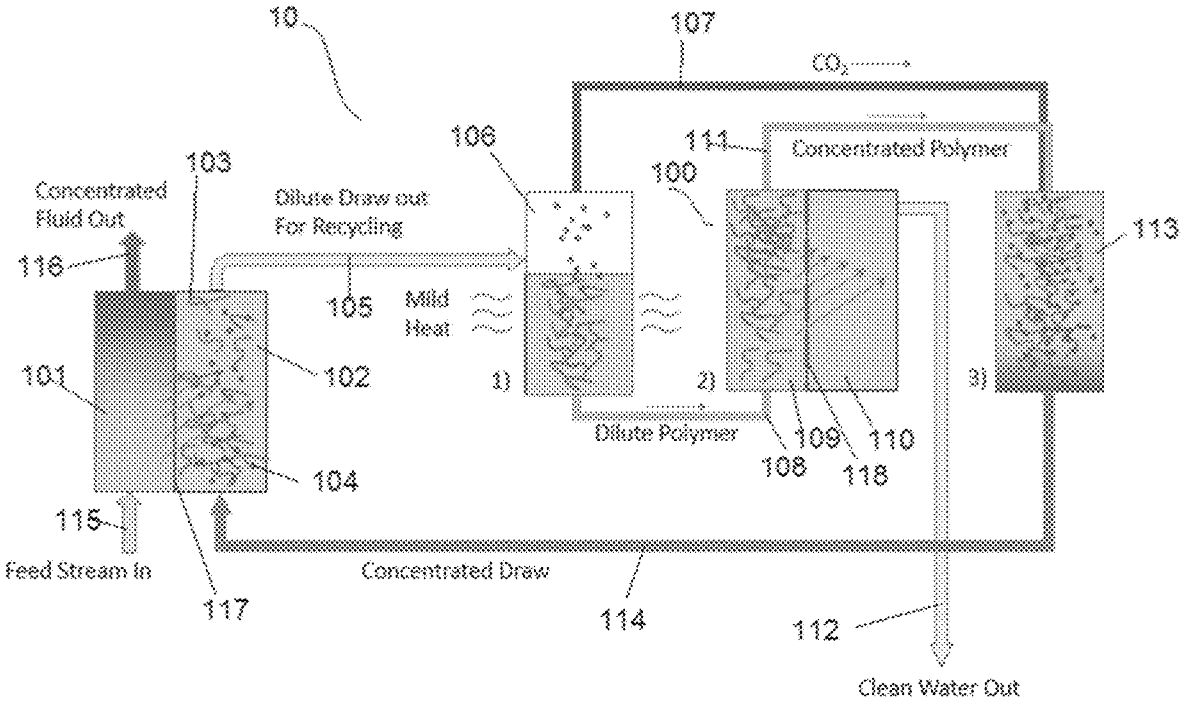
FIG. 3 shows an embodiment of the FO system.

FIG. 3 shows one embodiment of the FO system. The system 10 comprises a feed stream chamber 101 and a draw chamber 102. The feed chamber 101 and the draw chamber 102 are in fluid communication with each other and are separated by a semipermeable membrane 117. Feed stream 115 is fed into the feed chamber 101, and the draw solution is fed into the draw chamber 102. The draw solution and the feed stream comprise a common solvent. The draw solution in the draw chamber 102 comprises polymer 103 and is injected with $CO_2$ (104). Thus, the polymer is protonated, resulting in higher osmotic pressure. The solvent permeates from the feed chamber 101, producing concentrated feed stream 116 and diluting the draw solution 102. The concentrated feed stream 116 is removed from the feed chamber 101. The diluted draw solution is transported by transport means 105 to the degas chamber 106, where the diluted draw solution is subjected to mild heat such that $CO_2$ is removed and the polymer is deprotonated, and the osmotic pressure is lowered. The diluted polymer solution is transported in step 108 to a solvent removal subsystem 100 comprising a polymer solution chamber 109 and a solvent chamber 110.

In some embodiments, the polymer solution chamber 109 and the solvent chamber 110 are separated by a membrane 118. In some embodiments, ultrafilration (UF), microfiltration, nanofiltration, or reverse osmosis is applied to remove the solvent in the polymer solution to the solvent chamber 110. The solvent may is then removed from the solvent chamber 110, and, where the solvent is water, can provide clean water out 112. In some embodiments, the solvent is removed by evaporation. The removed solvent may be reused. The concentrated polymer solution is then transferred at step 111 to a protonation chamber 113, where the solution is exposed $CO_2$ such that the polymer is protonated. In some embodiments, the $CO_2$ is the $CO_2$ recovered from the degassing chamber 106 in step 107. In some embodiments, the protonated polymer solution is transferred in step 114 to the draw chamber 102 as the draw solution.

The working concentration range of the switchable polymer in the draw solute may be ≤50 wt. %, between about 0.5 wt. % to about 50 wt. %, between about 5 wt. % to 50 wt. %, between about 5 wt. % to about 45 wt. %, between about 5 wt. % to about 40 wt. %, between about 5 wt. % to about 35 wt. %, between about 10 wt. % to about 35 wt. %, between about 10 wt. % to about 30 wt. %, between about 10 wt. % and about 25 wt. %, or between about 15 wt. % and about 25 wt. %.

In some embodiments, the polymer is protonated in the draw chamber 102. In some embodiments, the $CO_2$ is maintained at a predetermined pressure in the draw chamber 102 such that the polymer remain protonated.

We have uncovered certain characteristics of the polymer that can aid in selecting a polymer advantageous for use as a switchable draw solute in forward osmosis systems. These characteristics can include: (i) the polymer is preferably substantially water soluble in at least the ionized form, and preferably in both the neutral and ionized forms; (ii) the polymer is preferably relatively neutral in terms of hydrophilicity, for example, has a hydrophilicity of having a Ig(k), the log (base 10) of the octane/water partition coefficient, of about 0, or about 0.2, or at least 0 (iii) the polymer is preferably relatively neutral in hygroscopicity; (iv) due in part to its hygroscopicity, the polymer has an acceptable swelling pressure in aqueous solution, for example a swelling pressure of between 0 and ≤1/2 of the osmotic pressure of the ionized switchable polymer at the same concentration, or about 0. If the swelling pressure is too high, the osmotic pressure of the switchable polymer in the neutral form in aqueous solution will also be too high (e.g., in the absence of an ionizing trigger, such as $CO_2$; or, in the presence of air); (v) the polymer should preferably be in a relatively pure state, meaning that solvents, monomers, salts and other residues of the synthesis are preferably avoided or removed; (vi) the polymer should be relatively free of low molar mass oligomers; where these are present, they should preferably be removed, for example by dialysis, or by utilization of a polymerization method that generates polymer that is not contaminated with oligomers; (vii) the polymer should contain a relatively high number of switchable moieties per gram of polymer, for example, ≥3 mmol, >5.5 mmol, about 3 mmol to about 24 mmol, about 3 mmol to about 23.3 mmol, about 3 mmol to about 18 mmol, about 5.5 mmol to about 24 mmol, or about 5.5 mmol to about 23.3 mmol, or about 5.5 mmol 18 mmol switchable moieties per gram of polymer; (viii) the polymer is substantially neutral in the absence of an ionizing trigger, such as $CO_2$; (vii) the polymer is substantially ionized in the presence of an ionizing trigger, such as $CO_2$; (viii) the polymer to preferably be free or relatively free of groups that could be hydrolyzed during synthesis, use, storage, or contact with water, including such groups as esters, carbonate esters, epoxides, imines, amidines, or guanidines; and, (ix) the polymer to preferably not contain any non-bulky secondary amine groups or non-bulky primary amine groups.

In respect of point (i), it is known that osmotic pressure is proportional to the number of species in solution (see below). Thus, if a switchable polymer is to be used as an effective draw solute in a forward osmosis system, it should be at least substantially water soluble in at least the ionized form in order to provide an osmotic pressure in aqueous solution that is suitable for forward osmosis. Further, it has been found that some switchable polymers, once switched to their neutral forms in aqueous solution, can be precipitated out of solution. However, as would be understood by a person of skill in the art, re-dispersing the switchable polymer in solution once precipitated, and then switching the polymer to its ionized form is difficult. To avoid such complications, it is preferable that the switchable polymer be substantially water soluble in both the neutral and ionized forms.

In respect to points (ii) to (iv), it is desirable for a switchable polymer in the neutral form in aqueous solution (e.g., in the absence of an ionizing trigger, such as $CO_2$; or, in the presence of air) to have the lowest practicable osmotic pressure. This allows for more facile isolation or liberation of water from a dilute draw solution comprising the switchable polymer in the neutral form, for example, by standard, relatively low energy means; for example, dialysis, precipitation, vacuum treatment, ultrafiltration, RO, etc. To maintain the osmotic pressure of a neutral switchable polymer in solution as low as possible, the switchable polymer should not be highly hydrophilic or hygroscopic. If a switchable polymer that is highly hydrophilic or hygroscopic is used as a draw solute, even if the polymer is not ionized or not fully dissolved in an aqueous draw solution, it will still draw water across an FO membrane due to its hydrophilicity. This tendency to draw water to itself, absent any other triggers, is referred to as a polymer's swelling pressure. As such, the osmotic pressure of a neutral switchable polymer in aqueous solution is not only related to the number of species in solution, it can be increased by a polymer's swelling pressure, which can lead to a neutral switchable polymer having an osmotic pressure in solution that is higher than expected or desired. This is not a concern when the switchable polymer is ionized, as the osmotic pressure of the ionized polymer in solution should be as high as possible.

To further maintain the osmotic pressure of a neutral switchable polymer in solution as low as possible, the switchable polymer can be treated, prior to use as a draw solute, to remove any non-polymeric and/or oligomeric contaminants, such as solvents, monomers, salts and other residues of the synthesis, and any oligomers. By doing so, the number fraction of non-polymeric and/or oligomeric contaminants in a sample of a switchable polymer can be kept to a minimum, for example, ≤0.5 or ≤0.3 or ≤0.1 by moles; or, for example, a poly dispersity index (PDI) of ≤1.35 for the switchable polymer may be achieved. H. Vink in 1971 [H. Vink, European Polymer Journal, 1971, Vol. 7, pp. 1411-1419 (incorporated herein by reference) disclosed that osmotic pressures of polymer solutions can be dominated by impurities, such as residual organic solvent or monomer; and, that if dialysis is used to remove those impurities, the osmotic pressure of a neutral polymer may decrease, and instead be affected by loading (concentration) and molecular weight. As such, a switchable polymer can be treated, or purified by ultrafiltration (e.g. dialysis) to remove contaminants. As osmotic pressure values are influenced by the number of species in solution, a consequence of such treatment, or purification is that the number of species is essentially reduced to the switchable polymer itself; as such, when the switchable polymer is in its neutral form, its osmotic pressure in aqueous solution is lower than that of untreated, or non-purified switchable polymers.

Additionally, the osmotic pressure of a neutral switchable polymer in solution may be maintained as low as possible, even at medium or high wt % concentrations, if the polymer is branched or dendritic, as branched or dendritic polymers have smaller hydrodynamic radii than their linear counterparts. As a result of such smaller hydrodynamic radii, a branched or dendritic switchable polymer would have lower viscosities than their linear counter parts. Branched or dendritic polymers have fewer entanglements than linear polymers of the same molecular weight, and consequently have lower viscosities. Low viscosities are desirable in a FO draw solution as it results in higher water fluxes, decreased concentration gradients near the membrane in an FO system, and greater ease in pumping the draw solution throughout the FO system.

In respect of point (v), it is believed that the osmotic pressure of an ionized switchable polymer in solution is largely dominated by the number of charged species in solution (e.g., the negatively charged counter ion associated with the ionized switchable polymer in solution, the nature of which depends on the ionizing trigger; for example, bicarbonate anions). As such, ensuring that a switchable polymer has a high number of switchable moieties per gram of switchable polymer (for example, ≥3 mmol switchable moieties) that can be ionized in the presence of an ionizing trigger will, in general, increase the osmotic pressure of the ionized switchable polymer in aqueous solution. The number of switchable moieties in a homopolymer (a polymer where all of the repeat units are the same) is equal to the number of protonatable N atoms in the repeat unit divided by the molecular weight of the repeat unit. For example, pDMAPMAm has two N atoms in each repeat unit, where one N atom is basic enough to be protonated in carbonated water. The molecule weight of one repeat unit of pDMAPMAm is 170 g/mol. Therefore the number of protonatable sites per gram is =1 mol of sites per mol of repeat units/170 g per mol of repeat units=0.0059 mol of sites per g=5.9 mmol of sites per g.

In respect of points (vi) and (vii), switchable polymers that are more basic are expected to have a higher percent protonation or ionization when exposed to an ionizing trigger, such as $CO_2$, and consequently may have higher osmotic pressures at the same loading as compared to less basic polymers. For example, a polymer with a $pK_{aH}$ of about 9.5-10 (assuming a molecular weight of one monomer unit is ~100 g/n) will have a low percent protonation in air, but will have close to 100% protonation in $CO_2$ in a working concentration range (e.g., less than 40 wt. %). An example of one such switchable polymer includes polyhexamethylene biguanidine ($pK_{aH}$=9.6). Alternatively, if a switchable polymer is relatively less basic, a higher pressure of an ionizing trigger, such as $CO_2$, may be used. For example, increasing $CO_2$ pressure up to about 15 psi $CO_2$ (gauge pressure, relative to atmosphere) may provide a high % protonation or ionization for a switchable polymer in solution having a $pK_{aH}$ between 7-9.

In respect of point (viii), a switchable polymer that comprises hydrolysable groups may undergo hydrolysis during synthesis, use, storage, or contact with water. Such hydrolysis would generate non-polymeric and/or oligomeric contaminants that may affect the switchable polymer's osmotic pressure in solution when in neutral form, in the absence of an ionizing trigger such as $CO_2$. For example, polymers containing hydrolysable groups may undergo hydrolysis of those groups, slowly producing small molecules and thereby increasing the mole fraction of small molecules in the polymer or an aqueous solution thereof. It is considered that this would result in an undesirable increase in the osmotic pressure of an aqueous solution of the switchable polymer under air (i.e., when in neutral form, in the absence of an ionizing trigger such as $CO_2$). Thus, in some embodiments, it is preferred to avoid use of switchable polymers comprising groups such as carbonate esters, epoxides, or imines. In other embodiments, it is preferred to avoid use of switchable polymers comprising groups such as esters, amidines, or guanidines.

In respect of point (ix), a switchable polymer that does not comprise any non-bulky secondary amine groups or non-bulky primary amine groups is preferred, as non-bulky primary and secondary amines are capable of carbamate ion or carbamic acid group formation during switching with an ionizing trigger such as $CO_2$. Removal of carbamate ions or carbamic acid groups in water by heating and/or flushing with an inert gas to switch the carbamate salt back to the neutral amine form can be difficult. Further, formation of carbamic acid groups or carbamate ions is not expected to increase the number of species in solution, meaning that a lower than desired increase in osmotic pressure may be observed when the solution of polymer is exposed to $CO_2$. The only increase in osmotic pressure anticipated would be that due to increased hydrophilicity, which may be insufficient or inefficient for the FO applications as described herein.

Treatment Processes

To meet the foregoing requirements, a switchable polymer may be selected that already meets the requirements, or a switchable polymer may be synthesized such that it meets the requirements. In cases where the polymer is synthesized, a controlled polymerization method may be used to initially reduce the amount of non-polymeric and/or oligomeric contaminants present in the switchable polymer. Examples of such controlled polymerization methods include a controlled radical polymerization, a step-growth polymerization, or an anionic polymerization.

Whether a switchable polymer is selected or synthesized, treatment to remove residual non-polymeric and/or oligomeric contaminants and form a treated switchable polymer can be advantageous. Such treatment can include one or more of dialysis, precipitation, vacuum treatment, ultrafiltration, reverse osmosis, and washing with solvent. While it was expected that increasing the number of solutes in solution would increase a solution's osmotic pressure, and that decreasing the number of solutes should decrease a solution's osmotic pressure, it was not expected that treating a switchable polymer to remove small molecule and/or oligomeric contaminants would impact the switchable polymer's osmotic pressure in the absence of an ionizing trigger (e.g., in the presence of air) such that it would result in a ratio of osmotic pressures (i.e., osmotic pressure in presence of an ionizing trigger (e.g., $CO_2$)/osmotic pressure in absence of an ionizing trigger (e.g., in air)) that was ≥2, ≥6; or, is ≥10; or, is about 15; or, is ≥15, or is ≥16. It had not been realized that small molecule and/or oligomeric contaminants present in a polymeric solute could so significantly affect the osmotic pressures of any resultant solutions in the absence of an ionizing trigger, such as in air. Nor was it expected that the ratio of osmotic pressures with or without an ionizing trigger (e.g., with $CO_2$ vs without $CO_2$) could be more important than the difference between the osmotic pressures. However, it was previously thought that contaminants in the switchable polymer, or solution thereof, would in general have little effect on the difference in osmotic pressures because those contaminants would elevate both osmotic pressures (with and without an ionizing trigger, such as $CO_2$) roughly equally. Only when the importance of the osmotic pressure ratio, and the deleterious effect of contaminants on that ratio, were recognized, was the importance of treating the switchable polymer to remove or avoid impurities understood.

Figure 4:
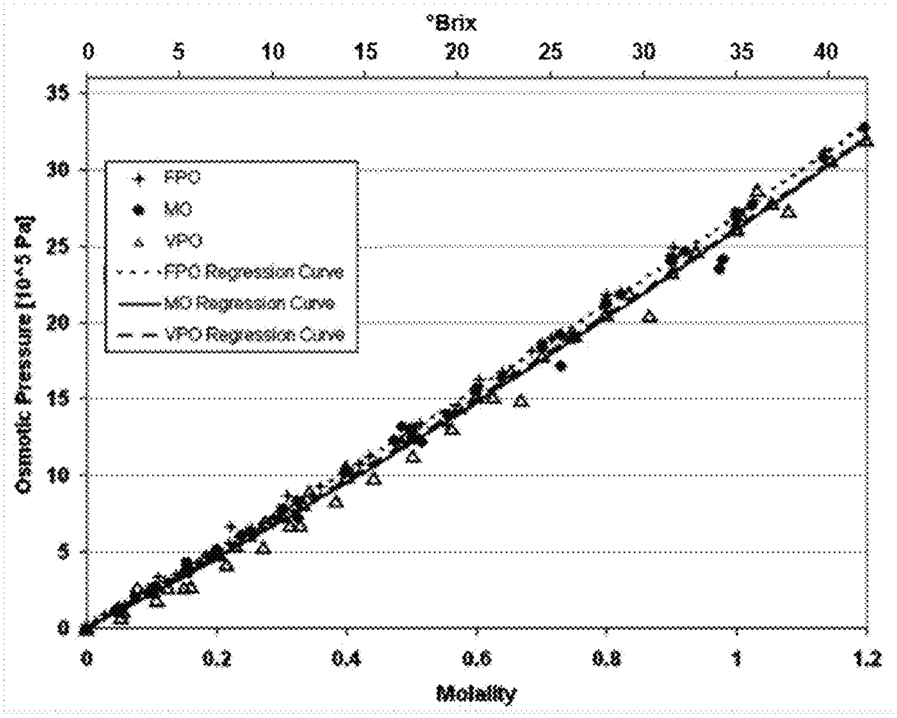
FIG. 4 shows the, osmotic pressures of sucrose solutions in water, measured by three different techniques (freezing point osmometry (FPO), membrane osmometry (MO), and vapour-pressure osmometry (VPO)).

In embodiments, when a switchable polymer as described herein is used as a switchable draw solute in a draw solution in an FO system, and a dilute draw solution is formed by FO, the osmotic pressure of the neutral form of the switchable draw solute in aqueous solution (e.g., in the absence of an ionizing trigger, such as in the presence of air) is preferably low enough to allow effective concentration of the dilute draw solution by RO, ultrafiltration (UF), or microfiltration (MF), etc.; for example, <46 bar, or approximately <40 bar. In other embodiments, the osmotic pressure of the neutral form of the switchable draw solute in aqueous solution (e.g., in the absence of an ionizing trigger, such as in the presence of air) is approximately <10 bar, or approximately <3 bar. In embodiments, the osmotic pressure of the ionized switchable polymer in solution contributing to the ratio of osmotic pressures is approximately equivalent to the osmotic pressure of concentrated orange juice (experimentally determined and described herein as being approximately 46 bar, see below). In other embodiments, the osmotic pressure of the ionized switchable polymer in solution contributing to the ratio of osmotic pressures is approximately equivalent to 50 brix. In some circumstances, it is believed that the osmotic pressure of a solution is positively related to the concentration of the solute. For example, FIG. 4 depicts the osmotic pressures of sucrose solutions in water, measured by three different techniques (freezing point osmometry (FPO), membrane osmometry (MO), and vapour-pressure osmometry (VPO)), where the osmotic pressure is shown as a function of the concentration of sucrose in terms of molality and in terms of brix (plot adapted from Grattoni, A., et al., (2008). *Anal. Chem.* 80, 2617-2622, incorporated herein by reference).

As discussed above, it was considered that, if switchable polymers, such as polymeric amines, were used as draw solutes for switchable FO draw solutions, treating or purifying said polymers may reduce any energy requirements associated with liberating water from the dilute draw solution (e.g., by reverse osmosis). For example: following forward osmosis, $CO_2$ is flushed out of the diluted draw solution, reducing its osmotic pressure to relatively low values. Reverse osmosis (RO) is then used to force any recovered water out of the diluted draw solution, leaving behind the switchable polymer in water/aqueous solution at a concentration required for use as a draw solution (following re-carbonation). Further, polymers are generally considered to be non-flammable, nontoxic, and non-bioavailable, and tend to exhibit little to no crossover in a FO system (wherein a draw solute crosses over the FO membrane into a feed solution); thus use of a switchable polymer as a draw solute, over a small molecule increases safety for workers, decreases risk of health impacts to workers and consumers, and increases a process' efficacy, relative to a small molecule-based FO system.

Applications

Industrial thermal processing of foods may impact the sensorial and nutritional properties of the final consumable product (for example, see FOOD ENGINEERING—Vol. III—*Concentration of Liquid Foods*—Hernandez, Ernesto, 2009, incorporated herein by reference). As such, the treated switchable polymers described herein that meet the above-discussed requirements may be used as draw solutes in osmosis: either Forward Osmosis (FO), or by Forward Osmosis followed by Reverse Osmosis (FO/RO)). Via osmosis, herein described FO systems comprising a switchable polymer as a draw solute are suitable for use in food and beverage-processing industries, where the FO feed solution comprises a precursor consumable to be concentrated or partially concentrated, due to the switchable polymer's inherent non-flammability, nontoxicity, non-bioavailability, and lack of crossover in FO systems (crossover occurs when a draw solute crosses over a FO membrane into the feed solution). Generally, use of FO or FO/RO systems in food and beverage-processing industries offers additional benefits that include: (i) highly concentrated final consumable products; (ii) reduced product volume due to the concentration of precursor consumables; (iii) and higher quality final consumable product with preserved nutritional and sensory properties (e.g., flavors and aromas).

In embodiments, the feed solution of herein described FO or FO/RO systems comprises a precursor consumable, wherein the precursor consumable is dilute (e.g., comprises an aqueous solution) and is to be concentrated or partially concentrated by FO. In embodiments, the precursor consumable is a food product precursor, a dairy product precursor, a beverage product precursor, a syrup precursor, an extracts precursor, or a juice concentrate precursor. In embodiments, the precursor includes fruit juice, nut milk, nut water, beer, wine, whey, coffee, tea, broth, an aqueous vegetable extract (e.g., corn processing for sugar). In other embodiments, the precursor includes orange juice, lemon juice, lime juice, maple sap, apple juice, grape juice, fruit juices, fig juice, sugar cane juice, molasses, milk, coconut milk, coconut water, extracts (e.g., extracts from beans, vanilla beans, seeds, roots, leaves, spices, fragrances, berries, coffee, tea, cannabis, hemp, tobacco, vegetable, or seaweed), soup, stock, broth, or partially concentrated versions of any one or more of the foregoing, or mixtures thereof.

In other embodiments, herein described FO or FO/RO systems are suitable for production of freshwater by desalination of seawater or brackish water; or, to at least partially dewater wastewater, process water, or other industrial aqueous solutions. In other embodiments, herein described FO or FO/RO systems are suitable for processing and/or concentrating bio-therapeutic proteins, food proteins, monoclonal antibodies (MAbs), and/or therapeutic proteins (e.g., immunoglobulins (IgGs), albumins, BSA, etc.) as FO processes are known to have a low impact on higher structure proteins or complex molecules. In other embodiments, herein described FO or FO/RO systems are suitable for concentrating dyes, and may decrease loss of dyes or essential salts and increase dye quality and concentration.

In other embodiments, herein described FO or FO/RO systems are suitable for concentrating wastewater such as that produced by residential buildings, municipalities, or industrial processes. Examples of industrial processes that may use herein described FO or FO/RO systems for wastewater cleanup, or for concentrating aqueous mixtures include: dyeing of fabrics, pharmaceutical processing, biomass conversion, algae growth, agriculture, fermentation, nuclear power generation, or geothermal power generation.

In particular, biomass utilization or conversion processes may benefit from use of herein described FO or FO/RO systems because of their frequent need for water management, water removal, and concentrating of aqueous mixtures. Examples of such biomass utilization processes include: conversion of sugars (e.g. sucrose, xylose, glucose, fructose and the like), polysaccharides (e.g. cellulose, starch, hemicellulose, inulin, xylan, chitin, and the like), wood, lignocellulose, grass, microalgae, macroalgae, bacteria, bagasse, stover, agricultural waste, compost, or manure. These conversion processes may involve heating, fermentation, biomass growth, or catalysis (e.g. by enzymes, whole cells, yeast, antibodies, acids, bases, bacteria, metals, heterogeneous catalysts, homogeneous catalysts). Further, use of herein described FO or FO/RO systems in applications such as biomass conversion and fermentation provides benefits such as non-toxicity, non-bioavailability, and lack of reverse salt flux of the switchable polymers as switchable draw solutes. As such, switchable draw solutes are considered unlikely to kill, inhibit, poison, or otherwise interfere with catalysts such as enzymes, yeast, whole cells, antibodies, or bacteria.

In other embodiments, herein described FO or FO/RO systems are suitable for concentrating solutions of colourants such as dyes or pigments, either during their production (e.g. after extraction from natural sources), in preparation for their use, or in cleanup of wastewater containing colourants. Examples of such colourants include carminic acid, carmine, rose madder, indigo, Tyrian purple, saffron, crocine, mauveine, erioglaucine, tartrazine, or gamboge.

EXAMPLES

Example 1: Switchable Polymers as Forward Osmosis Draw Solutes

As described herein, $CO_2$-switchable polymers with high nitrogen: carbon ratios were synthesized, their ability to act as FO draw solutes was confirmed. This include the following polymers: poly(N,N-dimethylallylamine) (PDMAAm), poly(N,N-dimethylvinylamine) (PDMVAm), linear-poly(N-methylethylenimine) (I-PMEI), branched-PMEI (b-PMEI), poly(N-methylpropenimine) (PMPI), poly(diallylmethylamine) (PDAMAm), Poly(N-methylbutyleneimine) (PMBI), Poly(tert-butylaminoethylamino methacrylate) (P(tBAEMA)), Poly(N,N—(N',N'-dimethylaminopropyl) allylamine) (PDMAPAAm), reduced-poly(N,N-dimethylaminopropyl methacrylamide) (red-PDMAPMAm), Poly(N,N,N',N'-tetramethyl-2-butene-1,4-diamine) (PTMBD), $N^1$,$N^1$-(butane-1,4-diyl)bis($N^1$-(3-(dimethylamino) propyl)-$N^3$,$N^3$-dimethylpropane-1,3-diamine) (DGEN1), and $N^1$,$N^{1'}$, $N^{1''}$, $N^{1'''}$-((Butane-1,4-diylbis(azanetriyl))tetrakis (propane-3,1-diyl))tetrakis($N^1$-(3 (dimethylamino) propyl)-$N^3$,$N^3$-dimethylpropane-1,3-diamine) (DGEN2).

Scheme 2

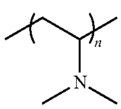

PDMVAm

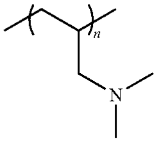

PDMAAm

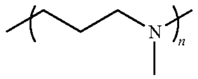

PMPI

-continued

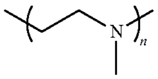

I-PMEI

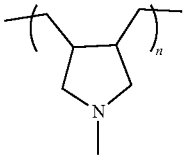

PDAMAm

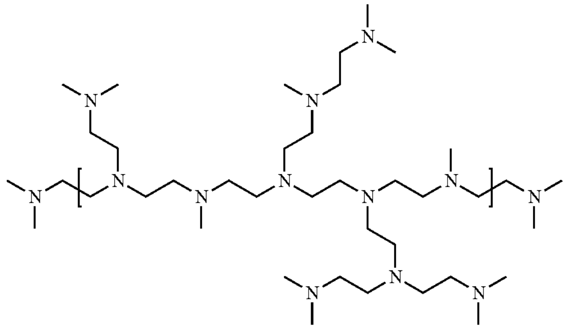

b-PMEI

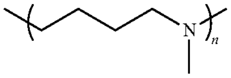

PMBI

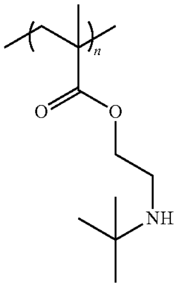

P(tBAEMA)

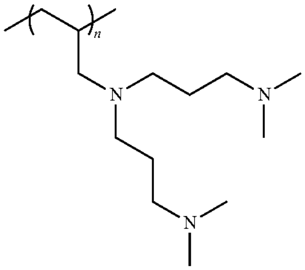

PDMAPAAm

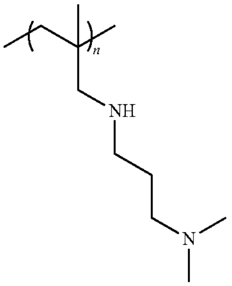

red-PDMAPMAm

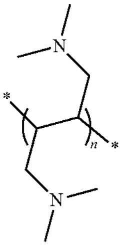

PTMBD

-continued

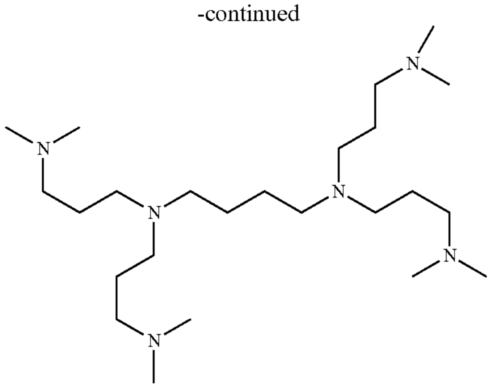

DGEN1

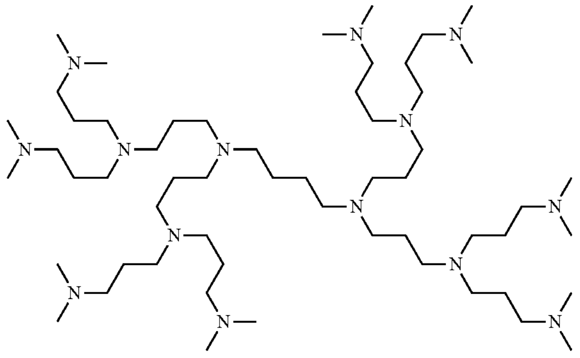

DGEN2

Materials and Procedures

Chlorobenzene, 2-ethyl-2-oxazoline, methyltriflate, diisopropylamine, formaldehyde solution (37%), sodium methoxide solution (35%), chloroform, tetrahydrofuran (THF), dimethyl acrylamide, basic aluminum oxide, tetrahydrofuran, lithium aluminum hydride powder, magnesium sulfate, branched poly(ethyleneimine) (b-PEI), diallylamine and 2,2'-azobis(2-methylpropionamidine) dihydrochloride (AAPH) were obtained from Sigma, and used as received. 2,2'-Azobis(2-methylpropionitrile) (AIBN) was obtained from Sigma, and was recrystallized from ethanol before use. Diethylether, hexanes, methanol were obtained from ACP. Acetone, concentrated hydrochloric acid, formic acid were obtained from Fisher Scientific. Sodium hydroxide pellets were obtained from Acros. Poly(allylamine) (15 wt % solution, molecular weight=15 kDa) was obtained from Poly-Sciences Inc. Dialysis tubing (1 kDa, 3.5, and 10 kDa Molecular weight cut-off (MWCO)) was obtained from VWR. All water used was obtained from a Millipore system, with a resistivity of 18.2 MΩ·cm (Millipore water). Argon gas (4.8) was obtained from Praxair.

Characterization $^1$H NMR spectroscopy was used to determine monomer conversion and sample purity. $CO_2$ is of supercritical chromatographic grade, 99.998%, obtained from Praxair, and used as received. GPC was used to determine the molecular weight and molecular weight distribution of each polymer. Viscosity was measured using Cannon-Fenske type viscometer (tube size 200) at 25° C. Cloud points were measured using a Cary 300 Bio temperature controlled UV-visible spectrometer at 700 nm. The pKaH values (i.e., the pKa of the conjugate acids) of the polymers synthesized in this work were determined by titration. Polymer solutions were prepared at concentrations of 5-10 mg/mL and acidified to pH 3 with HCl. The solutions were stirred and titrated with 0.1 M NaOH solution to pH 12. The pH values were gathered using a Vernier pH sensor coupled to Logger Pro software. The pKaH was taken as the pH where the second derivative of the pH vs. volume of base function was equal to zero.

Synthesis

Synthesis of poly(N,N-dimethylallylamine) (pDMAAm)

Poly(N,N-dimethylallylamine) was synthesized using standard conditions for an Eschweiler-Clarke methylation with formaldehyde and formic acid [R. Tanaka, M. Koike, T. Tsutsui and T. Tanaka, J. Polym. Sci. Polym. Lett. Ed., 1978, 16, 13-19]. Poly(allylamine) (Polyscience, molecular weight=15 kDa; 20 g) was dissolved in formic acid (55 mL), and 37% formaldehyde solution (110 mL). Resulting solution was refluxed for 48 h. Solvent was removed under vacuum, followed addition of concentrated hydrochloric acid (150 mL). Resulting solution was stirred for 30 min, then the solvent (water) was removed under vacuum. Resulting solid was dissolved in 30 wt. % sodium methoxide solution (100 mL). Salt was filtered off, and solvent (methanol) was removed under vacuum. The final product was purified by dialysis (3.5 kDa MWCO tubing), affording a polymer with a molecular weight of 24 kDa.

The GPC analysis of PDMAAm was performed using 0.3 wt. % LiBr and 0.3 M formic acid in HPLC grade water as the eluent. Samples were prepared at 1 mg/mL and passed through a 0.2 μm filter prior to injection. The samples were analyzed on an Agilent triple detection GPC equipped with PSS NOVEMA Max Lux analytical and PSS NOVEMA Max Lux columns at 40° C. and 1 mL/min. The light scattering detector was calibrated using poly(2-vinylpyridine) standards. The dn/dc value (0.151) was measured by refractometry analysis using a Wyatt Optilab rEX refractive index detector.

Alternative Synthesis of poly(N,N-dimethylallylamine) (pDMAAm)

All reactions and purification were carried out inside a standard fume hood, using quick connect glassware, inside adequate secondary containment. All reactions were carried out under high purity nitrogen gas delivered from the blow off of two liquid nitrogen dewars that was further purified to ultrahigh purity standards. Allylamine (98%) was purchased from Aldrich, VA-044 (((E)-1,2-bis(2-(4,5-dihydro-1H-imidazol-2-yl) propan-2-yl)diazene), 98%) was purchased from Fisher. Hydrochloric acid (12 M, ACS grade) was purchased from Millipore. Formaldehyde (ACS reagent, 37 wt. % in $H_2O$, containing 10-15% Methanol as a stabilizer) was purchased from Aldrich, and formic acid (98%) purchased from Aldrich, acetone (ACS grade) was purchased from Fisher, NaOH (98.8%) was purchased from Anachemia. All materials were used as received without further purification. Deionized water was purified in-house to >15 MΩ·cm. Ultrafiltration cell (UHP 90-600 mL stirred polymeric cell) and membranes (Suez-GE GK Membranes, PA-TFC, MWCO 3000 Da) were purchased from Sterlitech.

Poly(dimethylallyl amine) was synthesized via a three-step synthetic route (see Scheme 3). First allyl amine was protonated to form allylammonium chloride, which can be polymerized through a radical polymerization in water. The resulting reaction mixture was then carried through to the dimethylation reaction using formic acid and formaldehyde.

Figure 6:
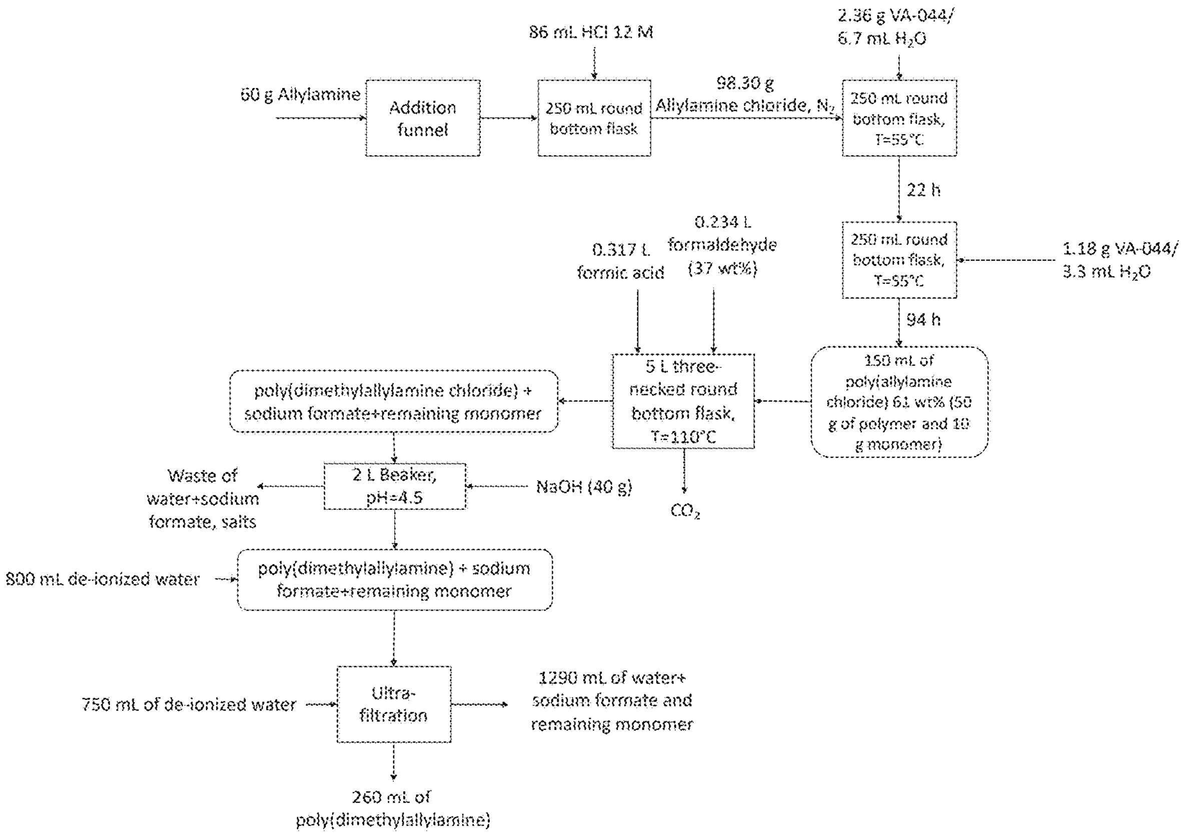

FIG. 6 shows a block flow diagram for the overall process. The final dimethylallyl amine polymer solution was purified through ultrafiltration to yield 221.15 g (260 mL) of 23 wt % solution.

Scheme 3. Synthesis route to pDMAAm

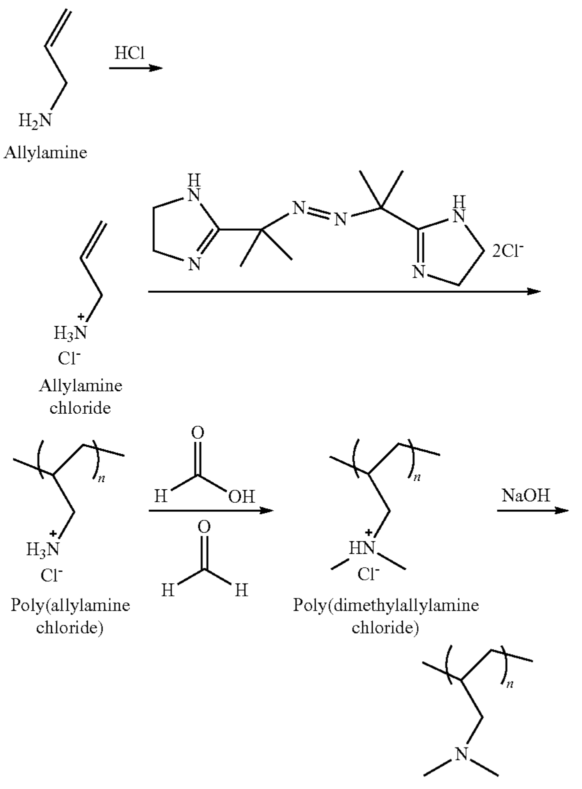

Allylamine

Allylamine chloride

Poly(allylamine chloride)

Poly(dimethylallylamine chloride)

Poly(dimethylallyl amine)

As illustrated in FIG. 6, 60 g of Allylamine was transferred to a 150 mL addition funnel that is connected to a 250 mL round bottom flask, which contains 86 mL of 12 M HCl. The round bottom flask was placed in a liquid nitrogen bath and with stirring the allylamine was added drop-wise to produce allylammonium chloride. The resulting allylammonium chloride solution was transferred to a 3-neck 250 ml round bottom flask equipped with a condenser and an addition funnel that contains 3.56 g of initiator VA-044 ((E)-1,2-bis(2-(4,5-dihydro-1H-imidazol-2-yl) propan-2-yl) diazene) dissolved in 10 mL of de-ionized water. Both the monomer solution (round bottom flask) and the initiator solution (addition funnel) were purged with nitrogen for 1 hr, using a 16G needle with an outer diameter of 1.651 mm and an inner diameter of 1.194 mm. After purging, the round bottom reaction flask temperature was set to 55° C. and the initiator (6.7 mL of the solution) was transferred to the monomer solution dropwise over 1 h. After 22 h, a 5 mL sample was withdrawn from the reaction mixture using a syringe with a needle. This sample was analyzed by proton NMR to assess reaction conversion. The conversion was determined by integrating the signal from —$CH_2$— (C') at 3.45 ppm from the monomer and the signal from —$CH_2$— (c) at 3.00 ppm from the polymer. After this the remaining 3.3 mL of the initiator solution was added to the reaction mixture and heating at 55° C. was continued. After 94 h the reaction was stopped by placing the 3-neck 250 ml round bottom flask into an ice bath. Monomer conversion was monitored by NMR in $D_2O$ at 22 and 96 h. No further purification was carried out.

For the polymerization of allylammonium chloride, the monomer conversion at 22 h was 67.42% and at 94 h was 81.93% based on $^1$H-NMR analysis. The $^1$H-NMR spectra at 22 h shows the characteristic broad signals of the polymer at 1.3, 1.9 and 2.9 ppm. The remaining monomer is observed at 3.4, 5.3 and 5.8 ppm.

The $^1$H-NMR spectra at 94 h shows the characteristic broad signals of the polymer at 1.3, 1.9 and 2.9 ppm. The remaining monomer is observed at 3.4, 5.3 and 5.8 ppm.

Figure 5:
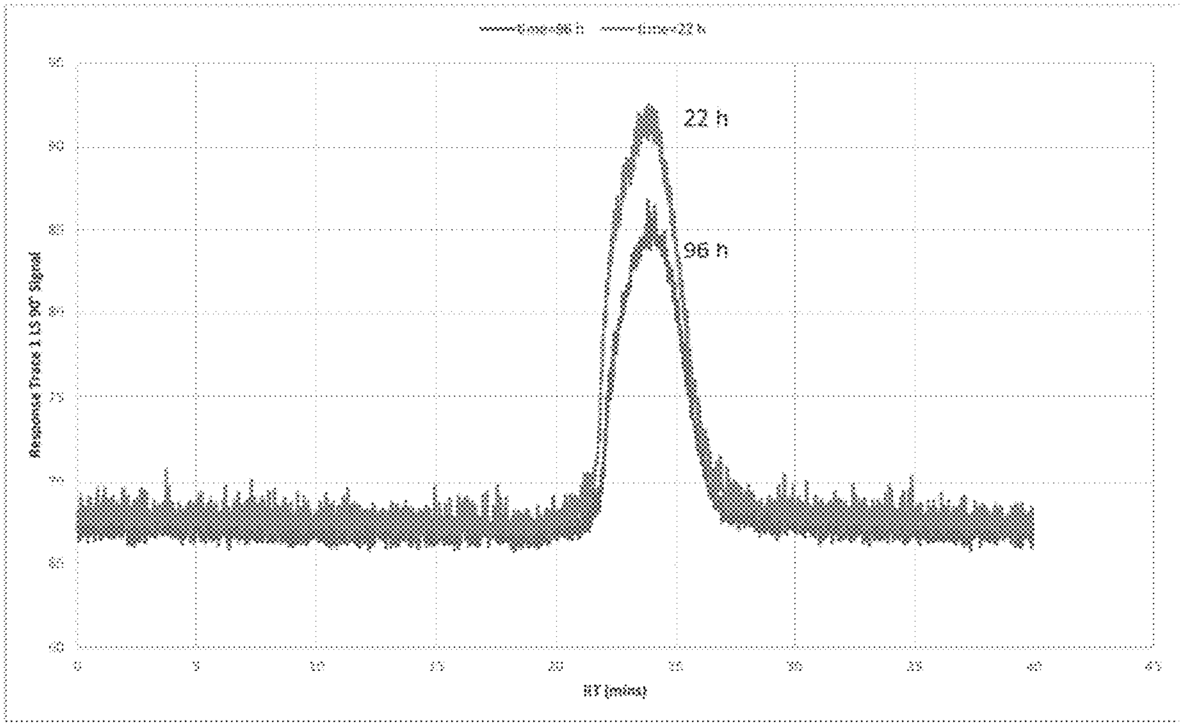
FIG. 5 shows the GPC of Poly(allyl ammonium chloride) after 22 hours and 94 hours of reaction.

The polymer samples withdrawn at 22 and 94 h were analyzed by GPC (aqueous) using light scattering as the detector. Table 1 shows the molecular weight distribution data for both samples and FIG. 5 shows the GPC traces.

TABLE 1

| | Mp (g/mol) | Mn (g/mol) | Mw (g/mol) | Mz (g/mol) | Mz + 1 (g/mol) | Mw/ Mn |
|---|---|---|---|---|---|---|
| time = 22 h | 20449 | 17789 | 27249 | 46131 | 88630 | 1.53 |
| time = 96 h | 17456 | 16070 | 22481 | 31342 | 41187 | 1.39 |

$^1$H NMR (400 MHz, $D_2O$, δ. ppm) of poly(allyl ammonium chloride): 1.2-1.4 (s, 4CH2, 2H); 1.8-2.0 (s, CH, 1H) and 2.9-3.0 (s, CH2, 2H).

$^1$H NMR (400 MHz, $D_2O$, δ. ppm) of impurities (allyl ammonium chloride): 3.5 (d, CH2, 2H); 5.3 (m, CH2, 2H) and 5.8 (m, CH, 1H).

The reaction mixture containing poly(allylammonium chloride) and allylamine chloride was used to synthesize pDMAAm as described below.

A 5 L three-necked round bottom flask equipped with a condenser (connected to a chiller at 2° C.) was placed on a hotplate with a 5 L heating block, inside a large secondary container. The exit of the condenser was connected to a gas bubbler in order to monitor the evolution of carbon dioxide (produced from the reaction). The 5 L three-necked flask was charged with a stir bar and 150 mL of the poly (allylammonium chloride) reaction mixture formed earlier, which contained approximately 50 g of polymer and 10 g of allylamine chloride. One of the three necks was attached to an addition funnel (loaded with 0.317 L of formic acid 98%) and a temperature probe was adapted to the other neck. Based on observation from small scale experiments, the solution is not very viscous therefore a magnetic stir bar is enough to keep stable stirring. The acid was added dropwise (under stirring) to the polymer solution. After addition of the acid, the addition funnel was swapped for a new addition funnel, which is loaded with 0.234 L of aqueous formaldehyde (37 wt %) solution. Then the formaldehyde solution is added dropwise to the reaction mixture. After complete addition, the addition funnel was removed, and the round bottom flask neck was capped with a glass stopper. The temperature was monitored during the reaction, The mixture was gradually heated to and maintained at 110° C., and the evolution of gas was monitored. The reaction was monitored constantly during the first 3 hours (evolution of $CO_2$) in order to ensure that evolution of $CO_2$ was stable, as well as condensation from reflux. Heating was continued for 72 h, while the evolution of $CO_2$ was monitored. To confirm that the methylation was completed, the reaction mixture was sampled (1 mL) using a syringe at 24 and 48 h. The sample was precipitated in acetone and a $^1$H-NMR analysis was carried out in $D_2O$. After 72 h, the heating was turned off and the three neck round bottom flask was allowed to cool down to room temperature.

The dimethylation reaction mixture was sampled at 24, and 48 hours. At 48 h, according the NMR analysis, the methylation was completed, but the reaction was allowed to run for a total of 72 h to ensure complete $CO_2$ generation. The $^1$H-NMR spectra of the sample at 48 h confirms that the dimethylation was successful and it showed the characteristic broad signals of the poly(dimethylallyl amine) at 1.3, 1.9, 2.75 and 3.2 ppm. Impurities were also observed, such as the remaining allylamine chloride converted to the dimethylated product (signal at 2.6 ppm), sodium formate 8.10 ppm and acetone from the precipitation step.

The solution (0.70 L approximately) was transferred to a 2 L beaker, containing a large magnetic stir bar, and the beaker was placed inside an ice bath on a stirring plate. After the reaction mixture was transferred to the 2 L beaker, the pH was raised to 4.5 using NaOH pellets, in which process approximately 40 g were slowly added. At this point, the polymer precipitates out of the solution as poly(N,N-dimethylallylamine). The polymer was filtrated and dissolved in 800 mL of de-ionized water. The polymer solution was submitted to ultrafiltration in order to remove impurities such as sodium formate and remaining monomer using an ultrafiltration cell AMI Model UHP-90 at 4.0 bar of pressure under nitrogen, equipped with a polypropylene membrane with a pore size of 0.2 μm, and a diameter of 90 mm. The polymer solution was added to the UF cell, and fresh de-ionized water (750 mL) was added and filtered through. At the end, approximately 221.15 g (260 mL) of poly (dimethylallylamine) solution (22.93 wt %, 50.8 g of polymer) and 1290 mL of waste water (containing sodium formate and previously mentioned impurities) were obtained. The conductivity of the final polymer solution was 960 μS/cm.

The $^1$H-NMR spectra of the poly(dimethylallylamine) confirmed that the ultrafiltration was successful since impurities were not observed and it showed the characteristic broad signals of the poly(dimethylallylamine) at 1.0-1.6 and 2.10 ppm.

The characterization of Poly(N, N-dimethylallyl ammonium chloride) by $^1$H NMR (400 MHz, $D_2O$, δ. ppm) showed the following: 1.2-1.4 (s, $CH_2$, 2H); 1.8-2.0 (s, CH, 1H); 2.6-2.8 (s, $CH_3$, 6H) and 3.1-3.4 (s, $CH_2$, 2H).

The characterization of poly(N,N-dimethylallyl amine) by $^1$H NMR (400 MHz, $D_2O$, δ. ppm) showed the following: 1.2-1.4 (s, $CH_2$, 2H); 1.8-2.0 (s, CH, 1H) and 1.9-2.2 (s, $CH_3$, $CH_2$, 8H).

The characterization of impurities (dimethylallyl ammonium chloride) by $^1$H NMR (400 MHz, $D_2O$, δ. ppm) showed the following: 2.7 (s, $CH_3$, 6H); 3.5 (d, $CH_2$, 2H); 5.3 (m, $CH_2$, 2H) and 5.8 (m, CH, 1H).

Waste water analysis—Sodium Formate: $^1$H NMR (400 MHz, $D_2O$, δ. ppm): 8.5 (s, CH, 1H).

The waste water recovered after ultrafiltration was analyzed by $^1$H-NMR in $D_2O$ in order to confirm what it contained. The $^1$H-NMR spectra confirms that the mainly sodium formate (8.5 ppm) and traces of monomer (3.6 and 3.8 ppm).

Synthesis of Linear PDMAAm

N,N-Dimethylacrylamide (DMA) was obtained from Millipore-Sigma, and was passed through an inhibitor removal column before use. 2,2'-Azobis(2-methylpropionitrile) (AIBN) was obtained from Millipore-Sigma and was recrystallized from ethanol before use. Tert-dodecylmercaptan (trDDM), tetrahydrofuran, 4-methylmorpholine, lithium aluminum hydride powder, magnesium sulfate were obtained from Millipore-Sigma and used as received. Hexanes was obtained from ACP. Acetone and ethyl acetate were obtained from Fisher Scientific. Sodium hydroxide pellets were obtained from Acros. Dialysis tubing (1 kDa MWCO) was obtained from Thermo Scientific. Deionized water with a resistivity of 18.2 MΩ·cm was obtained from a Synergy Millipore system. $CO_2$ (Supercritical Chromatographic Grade, 99.998%, Praxair) was used as received.

An exemplary synthesis of this embodiment is represented in Scheme 4.

Scheme 4

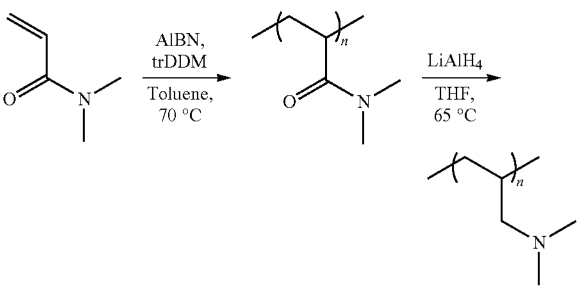

DMA (20 ml), AIBN (0.428 g, 0.029 mol/l, 2.14 wt % of monomer) and trDDM (1 wt. % relative to monomer) were dissolved in toluene (70 mL) and added to a 250 mL flame dried Schlenk flask. The mixture was purged with argon and heated to 70° C., with stirring at 500 rpm. After 6 hours of reaction at 70° C., the flask was cooled to room temperature. The resulting PDMA polymer was purified from residual monomers by triple precipitation into hexanes and dried in a vacuum oven at 50° C. for 24 h.

A flame dried 500 mL three neck round bottom flask was equipped with a stir bar. The three necks of the flask were connected to a condenser, a Schlenk line and a septum. The flask was evacuated and refilled with argon three times. Lithium aluminum hydride (pellets, 3.85 g) were added to the flask and dispersed in 4-methylmorpholine (80 mL). The mixture was heated to and maintained at 65° C. PDMA (10 g) was dissolved in 4-methylmorpholine (100 mL) in a 250 mL round bottom flask. The PDMA solution was added dropwise to the $LiAlH_4$ solution by syringe via the septum, with strong stirring (>700 rpm). After 20 h, THF (35 mL) was added dropwise by syringe via the septum. After another 20 h, the flask was cooled in an ice bath and deionized water (4 mL) was added dropwise, followed by 15 wt. % sodium hydroxide solution (5 mL) and then more water (10 mL). The flask was warmed to room temperature and stirred until the precipitated polymer dissolved. Anhydrous magnesium sulfate was added until the precipitate clumped at the bottom of the flask. The solid phase was removed by gravity filtration and washed twice with ethyl acetate. The solvent was removed from the filtrate under vacuum. The polymer was then re-dissolved in ethyl acetate, the solution was centrifuged, and the supernatant was transferred to a new flask and evaporated to dryness. The resulting poly(N,N-dimethylallylamine) was dissolved in water and purified by dialysis (3.5 kDa MWCO tubing). The $^1$H NMR spectrum showed. $M_w$=12.4 kDa, $M_n$=10.7 kDa, D=1.2. $pK_{aH}$=7.72±0.06.

GPC—0.3 wt. % LiBr, 0.3 M formic acid in HPLC water: Mw=12.4 kDa, Mn=10.7 kDa, D=1.2

GPC—DMF+1 mM LiBr: Mw=18.5 kDa, Mn=8.0 kDa, D=2.3

Figure 7:
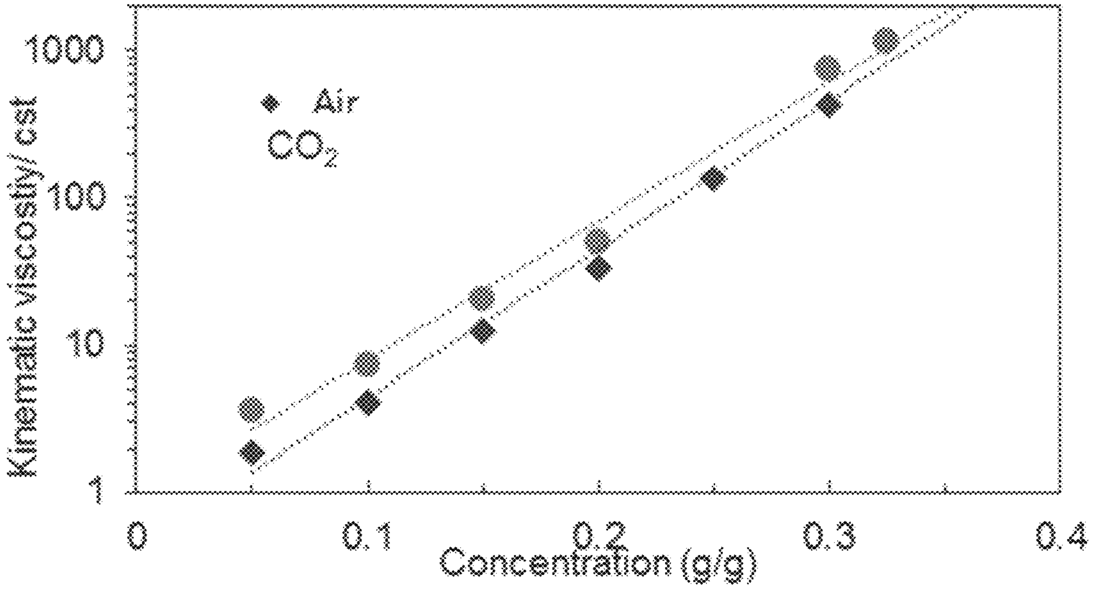
FIG. 7 shows the dependence of kinematic viscosity on the concentration of aqueous solutions of the linear PDMAAm synthesized by the synthesis of Scheme 4 under air or $CO_2$ at 25° C.

Viscosity of the linear PDMAAm is shown in FIG. 7.

Synthesis of Branched PDMAAm (b-PDMAAm)

Two types of b-PDMAAm were synthesized. The first type includes N,N'-methylenebis(acrylamide) as crosslinker, and the second type includes divinylbenzene as crosslinker. Both of which are shown in Scheme 5.

Scheme 5

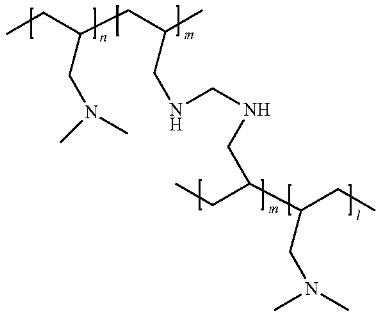

b-PDMAAm including N,N'-methylenebis(acrylamide) as crosslinker

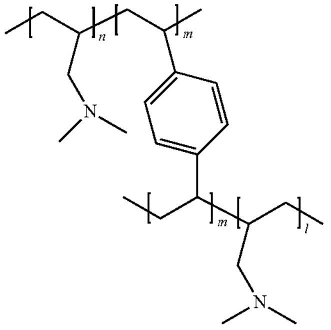

b-PDMAAm including divinylbenzene as crosslinker

Branched poly(N,N-dimethylallylamine) (b-PDMAAm) was synthesized by free radical polymerization of N,N-dimethylacrylamide (DMA) in the presence of difunctional comonomer (DM) as crosslinker and chain transfer agent (CTA) followed by reduction of the resulting polymer to b-PDMAAm with lithium aluminium hydride ($LiAlH_4$).

Synthesis of branched poly(N,N-dimethylacrylamide) was described before by F. Isaure et al. (F. Isaure et al. (2006). *Reactive and Functional Polymers,* 66 (1), 65-79. doi: 10.1016/j.reactfunctpolym.2005.07.009, incorporated herein by reference). The authors there used different difunctional monomers (ethylene glycol dimethacrylate (EGDMA), diethylene glycol dimethacrylate (di-EGDMA), tetraethylene glycol dimethacrylate (tetra-EGDMA)) and CTA 1-dodecanthiol to initiate branching. It was shown in the article that crosslinking can be avoid by using a proper ratio between DM and CTA.

In the synthesis here, N,N'-methylenebis(acrylamide) (MBA) and divinylbenzene (DVB) were used as crosslinkers and tert-dodecanthiol as CTA at different concentrations and ratios to control degree of branching.

Reduction of b-PDMA to b-PDMAAm was carried out using the same method as I-PDMAAm. The resulting branched poly(N,N-dimethylallylamine) was dissolved in water and purified by dialysis (1 kDa MWCO tubing).

In one embodiment, DMA (15 ml, 0.1456 mol), AIBN (1.97 mmol or 1.46 mmol), MBA (0.73 mmol or 1.46 mmol or 2.91 mmol or 5.82 mmol) and trDDM (0.73 mmol or 1.46 mmol or 2.91 mmol or 4.37 mmol or 5.82 mmol or 8.73 mmol or 11.65 mmol) were dissolved in toluene (58 mL) and added to a 250 mL flame dried Schlenk flask. The mixture was purged with argon and heated to and maintained at 70° C., with stirring at 500 rpm. After 6 h, the flask was cooled to room temperature. The resulting polymer was purified from residual monomers by triple precipitation into hexanes and dried in a vacuum oven at 50° C. for 24 h. For polymers with DVB as a crosslinker, 0.73 mmol or 1.46 mmol of DVB were added instead of MBA. Feed ratios and molecular weights of synthesized polymers are shown in Table 2.

TABLE 2

Characteristics of branched poly(N,N-dimethylacrylamide) polymers

| | Feed ratio (mol) | | | Mw, | Mn, | | $[\eta]_{DMF+LiBr}$, | | |
|---|---|---|---|---|---|---|---|---|---|
| Sample | AIBN | Crosslinker | CTA | kDa | kDa | D | $cm^3/g$ | α | g' |
| A1-linear | 1.35 | — | 0.5 | 18.5 | 8.0 | 2.3 | 0.131 | 0.607 | — |
| M-1 | 1.35 | 0.5 | 0.5 | 150.3 | 16.9 | 8.9 | 0.114 | 0.561 | 0.87 |
| M-2 | 1.35 | 0.5 | 1 | 60.4 | 7.08 | 8.5 | 0.133 | 0.396 | 1.0 |
| M-3 | 1 | 1 | 1 | | | | GEL | | |
| M-4 | 1 | 1 | 2 | 52.7 | 4.5 | 11.8 | 0.06 | 0.691 | 0.46 |
| M-5 | 1 | 1 | 4 | 10.7 | 3.3 | 3.2 | 0.055 | 0.433 | 0.42 |
| M-6 | 1 | 2 | 4 | 49.0 | 4.1 | 11.9 | 0.104 | 0.314 | 0.79 |
| M-7 | 1 | 2 | 6 | 16.8 | 3.3 | 5.2 | 0.075 | 0.337 | 0.57 |
| M-8 | 1 | 4 | 8 | 75.2 | 3.3 | 23 | 0.071 | 0.291 | 0.54 |
| M-9 | 1 | 1 | 3 | 20.8 | 5.9 | 3.5 | 0.105 | 0.4 | 0.8 |
| D-1 | 1.35 | 0.5 | 0.5 | 52.0 | 5.1 | 10.2 | 0.109 | 0.418 | 0.83 |
| D-2 | 1.35 | 0.5 | 1 | 20.8 | 3.0 | 6.9 | 0.1 | 0.578 | 0.76 |
| D-3 | 1 | 1 | 1 | 139.7 | 12.3 | 11.4 | 0.134 | 0.512 | 1.0 |
| D-4 | 1 | 1 | 2 | 26.5 | 2.5 | 10.7 | 0.084 | 0.371 | 0.64 |

It is expected that incorporating a degree of branching into PDMAAm would reduce the viscosity compared to linear PDMAAm.

Different degree of b-PDMAAm branching was achieved by changing the DM and CTA concentration in DMA polymerization mixture. Determination of reliable molecular weights and branching degree of b-PDMAAm using triple detection GPC with aqueous eluent containing 0.3 wt. % LiBr and 0.3M formic acid was challenging. For this reason molecular weights and branching degree were determined for polymeric precursors poly(N,N-dimethylacrylamide) using triple detection GPC with DMF containing 1 mM LiBr (Table 2).

For determination of branching degree two parameters were analyzed. First, the Mark-Houwink exponent α (shape parameter) is related to the shape and compactness of a polymer in a given solvent. α was calculated from molecular weight dependence of intrinsic viscosity (Mark-Houwink equation) by triple detection GPC:

$$[\eta]=KM_w^{\alpha}$$

Usually, 0.3<α<0.5 for hyperbranched polymers and 0.5<α<1 for a linear polymer in a good solvent (S. B. Kharchenko et al. (2003). *Role of Architecture on the Conformation, Rheology, and Orientation Behavior of Linear, Star, and Hyperbranched Polymer Melts.* 1. *Synthesis and Molecular Characterization,* 36, 399-406. doi: 10.1021/ma0256486).

Second, the branching degree was calculated using intrinsic viscosities of branched and linear polymers (Equation 2), where smaller g' corresponds to higher degree of branching:

$$g' = \frac{[\eta_b]}{[\eta_l]}$$

The intrinsic viscosities and shape parameter a for b-PDMA were significantly lower than for I-PDMA indicating more dense, sphere-like conformation. In addition, g' changed in a wide range (from 0.42 to 0.87) confirming different degree of branching of b-PDMA. It was possible to obtain samples of b-PDMA with the same MW as I-PDMA, but with different degree of branching (samples M-5, M-7, M-9).

It was observed that b-PDMAAm (reduced sample M-9) had lower osmotic pressure in $CO_2$ and in air than I-PDMAAm at different concentrations. It can be explained by higher density of the branched molecule and lower interaction of polymer chains with water compared with I-PDMA of the same MW.

TABLE 3

Osmotic pressure of I-PDMAAm and b-PDMAAm

| | Linear polymer | | Branched polymer | |
|---|---|---|---|---|
| c, wt. % | π $CO_2$, bar | π AIR, bar | π $CO_2$, bar | π AIR, bar |
| 5 | 2.7 | 0.36 | 2.1 | — |
| 10 | 6.2 | 1.5 | 4.7 | — |
| 20 | 19.5 | 1.93 | 15.5 | — |
| 30 | 46 | 4 | 25.5 | 2.2 |
| 35 | 59.7 | 6.7 | — | — |

Synthesis of Poly(N,N—(N',N'-dimethylaminopropyl) allylamine) PDMAPAAm

PDMAPAAm was also synthesized. PDMAPAAm has a similar N:C ratio to PDMAAm, but a different structure.

Scheme 6

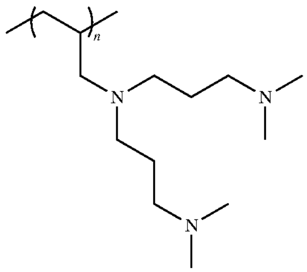

Poly(allylamine) was dissolved in DMSO. Subsequently 3-iodo-N,N-dimethylpropylamine hydrochloride (2× excess) and potassium carbonate (3× excess) were mixed in the solution at room temperature. The solution was stirred at 45° C. for 24 h (yield=95%, conversion=60%). The representative synthesis is shown in Scheme 7.

Scheme 7

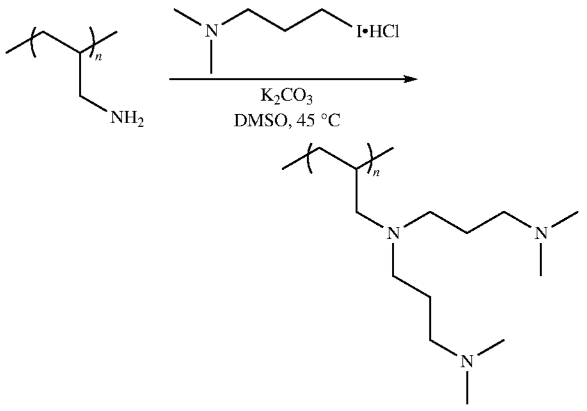

It is appreciated that this method can also be used to create different aminoalkylation products of poly(allylamine).

Synthesis of Poly(N-methylbutyleneimine) (PMBI)

This polymer is an isomer of PDMAAm. Where PDMAAm has the nitrogen hanging off the polymer chain as a pendant group, PMBI has the nitrogen in the polymer backbone (similar to I-PMEI). Testing the osmotic pressure of this polymer will reveal if the structure of the polymer has an effect on osmotic pressure, or if it is predominantly the N:C ratio.

A representative synthesis is shown in Scheme 8.

Scheme 8

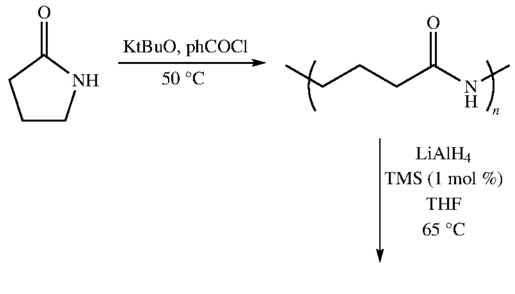

-continued

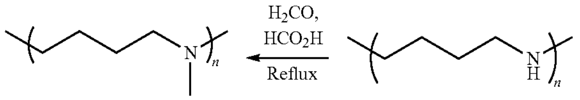

Pyrolidinone was initially dried at 80° C. under vacuum (0.3 torr). Pyrolidinone (14 mL, 0.2 mol) and tert-buroxide (1.0 g, 8.9 mmol) were added to a Schlenk flask and stirred at 50° C. under reduced pressure. The flask was closed and the mixture was vigorously stirred. When the bubbling ceased, benzoyl chloride was added (0.2 g, 1.7 mmol) under reduced pressure and reacted for 2 days. Poly(pyrolidione) was purified by dissolving in formic acid and precipitating in acetone. Poly(pyrolidione) was dried under vacuum at 65° C. overnight (85% yield).

Lithium aluminum hydride (1 g, 0.03 mol) was dissolved in tetrahydrofuran (70 mL) in a 250 mL round bottom three-neck flask under inert gas. The three-neck round bottom flask was equipped with a condenser and a gas inlet. The final neck was plugged with a septa. Poly(pyrrolidinone) (0.5 g) was then added to the flask with tetramethylsilane (1 mL, 7.3 mmol). Reaction proceeded for two days under argon with vigorous stirring. After the reaction was complete, 2 mL of water was added slowly to the flask, followed by 2 mL of 15 wt. % NaOH solution in water, and another 6 ml of water. The mixture was vacuum filtered. The solvent was removed from the liquid under vacuum, then dried under vacuum at 65° C. overnight. (60% yield).

The resulting poly(butyleneimine) was methylated via an Eschweiler-Clarke methylation, described previously.

Synthesis of Linear Poly(methylenimine) [I-pMEI]

Scheme 9

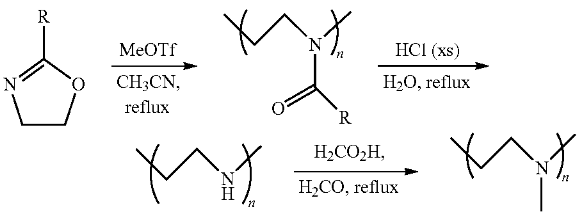

Generally, linear-pMEI (I-pMEI) was synthesized via cationic ring opening polymerization of 2-ethyl-2-oxazoline, followed by acid hydrolysis of the polymeric amide to poly(ethylenimine) (pEI) and Eschweiler-Clarke methylation to pMEI (see above). Lower molecular weight polymers (<10 kDa) were produced in acetonitrile at 75° C. over 3 days. Higher molecular weight polymers were produced by using a solvent with a higher boiling point (chlorobenzene, boiling point=127° C.), and increasing the temperature to 110° C. After methylation, care was taken to remove all formic acid from the polymer, as determined by proton NMR, using a 300 MHz instrument (H-C peak from formic acid appears clearly at ~8 ppm in $D_2O$). This can prove difficult to remove as formic acid forms a salt with the amine [T. Robert, S. M. Mercer, T. J. Clark, B. E. Mariampillai, P. Champagne, M. F. Cunningham and P. G. Jessop, *Green Chem.,* 2012, 14, 3053]. Samples of I-pMEI were made at 6, 9, 25, & 29 kDa.

More particularly, to a flame dried 250 mL Schlenk flask was added chlorobenzene (120 mL) and 2-ethyl-2-oxazoline (30 mL). Resulting solution was heated to and maintained at 130° C., and methyl triflate (80 μL) was added to the flask. Resulting solution slowly turned from colourless to clear, dark orange. After 18 h, diisopropylamine (3 mL) was added, and resulting solution was stirred for an additional 4 h. The solution was cooled to room temperature, followed by dropwise precipitation in diethyl ether (cooled in an ice-water bath), yielding a yellow solid. Resulting poly(2-ethyl-2-oxazoline) was dried under vacuum. The poly(2-ethyl-2-oxzoline) (25 g) was dissolved in concentrated hydrochloric acid (70 mL) in a 250 mL round bottom flask. Resulting solution was refluxed for 18 h, and was dried under vacuum until dryness, producing linear poly(ethylenimine) as an orange solid. The linear poly(ethylenimine) (14 g) was added to a 500 mL round bottom flask equipped with a stir bar. The polymer was dissolved in formic acid (120 mL) and 37% formaldehyde (80 mL) solution. Resulting solution was refluxed for 48 h. Solvent was removed under vacuum, followed by addition of one equivalent of concentrated hydrochloric acid (20 ml). Resulting solution was stirred for 30 min, then solvent (water) was removed under vacuum. Resulting solid was dissolved in 20 wt. % sodium hydroxide solution (100 mL). Solvent was removed under vacuum. Resulting poly(N-methylethylenimine) was dissolved in chloroform (100 mL). Salt precipitate (sodium chloride and residual sodium hydroxide) was removed by vacuum filtration. Solvent was removed from the filtrate under vacuum.

Final linear poly(N-methylethenimine) product was purified by dialysis (3.5 kDa MWCO tubing) against MilliQ water. The polymer was dissolved in a minimal volume of water, placed in sealed dialysis tubing and immersed in 3.5 L of water. The water was exchanged ten times, after a minimum residence time of 4 h per exchange. The $^1$H NMR spectrum matched the spectrum reported in R. Tanaka, M. Koike, T. Tsutsui, T. Tanaka, Linear poly(n-methylethylenmine) and related polymers, J. Polym. Sci. Polym. Lett. Ed. 16 (1978) 13-19 (doi:10.1002/pol. 1978.130160103). In one sample, Mw=25 kDa, Mn=8.9 kDa, Đ=2.8. pKaH=7.4±0.2.

Contrary to literature reports, it was found that I-pMEI was a solid not a ‘viscous polymer’ [R. A. Sanders, A. G. Snow, R. Frech and D. T. Glatzhofer, *Electrochim. Acta,* 2003, 48, 2247-2253.]. It was, however, highly hygroscopic and required a strong vacuum (<0.01 mbar) to completely remove all water prior to doing an osmotic pressure measurement. Commercially available branched PEI was also methylated using the same methods (33 kDa, Đ=2.5).

The GPC analysis of I-PMEI was performed using THE as the eluent. Samples were prepared at 4 mg/mL and passed through a 0.2 μm filter prior to injection. The samples were analyzed on a Waters 2695 separation module equipped with a Waters 410 differential refractometer and Waters Styragel HR (4.6×300 mm) 4, 3, 1 and 0.5 separation columns at 32° C. and 1 mL/min flow rate. The GPC was calibrated using PMMA monodisperse standards.

Synthesis of Branched Poly(N-methylethylenimine) [b-pMEI]

Branched poly(ethylenimine) (10 g) was added to a 250 mL round bottomed flask equipped with a magnetic stir bar and a condenser. The polymer was dissolved in formic acid (40 mL) and 37% formaldehyde solution (80 mL). Resulting solution was refluxed with stirring at 450 rpm. After 48 h, solvent was removed under vacuum, followed by addition of one equivalent of concentrated hydrochloric acid (18 mL).

Resulting solution was stirred for 30 min, then the solvent (water) was removed under vacuum. Resulting solid was dissolved in 20 wt. % sodium hydroxide solution (55 mL). Solvent was removed under vacuum. Resulting branched poly(N-methylethylenimine) was dissolved in chloroform, a solid salt (sodium chloride and excess sodium methoxide) was removed by vacuum filtration. Resulting filtrate was dried under vacuum. Final branched poly(N-methylethylenimine) product was purified by dialysis (3.5 kDa MWCO tubing). In one example, Mw=33 kDa, Mn=13 kDa D=2.5. pKaH=7.6 ±0.2.

- Detectors: RI detector (Agilent MDS)
- Solvent: Millipore water containing 0.3 wt % LiBr and 0.3 M FA
- Flow Rate: 1.0 mL/min
- Injection: 100 μL.
- Columns for GPC-DMF: PSS NOVEMA Max Lux analytical 3000 Å (8×300 mm), Serial #8021953; PSS NOVEMA Max Lux analytical 3000 Å (8×300 mm), Serial #8032891L; PSS NOVEMA Max Lux analytical 100 Å (8×300 mm), Serial #8021956

Standards: PPV standards were used as calibrants

Scheme 10 Synthesis of poly(N-methylpropylenimine) [pMPI]

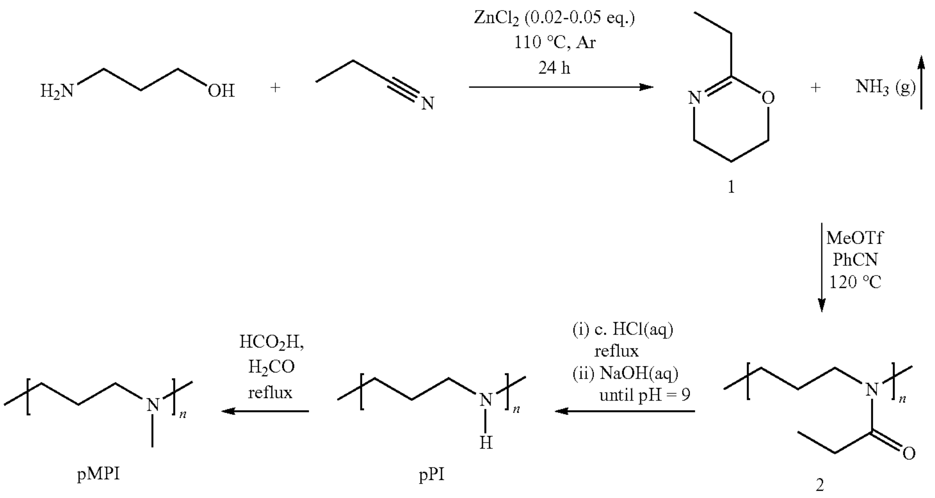

Materials

Propionitrile and benzonitrile were obtained from Sigma-Aldrich. 3-Amino-1-propanol, anhydrous zinc (II) chloride, and methyl trifluoromethanesulfonate were obtained from Sigma-Aldrich and used without further purification. Propionitrile was dried by standing over activated 4 Å molecular sieves for at least 24 hours. Benzonitrile was dried by stirring over $CaCl_2$) for 18 h before distillation under reduced pressure, and was stored over activated 4 Å molecular sieves. 1 kDa MWCO pre-wetted regenerated cellulose dialysis tubing, at 29 mm diameter and for temperatures between 4-122° C. (08-670-12D) was obtained from Spectrum although through Fisher Scientific.

Equipment

DMF GPC (UCSB):

- Pump: Waters Alliance HPLC System, 2695 Separation Module
- Detectors: Waters 2414 Differential Refractometer (RI) and Waters 2998
- Photodiode Array Detector (PDA)
- Solvent: DMF containing 0.01% of LiBr
- Flow Rate: 0.3 mL/min
- Injection: 40 μL.
- Columns for GPC-DMF: 2 Tosoh TSKgel Super HM-M columns
- Standards: PMMA standards were used as calibrants Aqueous GPC (Queen's):

- Model: Agilent Technologies 1260 Infinity II G7800A (Serial #GB17370004)
- Pump: Agilent Infinity 1260 quaternary pump running in isocratic mode

Experimental Details

Synthesis of 1 (2-ethyl-5,6-dihydro-4-H-1,3-oxazine)

The following references were the basis for the below synthesis: Bloksma et al. (2012), *Macromol. Rapid Commun.,* 33, 92-96 (doi:10.1002/marc.201100587). Papadopoulos et al. (1977). *J. Org. Chem.,* 42 (14), 2530-2532 (doi:10.1021/1000434a049).

Propionitrile (107 mL, 1.50 mol, 1 eq.) and zinc chloride (catalyst, 6.82 g, 0.05 mol, 0.033 eq.) were heated at 110° C. for 2 hrs before 3-amino-1-propanol (115 mL, 1.50 mol, 1 eq.) was added dropwise. After a reaction time of ≈24 h, the reaction mixture was cooled to room temperature and dichloromethane was added. The organic phase was washed 3 times with water and once with brine. After removing the dichloromethane under reduced pressure, the monomer 1 (see above) was further purified by distillation over barium oxide, forming a colourless liquid when pure (116.5 g, 69% yield). $^1H$ NMR spectrum was consistent with literature (Papadopolous et al., 1977, Table 2, Entry 5). $^{13}C$ NMR: OC (100.6 MHz, $CDCl_3$) 10.4, 21.8, 42.2, 64.7. m/z (ESI: $CHCl_3$) found 114.1 (100%) [MH+].

Polymerization of 1 (via CROP)

1=poly(2-ethyl-5,6-dihydro-4-H-1,3-oxazine)

The following references were the basis for the below synthesis: Lorson et al. (2017). *Biomacromolecules,* 18, 2161-2171. (doi: 10.1021/acs.biomac.7b00481). Kobayashi et al. (1990), *Macromolecules,* 23, 2609-2612. (doi: 10.1021/ma00212a002).

Under dry and inert conditions, 300.2 mg (1.83 mmol, 1 equiv) methyl trifluoromethanesulfonate and 62.1 g (0.55 mol, 300 equiv) of 1 were added to 114 mL dry benzonitrile (to facilitate dissolving 1 and enable formation of a high molecular weight polymer) in a flame-dried round bottomed flask at room temperature and polymerized at 120° C. for 48 h. Monomer conversion was monitored using $^1$H NMR spectroscopy. When no more monomer was being consumed, the reaction was stopped and allowed to cool to room temperature before the reaction mixture was decanted and centrifuged at 4000 rpm for 40 minutes at room temperature. Resulting solution was decanted from the residue using a pipette and the benzonitrile removed under reduced pressure. The crude polymer was then dialyzed using 1 kDa MWCO dialysis tubing over Millipore water for 5 days, changing the water every 12 h. Finally, the water was removed under reduced pressure, affording polymer 2 (see above) as an amorphous brown solid (61.7 g, quant. yield). OH (400 MHz, $CDCl_3$) 1.14 (3H, b, $CH_2CH_3$), 1.81 (2H, b, $CH_2CH_2CH_2$), 2.32 (2H, b, $COCH_2CH_3$), 3.32 (4H, b, $CH_2CH_2CH_2$). GPC: DMF (PMAA standards): $M_n$=24 970; $M_w$=48 512; D=1.94.

Reduction of 2 to Form pPI [poly(propylenimine)]

The following references were the basis for the below synthesis, and were used to confirm characterization data: Tanaka et al. (1983). *Macromolecules,* 16 (6), 849-853 (doi:10.1021/ma00240a003); Hu et al. (2008). *Solid State Ionics,* 179, 401-408 (doi:10.1016/j.ssi.2008.03.006); Saegusa et al. (1973). *Macromolecules,* 6 (4), 495-498 (doi: 10.1021/ma60034a004) (all incorporated herein by reference).

A mixture of 550 mL of concentrated (37%) hydrochloric acid, 250 ml of water and 40 g of polymer 2 was heated at 100° C. for 5 days. The hydrochloric acid, water and propanoic acid were then removed by distillation under reduced pressure. The remaining residue (a pale orange-white crystalline solid) was dissolved in hot water (60° C.) and this solution was made alkaline by adding aqueous NaOH portion-wise with stirring until the pH was 8-9. This solution was cooled to room temperature and left for 12 hours before the solvent was removed under reduced pressure. The remaining polymer was washed with distilled water and the final compound, polymer pPI, was dried to give 32.1 g of an amorphous orange-brown solid. $^1$H NMR spectrum of the polymer matched that of the literature (Hu et al, 2008; Saegusa et al, 1973—see FIG. 7 of Hu et al.).

Methylation of 3 (Formation of pMPI)

Eschweiler-Clarke Reaction.

The following references were the basis for the below synthesis, and were used to confirm characterization data: Lambermont-Thijs et al. (2010). *Polymer Chemistry,* 1, 747-754. (doi:10.1039/b9py00344d). Mason et al. (2010). *Solid State Ionics,* 180, 1626-1632. (doi:10.1016/j.ssi.2009.10.021).

7.18 g of polymer 3 was dissolved in 120 mL of deionized water at 70° C., to which 405 mL of formaldehyde solution (37 wt % in $H_2O$) and 200 mL of formic acid were added. Resulting solution was heated to and maintained at 105° C. for 48 h. After cooling to room temperature, 220 mL of concentrated (37%) HCl was added. Excess formic acid, formaldehyde and HCl was removed under reduced pressure and the remaining product was dissolved in water. Aqueous NaOH was added until pH >8 and the product was extracted with $CHCl_3$. Organic phase was removed by rotary evaporation and pMPI isolated as a viscous orange-brown oil. This was then dialyzed using 3500 Da MWCO dialysis tubing in Millipore water to isolate the final sample of high $M_w$ pMPI (1.74 g, 19%): aqueous GPC (PPV standards): $M_n$=3 672; $M_w$=13 991; D=3.81. $^1$H NMR spectrum matched that of the literature (Mason et al, 2010—see caption for Scheme 1 of Mason et al.).

Synthesis of Poly(N, N-dimethylvinylamine) [pDMVAm]

This polymer has a high N:C ratio, which may make this polymer advantageous as a draw solute.

Exemplary syntheses of pDMVAm are shown in Scheme 11.

Scheme 11

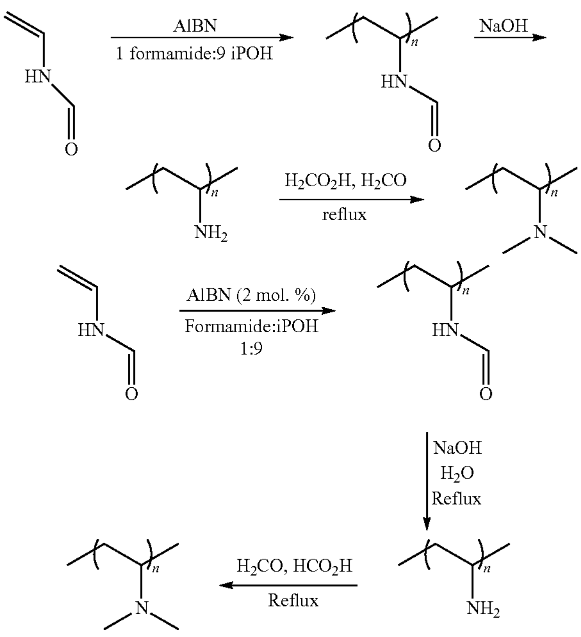

In some embodiments, PDMVAm was synthesized by polymerizing N-vinylformamide via free radical polymerization, hydrolyzing poly(N-vinylformamide) (PVF) to poly (vinyl amine) (PVAm), and then methylating [M. Yasukawa, Y. Tanaka, T. Takahashi, M. Shibuya, S. Mishima and H. Matsuyama, *Ind. Eng. Chem. Res.,* 2015, 54, 8239-8246, incorporated herein by reference]. Samples of PVF were made at 20 kDa, 30 kDa, and 44 kDa.

In some embodiment, N-vinylformamide was passed through a basic alumina column before use. Vinyl formamide (15 mL), formamide (9 mL) and isopropanol (81 mL) were added to a dried Schlenk flask. The solution was subject to three freeze-pump-thaw cycles. AIBN (2 mol. %) was added to the flask, and the solution was subsequently heated to and maintained at 65° C. and stirred under argon. After 4 h the crude polymer was dissolved in water and precipitated in acetone. The wet polymer was dried in a vacuum oven at 65° C. overnight.

Poly(N-vinyl formamide) was dissolved in water in a round bottomed flask. The flask was chilled in an ice bath while sodium hydroxide (2× excess, 15 wt. % solution in water) was added slowly to the polymer solution. The polymer solution was subsequently refluxed overnight. The solvent was removed under vacuum, and the resulting solid was washed with 1:1 acetone: ethanol. The undissolved solid was separated from the liquid by vacuum filtration. The solvent was removed from the liquid under vacuum. The resulting poly(vinylamine) was further dried in a vacuum oven at 65° C. overnight.

Poly(vinylamine) (1 g) was dissolved in water (8 mL) and dioxane (15 mL) in a round bottomed flask. Acetic acid (6 mL) was added to the flask, and the solution was stirred for 5 min. Next, zinc dust (1.6 g) and finally formaldehyde solution (37%, 35 mL) were added to the flask. The solution was stirred at room temperature overnight. Residual solid zinc was filtered off from the solution. The polymer was purified from the salt impurities in the same way as the products of the Eschweiler-Clarke methylation described previously.

Synthesis of Poly(diallylmethylamine) [pDAMAm]

Scheme 12

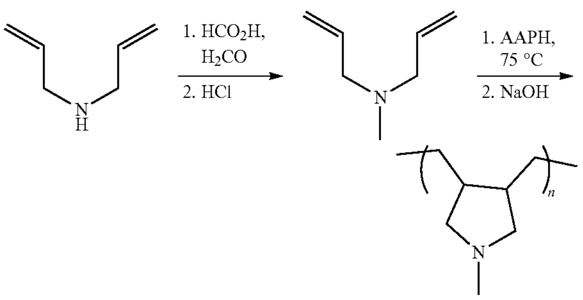

Generally, poly(diallylmethylamine) was synthesized by polymerizing diallylmethylammonium chloride in water with AAPH [2,2'-azobis(2-methylpropionamidine) dihydrochloride] [L. M. Timofeeva, Y. A. Vasilieva, N. A. Klescheva, G. L. Gromova, G. I. Timofeeva, A. I. Rebrov and D. A. Topchiev, *Macromol. Chem. Phys.*, 2002, 203, 2296-2304]. Diallylmethylamine was synthesized via an Eschweiller-Clarke methylation of diallylamine, followed by addition of an equivalent of concentrated HCl.

More particularly, diallylamine (24 mL) was slowly added to a 250 mL round bottom flask equipped with a magnetic stir bar, which stirred at 450 rpm, and a condenser. Formic acid (22 mL) was added to the flask. The flask became cloudy, and the resulting reaction mixture became a dark orange transparent colour. Formaldehyde solution (37 wt. %, 26.4 mL) was added, and the flask became warm. Resulting reaction mixture was stirred for 55 minutes, and then was refluxed for 27 hr at 100° C. Resulting yellow transparent solution was cooled and hydrochloric acid (30 mL 37% wt) was added dropwise. Resulting solution became cloudy. Solvent was removed under vacuum, yielding crude diallylmethylammonium chloride. The diallylmethylammonium chloride (42 g) was dissolved in deionized water (20 mL) in a 250 mL round bottom flask and was purged with argon for 20 min. 2,2'-azobis(2-methylpropionamidine) dihydrochloride (AAPH, 3.306 g) was added. Argon was bubbled through the resulting solution for 5 minutes. Resulting reaction mixture was stirred at 450 rpm at 75° C. under argon. After 72 hr, solvent was removed under vacuum. Resulting crude polymer was dissolved in methanol, then cooled in an ice bath. Sodium methoxide (30 wt. % in methanol, 12 mL) was added to the flask, and the resulting solution was stirred at 450 rpm. After one hour, a light orange liquid (polymer product dissolved in methanol and water) was separated from a white precipitate (sodium chloride) by vacuum filtration. Resulting poly(diallylmethylamine) was dried under vacuum. Final product was purified by dialysis (3.5 kDa MWCO tubing).

Synthesis of Poly(tert-butylaminoethylamino methacrylate) (P(tBAEMA) and Reduced-Poly(N, N-dimethylaminopropyl methacrylamide) (red-PDMAPMAm)

These polymers include secondary amine groups, which are generally more basic than tertiary amines. Without being bound to a particular theory, in general, the percent protonation, and therefore osmotic pressure, increases with the polymer's $pK_{aH}$. It is hypothesized that it is desirable as a draw solute for the amine group to be sufficiently bulky so that carbamates are not formed. Carbamates will not increase the number of species in solution in the carbonated form compared to the uncarbonated form, unlike bicarbonates.

P(tBAEMA) is commercially available. P(tBAEMA) is tested to see if higher osmotic pressures can be achieved using secondary amines.

In some embodiments, red-PDMAPMAm was synthesized as exemplified in Scheme 13.

Scheme 13

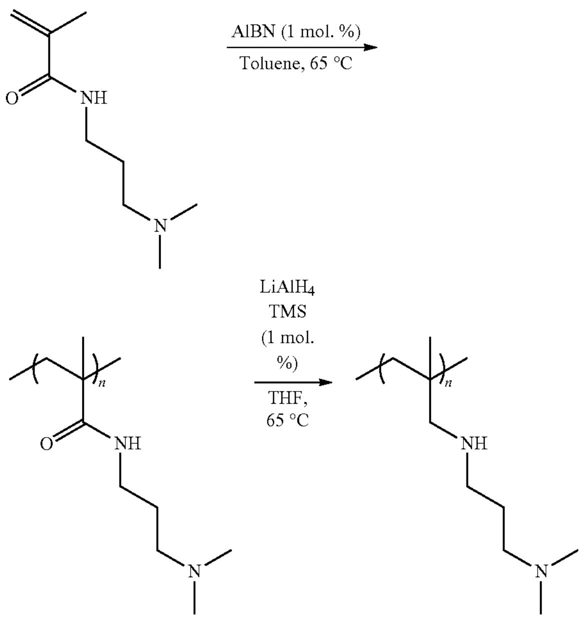

N,N-dimethylaminoethyl methacrylate (DMAPMAm) was separated from inhibitors by passing it through an inhibitor remover column. The purified DMAPMAm was placed into a round bottomed flask which had been evacuated then refilled with argon three times. THF was added to the flask, and the solution was heated to and maintained at 65° C. AIBN (1 mol. %) was subsequently added to the flask. After 16 h the polymer was precipitated in cold hexanes and dried in a vacuum oven at 65° C. overnight.

Reduced-poly(N,N-dimethylaminopropyl methacrylamide) (red-PDMAPMAm) was prepared by reducing PDMAPMAm with LiAlH4, following the procedure described for poly(pyrolidinone) above.

The synthesized red-PDMAPMAm was tested.

The osmotic pressure of red-PDMAPMAm under $CO_2$ was 5.3 bar at 20 wt. %. The osmotic pressure of P(tBAEMA) under $CO_2$ was 6.8 bar at 20 wt. %, and 11.0 bar at 30 wt. %. It is worth noting that P(tBAEMA) is an isomer of the tertiary amine PDEAEMA, which had an osmotic pressure under $CO_2$ of 16 bar at 20 wt. %. Without being bound to a particular theory, a possible explanation for this phenomenon is that the secondary amines have a greater hydrogen bonding ability than tertiary amines due to their NH bonds. Hydrogen bonding between the polymer and bicarbonates or other polymer chains could result in lower osmotic pressures.

Synthesis of Poly(N,N,N',N'-tetramethyl-2-butene-1,4-diamine) (PTMBD)

This polymer is a modification of $CO_2$-switchable polymer PDMAAm by having an additional pendant group. Without being bound to a particular theory, it is hypothesized that this polymer will provide an approach to enhancing the forward osmosis (FO) process by increasing the osmotic pressure (π) (double the number of 3° amine groups to be protonated) relative to linear PDMAAm at the same chain length and therefore possibly the same viscosity. The increased number of tertiary amine groups per monomer unit compared to PDMAAm could generate a higher $\pi T_{CO2}$ by increasing the number of bicarbonate counterions in water.

The synthesis of PTMBD is exemplified in Scheme 14. All reactions were conducted under inert conditions, using glovebox and Schlenk lines techniques.

(35 mL, 0.07 mol, 2M) in tetrahydrofuran (50 ml) at <0° C. over 1 h. The reaction mixture was then allowed to warm to room temperature (r.t.) and stirred for 12 hours. The mixture was then filtered and the residue was washed with chloroform (35 mL). The filtrate was collected, and the organic solvent (chloroform and tetrahydrofuran) was removed under vacuum to give crude 1. The monomer was further purified by two-solvent recrystallization using chloroform and diethyl ether, resulting in the formation of a light brown crystalline solid (67% yield). The $^{13}$C-NMR spectrum was consistent with literature (Matsumoto, A., Fukushina, K., Otsu, T. (1991). Synthesis of Substituted Polymethylenes by Radical Polymerization of N,N,N,N-Tetraalkylfumaramides and Their Characterization. *J. Polym. Sci: Part A: Polym. Chem.,* 29, 1697-1706, 1991. DOI: 10.1002/pola.1991.080291203, incorporated herein by reference). 1H NMR (300 MHz, $CDCl_3$): δ=7.35 (2H, s, CH), 3.16 (6H, s, N ($CH_3$)), 3.06 (6H, s, N ($CH_3$)). m/z (EI-MS: 70 eV, in $CHCl_3$): found 171.11 (100%) [MH+]. $C_8H_{14}N_2O_2$ requires 170.11 (100.0%), 171.11 (8.7%). Crystal and refinement data for (E)-N,N,N',N'-tetramethylbut-2-enediamide: $C_8H_{14}N_2O_2$, formula weight=170.21, a=7.3696 (8) Å, b=5.6268 (5) Å, c=11.3475 (12) Å, V =446.44 (8) Å$^3$, Space group $P2_1/n$.

Poly(N,N,N',N'-tetramethyl-2-butene-1,4-diamide) (2) was synthesized in step ii: (E)-N,N,N',N'-tetramethylbut-2-enediamide (2.25 g) and dicumyl peroxide (2.2 mol %, 0.0786 g) were added to a Schlenk tube. The reaction mixture was heated at 170° C. under nitrogen for 19 hours before being allowed to cool to room temperature. The crude mixture was dissolved in 30 mL deionized water and transferred to 1 kDa MWCO dialysis tubing which had been Scheme 14.

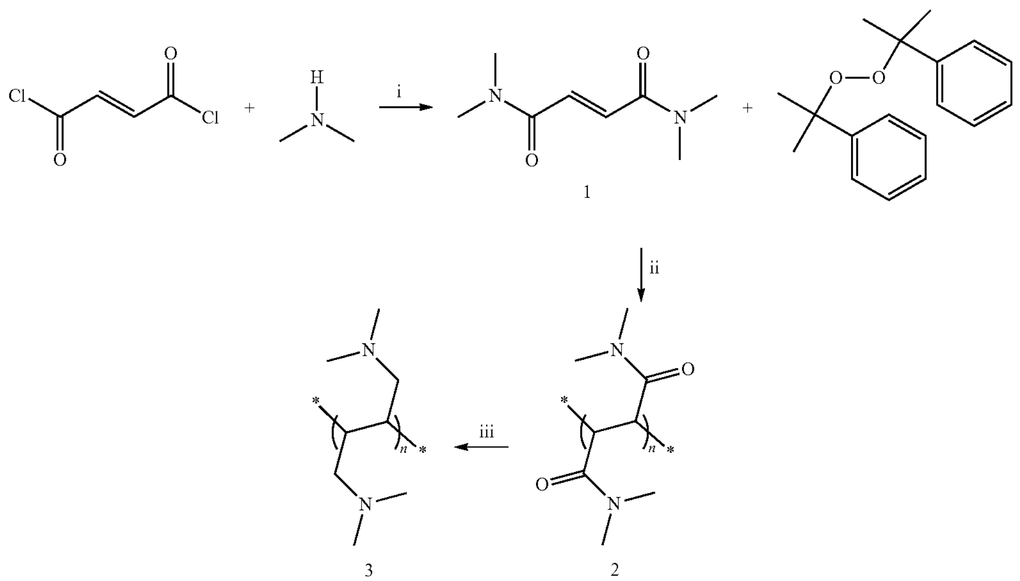

Conditions:
(i) THF, argon at 0 °C (1 hr), r.t. (12 hrs);
(ii) 170 °C, argon (19 hrs);
(iii) THF, argon at 0 °C (1 hr), r.t. (48 hrs), 15% NaOH (aq).

(E)-N,N,N',N'-tetramethylbut-2-enediamide (1) was prepared in step i by the dropwise addition of fumaroyl dichloride (2.127 g, 0.014 mol) into a solution of dimethylamine sealed at one end. The crude mixture was then dialyzed over deionized water for 3 days, with the water being changed every 12 hrs. The solution within the dialysis tubing was collected and the water removed from this mixture under reduced pressure, affording polymer 2 as a black amorphous solid (0.071 g). GPC: $\overline{M}_w$=1314 kDa; $\overline{M}_n$=534 kDa; Đ=2.5. Electrospray mass spectroscopy (ESI) was used to investigate the structure of polymer 2. The mass spectroscopy data is consistent with the desired structure: several peaks were observed and the distance between the isotopic peaks correspond to the mass of a monomer unit (Distance between the peaks for doubly charged ion, $MW_{cal}$: 85.05249).

PTMBD (3) was synthesized by step iii: Lithium aluminium hydride pellets (2 pellets, 1.3 g) were added to a solution of polymer 2 (0.98 g) in anhydrous THF (25 mL) and chloroform (5 mL) under argon <0° C. This mixture was stirred under these conditions for one hour before being allowed to warm to r.t. The reaction mixture was then stirred for an additional 48 hrs under these conditions. To recover the polymer from the reaction mixture, the reaction mixture—while in a glass vessel, was placed in ice and maintained at 0° C. Water (1.3 ml) was slowly added to the reaction mixture before 15% aqueous sodium hydroxide (1.3 ml) and an additional 3 ml of water were added (Fieser workup). This mixture was allowed to warm to r.t. and stirred for an additional hour. Anhydrous magnesium sulfate (0.2 g) was added to precipitate out any lithium aluminium hydroxy salts before the mixture was filtered and the filtrate collected. The solvent was removed from the filtrate under vacuum, affording polymer 3 as an oily viscous light brown fluid (0.51 g).

Synthesis of Dendrimers

Without being bound to a particular theory, $CO_2$ switchable dendrimers containing tertiary amine groups are anticipated to be monodispersed, spherical macromolecule with highly branched structures. Each dendrimer is expected to have an intrinsic viscosity nearly the same as the solvent in which it is dissolved, regardless of the dendrimer $M_w$ (Caminade, A-M. Yan, D., Smith, D. K. (2015). Dendrimers and hyperbranched polymers. *Chemical Society Reviews,* 44, 3870-3873. DOI: 10.1039/C5CS90049B; Zhao, D., Chen, S., Wang, P., Zhao, Q. & Lu, X. A Dendrimer-Based Forward Osmosis Draw Solute for Seawater Desalination. *Ind. Eng. Chem. Res.,* 53 (42), 16170-16175. DOI: 10.1021/ie503199; incorporated herein by reference). We anticipate that these dendrimers will be easily and highly soluble in water. Similarly structured dendrimers such as Astramol dendrimers (DAB-dendr-($NH_2$) x) were found to be highly soluble in water up to generation 5 (Zhiryakova, V., M. Izumrudov, A. V. Water-Soluble Polyelectrolyte Complexes of Astramol Poly(propyleneimine) Dendrimers with Poly (methacrylate) Anion. *J. Phys. Chem,* 118 (47), 13760-13769. DOI: 10.1021/jp508960h, incorporated herein by reference). The dendrimer draw solution is expected to generate a high osmotic pressure at high concentrations in the presence of $CO_2$ because of the large number of amine groups in solution.

Two dendrimers are synthesized, including $N^1$,$N^1$-(butane-1,4-diyl)bis($N^1$-(3-(dimethylamino) propyl)-$N^3$,$N^3$-dimethylpropane-1,3-diamine) (DGEN1) and $N^1$,$N^{1'}$,$N^{1''}$,$N^{1'''}$-((Butane-1,4-diylbis(azanetriyl))tetrakis(propane-3,1-diyl)) tetrakis($N^1$-(3 (dimethylamino) propyl)-$N^3$,$N^3$-dimethylpropane-1,3-diamine) (DGEN2).

Representative syntheses of the two dendrimers are shown in Scheme 15.

Scheme 15.

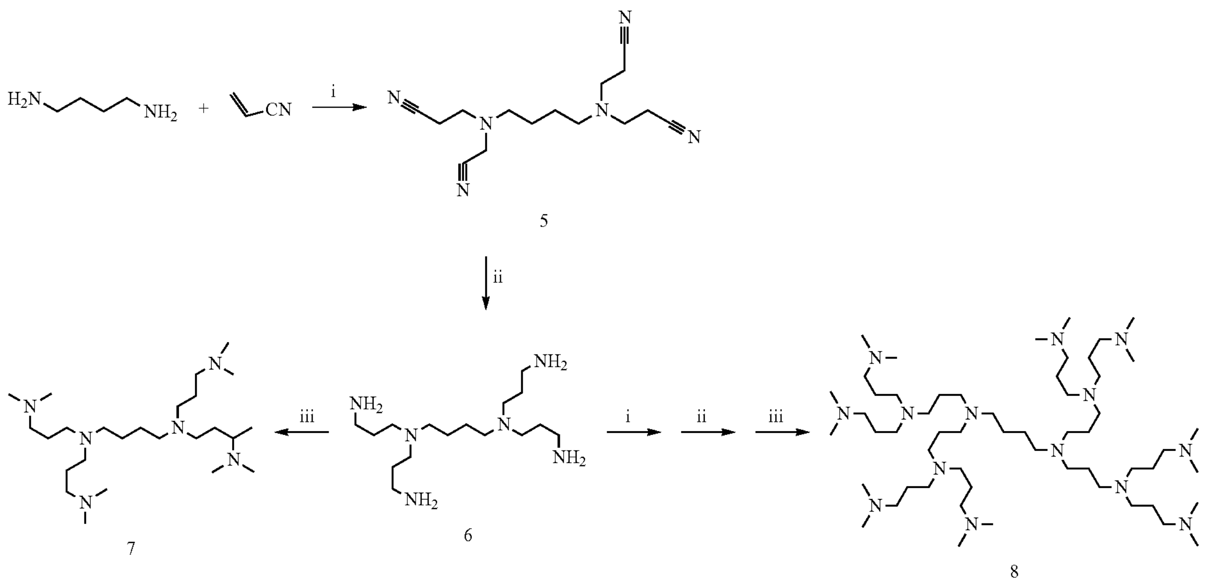

5 6 7 8

Conditions and reagents:
i) water, 100 °C (1 hr);
ii) $LiAlH_4$, argon, THF, 40 °C (48 hrs), then water, r.t. (12 hrs);
iii) formic acid and formaldehyde (12 hrs), then HCl(aq), NaOH(aq).

N,N,N',N'-Tetrakis(2-cyanoethyl)-1,4-diaminobutane (5) was synthesized in step i: Acrylonitrile (53 ml) was added dropwise to a solution of diaminobutane (8.81 g) in 100 ml of water under inert conditions. The reaction mixture was heated at 80° C. for 1 hr. Excess acrylonitrile was removed as a water azeotrope under vacuum. The polypropylenimine dendrimer (5) was obtained as an oily viscous light-yellow solution (27.56 g, 92% yield). $^{13}C$ NMR (400 MHz, $CDCl_3$) δ=16 ($CH_2CN$), 24 ($NCH_2CH_2CH_2CH_2N$), 49 ($NCH_2CH_2CN$), 53 ($NCH_2CH_2CH_2CH_2N$), 119 (CN).

$N^1,N^{1'}$-(butane-1,4-diyl)bis($N^1$-(3-aminopropyl) propane-1,3-diamine) (6) was synthesized in step ii from 5: For the reduction of the nitrile groups, dendrimer 5 (3 g) was dissolved in anhydrous THF (200 ml) in a two-neck round bottomed flask with a condenser and argon inlet system. Reactions were performed under an inert atmosphere of argon. $LiALH_4$ (3.1 g) was dissolved in anhydrous THF (30 ml) and added to the dendrimer via a cannula using low pressure inert gas. The reaction mixture was stirred and heated at 40° C. for 12 hrs. A second amount of $LiAlH_4$ (1.5 g) in THF (15 ml) was added to the reaction mixture and heated for an additional 12 hrs. A final amount of $LiAlH_4$ (1.7 g) in THF (20 ml) was added and the reaction mixture heated for an additional 12 hrs. Then, the reaction mixture was added dropwise to ice-water and stirred continuously for 12 hrs. The reaction mixture was filtered and dried under vacuum at 50° C. for 12 hrs.

DGEN1 (7) can be synthesized as the following: For the alkylation of primary amines, the Eschweiler-Clarke method is proposed. The formic acid will be cooled in ice and added to the dendrimer 2. The solution will be stirred for 15 minutes and formaldehyde (37 wt % in $H_2O$ solution) and formic acid will be added. The reaction mixture will be refluxed for 12 hrs. After cooling the reaction, 1 equivalent of concentrated hydrochloric acid per amine groups will be added and the reaction mixture will be stirred for 15 mins. The solvent will be subject to rotary evaporator to ensure complete removal of formic acid, HCl and formaldehyde. The crude product will be dissolved in concentrated sodium hydroxide solution while cooling in an ice bath and stir for 15 min at room temperature (RT). Solvent will be removed under vacuum. For the purification, the crude product will be dissolved in acetone and the salts removed by vacuum filtration. The process will be repeated until the salts were completely removed.

DGEN2 (8) synthesis: Higher generations of dendrimers will be prepared by repetition of all the above steps (i,ii,iii) consecutively, with increasing quantities of acrylonitrile (to form the cyano-compounds) $LiAlH_4$ (to form the 1° amine), followed by methylation with an appropriate methylating agent (to methylate the 1° amine groups).

Osmotic Pressure Measurements

Water spontaneously moves from an area of low solute concentration to an area of high solute concentration. More specifically, water spontaneously moves from an area of high water chemical potential to an area of low water chemical potential. The chemical potential of water is lowered by factors such as high solute concentrations (i.e. molecules per litre of solution or molecules per kg of water) or the presence of hydrophilic or hygroscopic materials such as species that are polar, hydrogen-bonding and/or ionic. Such hydrophilic or hygroscopic materials may be dissolved or undissolved. Osmotic pressure (π) is the minimum pressure required to prevent water from travelling across a semi-permeable membrane in the energetically preferred direction. To a first approximation, ignoring contributions of hydrophilic or hygroscopic materials, osmotic pressure is approximately proportional to the number of species in solution. The simplest model for osmotic pressure is the van't Hoff formula (equation 1), where i is the van't Hoff coefficient:

$$\pi=iRTC \quad (1)$$

The van't Hoff equation only applies to ideal solutions (i.e., low concentrations, weak intermolecular forces, weak solute-solvent interactions). This equation does not take into account solute-solute and solute-water interactions which can increase or decrease osmotic pressure.

Osmotic pressure decreases as the strength of solute-solute interactions increase and solute-water interactions decrease. For example, osmotic pressure of carboxylic acids in benzene is lower than theoretically predicted due to dimerization of the acid group [K. R. Harris, P. J. Dunlop and J. Dunlop, 1967, 71, 1965-1968]. The carboxylic acid molecules interact less with the solvent, and behave more like a single aggregate than two distinct molecules.

Osmotic pressure increases as the strength of solute-solute interactions decrease and solute-water interactions increase [M. Cho, S. H. Lee, D. Lee, D. P. Chen, I. C. Kim and M. S. Diallo, *J. Memb. Sci.,* 2016, 511, 278-288]. Many polar aprotic polymers also exhibit higher osmotic pressures than predicted. Polymers affect osmotic pressure differently than small molecules. As a large molecule, a single polymer chain has more interactions with the solvent per molecule than a small molecule [C. J. Van Oss, K. Arnold, S. Ohki, R. J. Good and K. Gawrisch, *J. Macromol. Sci. Part A—Chem.,* 1990, 27, 563-580]. Thus the osmotic pressure of a single polymer molecule is larger than a comparable small molecule due to the sheer number of interactions the polymer can have with the solvent.

It has been shown that osmotic pressure is affected more by the strength of the polymer-solvent interactions than molecular weight. This is especially true at high concentrations (above a critical concentration, which can be measured by viscosity) where the chains begin to come into contact in solution. In this state, there is more repulsion between chains (for polar aprotic polymers). In response, the polymer draws more water to itself to decrease repulsion, thus increasing the osmotic pressure. In dilute solutions, polymer chains are separated from each other, so the osmotic pressure is lower. Consequently, the osmotic pressure of polar aprotic polymers in polar solvents often increases exponentially with concentration, and has a decreased dependence on molecular weight than is predicted from the van't Hoff equation.

Osmotic pressure can be measured by freezing point, vapour pressure, or membrane osmometry [A. Grattoni, G. Canavese, F. M. Montevecchi and M. Ferrari, *Anal. Chem.,* 2008, 80, 2617-2622, incorporated herein by reference]. The membrane osmometry was used herein. While membrane osmometry measurements require more samples than the alternatives, they are more accurate as they measure the osmotic pressure directly rather than relying on thermodynamic approximations and assumptions [A. Grattoni, G. Canavese, F. M. Montevecchi and M. Ferrari, *Anal. Chem.,* 2008, 80, 2617-2622, incorporated herein by reference]. Furthermore, freezing point osmometry, the most popular alternative, is potentially flawed for measurement of osmotic pressures of carbonated solutions, as $CO_2$ will leave the solution as the solvent is frozen, resulting in a measured osmotic pressure being lower than the true osmotic pressure at room temperature.

Figure 8:
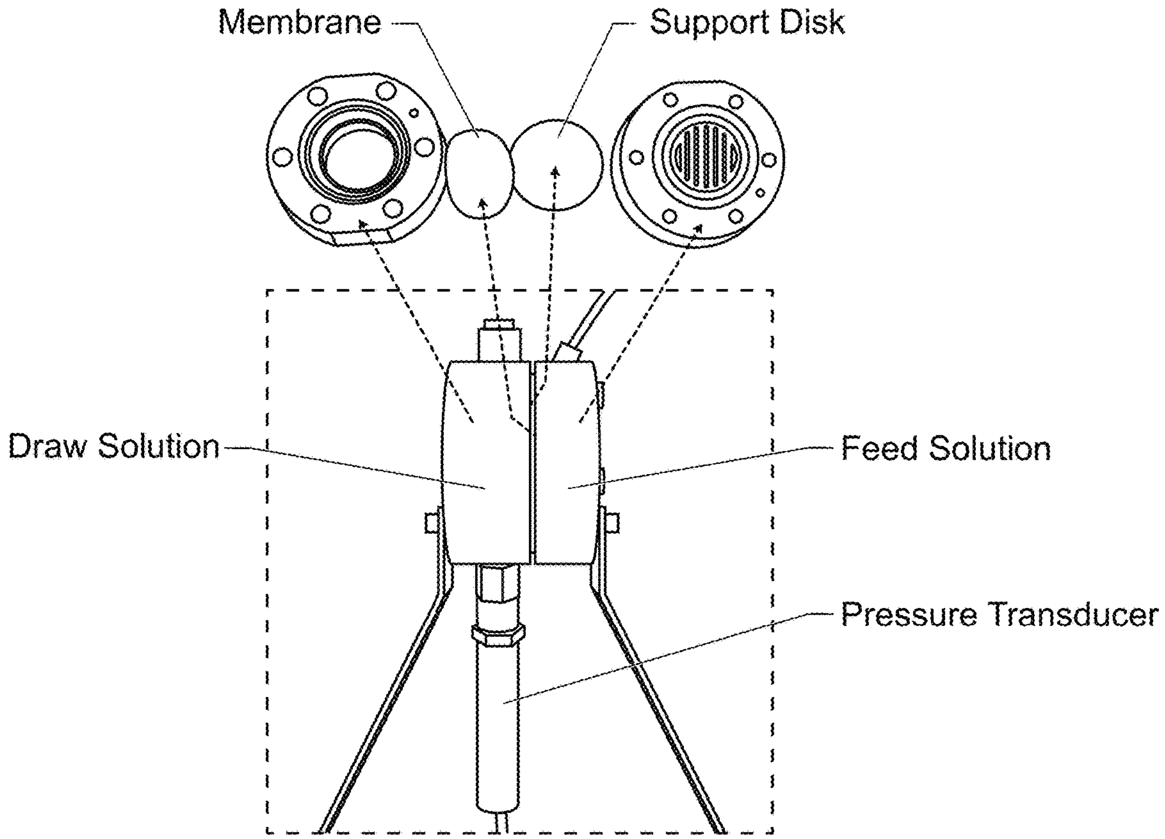
FIG. 8 depicts a membrane osmometer as used herein.

The membrane osmometer used was designed by Alessandro Grattoni [A. Grattoni, G. Canavese, F. M. Montevecchi and M. Ferrari, *Anal. Chem.,* 2008, 80, 2617-2622, incorporated herein by reference]. The polymers are lyophilized to ensure that they are dry before taking measurements. The setup consisted of two half cells filled with a draw solution and a feed solution (Milipore water, resistivity 18.2 mΩ) separated by a RO membrane on a porous support disk (see FIG. 8). In some embodiments, the RO membrane is Dow BW30 membrane. The half cells were washed three times with Milipore water before use, and the support disk was soaked in water for >1 hr before use. Solutions were carbonated by bubbling $CO_2$ through a 22G needle at (~10 bubbles/second) for >8 h. To set up a measurement, the two half cells were screwed tightly together, and each half was filled with the appropriate solution. The draw solution side was connected to a digital pressure transducer (Omega USBH, 0-100 bar) and sealed, while the feed solution was open to atmospheric pressure. The pressure on the draw side was continuously monitored until no further change was observed, and was then monitored for a further 30 minutes, after which the measurement was stopped and the osmometer was disassembled.

Before measuring osmotic pressures of polymer solutions, a small molecule was tested, to demonstrate the principle of switchable osmotic pressure. 1-[Bis [3-(dimethylamino) propyl]-amino]-2-propanol was chosen as the candidate molecule, as it was readily available and its switchability had been previously studied [S. M. Mercer, Ph.D. thesis, Queen's University, Department of Chemistry, 2012, incorporated herein by reference]. The osmotic pressure of a 20 wt. % solution was found to be 23.3±0.3 bar in the absence of $CO_2$ and 59±3 bar in the presence of $CO_2$. This is comparable to what is predicted from the van't Hoff formula (19.5 bar and 58.5 bar respectively, assuming two N atoms per molecule were protonated in the presence of $CO_2$).

The osmotic pressure being tripled under $CO_2$ suggested that two bicarbonates were formed. It was considered that the third nitrogen atom was not protonated because three carbon atoms are not sufficient to insulate an N atom from the electronic effects caused by protonation of the neighbouring N atoms. When an amine is protonated it becomes positively charged, and this positive charge can decrease basicity of any unprotonated amines connected to it (by induction and electrostatic repulsion). In this case, without wishing to be bound by theory, it was considered that the terminal amines were most basic, and were consequently protonated first. Their protonation would have then decreased the basicity of the central amine, so that it could not be protonated under 1 atm of $CO_2$. As a result, it was considered that just two out of the three amines were protonated. If a N atom in an amine is sufficiently far away (e.g., ≥4 carbons) from other basic N atoms, then it will be largely unaffected by the electronic effects cause by the protonation of its neighbours. This is consistent with previous work [S. M. Mercer, Ph.D. thesis, Queen's University, Department of Chemistry, 2012, incorporated herein by reference].

Figure 9:
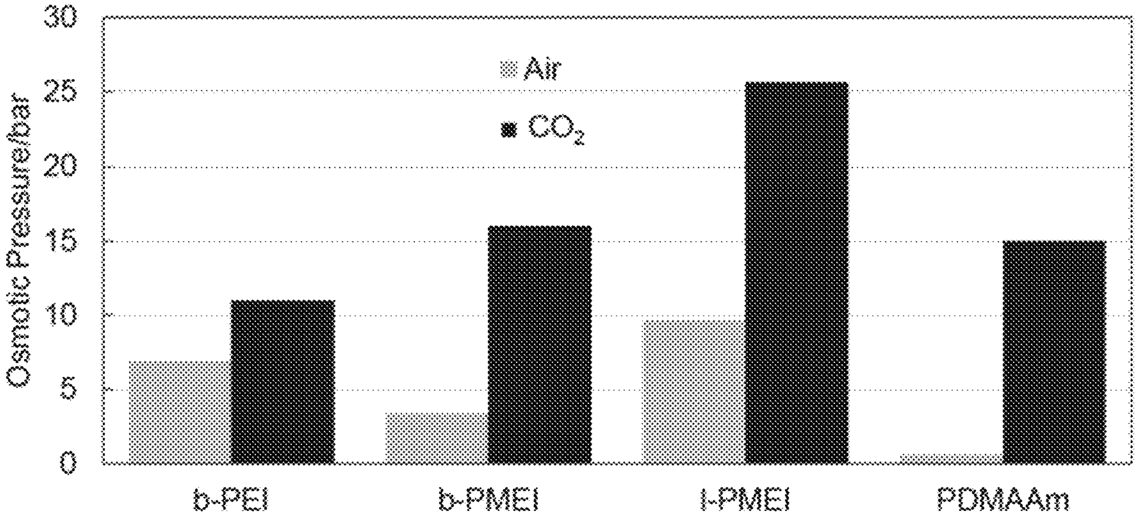
FIG. 9 graphically depicts osmotic pressures of 20 wt. % b-PEI, b-PMEI, I-PMEI, and PDMAAm solutions in air and $CO_2$.

Osmotic pressures of 20 wt. % solutions of b-PEI, b-PMEI, I-PMEI and PDMAAm were measured in air and in $CO_2$ (see FIG. 9). The b-PEI, b-PMEI, I-PMEI had molecular weights of 25 kDa, 33 kDa, and 9 kDa respectively, and PDMAAm had a molecular weight of 24 kDa.

It was observed that the measured osmotic pressures in air of these polymeric materials were higher than was predicted by the van't Hoff equation, in contrast to the small molecules (see above). Without wishing to be bound by theory, it was considered that this was due to strong hydrogen bonds between a polymer and water, and weak polymer-polymer intermolecular forces.

It was observed, surprisingly, that PDMAAm had a high ratio between the osmotic pressure in $CO_2$ and the osmotic pressure in air. PDMAAm had the lowest osmotic pressure in air compared to the other polymers tested. The osmotic pressure in $CO_2$ of PDMAAm, however, was higher than that of b-PMEI, as shown in Table 4. This surprising result suggests that PDMAAm is advantageous for FO process (when PDMAAm is ionized) followed by RO process (when PDMAAm is neutral) to recover the PDMAAm solution, which may then be reused for FO process.

TABLE 4

| Polymer | $\pi_{CO2}$, 20%/bar |
|---|---|
| PAAm | 3.6 |
| b-PEI | 11.0 |
| b-PMEI | 15.0 |
| POMAAm | 19.5 |

Without wishing to be bound by theory, this higher osmotic pressure in $CO_2$ was considered to potentially be a consequence of (i) the relatively higher basicity of PDMAAm (see Example 2) and the resulting lower % protonation, and/or (ii) ion pairing. In respect of ion pairing, it was considered that the polymeric structure of PDMAAm may result in a increased distance between switchable moieties (i.e., amine groups), thereby discouraging bicarbonate dimerization (see Example 4). It was considered that the osmotic pressure in $CO_2$ would increase with higher loadings of polymer.

PDMAAm has a lower nitrogen: carbon ratio as compared to PMEI (1:5 versus 1:3), making it relatively more hydrophobic. As a result, PDMAAm may have relatively weaker interactions with water, decreasing its osmotic pressure in air. While a high nitrogen: carbon ratio is desirable for achieving a high solubility and osmotic pressure in $CO_2$, it may have a negative effect on the osmotic pressure in air; and as such, a balance is desirable.

It was observed that both b-PEI and b-PMEI has higher osmotic pressures in air than was expected from theory. It was considered that the osmotic pressure of polymeric amines may be higher in air than predicted due to the protonation of amines in water, which results in hydroxide anions. In a 20 wt. % solution of I-PMEI in neutral water, less than 1% of the amine groups are expected to be protonated (based on its $pK_{aH}$ of 7.28) [Y. Fukuda, D. Abe, Y. Tanaka, J. Uchida, N. Suzuki, T. Miyai and Y. Sasanuma, *Polym. J.,* 2016, 48, 1065-1072, incorporated herein by reference]. Hydroxide formation was therefore not expected to significantly affect the osmotic pressure of PMEI in air.

It was observed that the osmotic pressure of b-PEI in air was higher than that of b-PMEI. This was likely due to the fact that b-PMEI was dialysed after methylation, which removed any low molecular weight chains (<1 kDa). As a result, there would be fewer species in solution per gram of polymer. In addition, b-PMEI has a larger molecular weight than b-PEI, meaning that a 20 wt. % solution of b-PMEI contains fewer chains per litre than a 20 wt. % solution of PEI (6 mM vs. 8 mM).

It was considered that the higher osmotic pressure in air of b-PEI vs. b-PMEI may also be due to their different structures. Osmotic pressure increases with the strength of polymer-water interactions. b-PMEI only contains tertiary amines, and can therefore only accept hydrogen bonds with water through the lone pair on the nitrogen. In contrast, b-PEI contains primary, secondary and tertiary amines (in a 1:2:1 ratio), and can therefore both accept and donate hydrogen bonds with water. Due to the presence of primary and secondary amines, b-PEI also has the ability to hydrogen bond with itself. Strong solute-solute interactions cause osmotic pressure to decrease [J. R. Vanderveen, S. Burra, J. Geng, A. Goyon, A. Jardine, H. E. Shin, T. Andrea, P. J. Dyson and P. G. Jessop, *ChemPhysChem,* 2018, 1-9, incorporated herein by reference]. However, it was considered that the strongest hydrogen bonds in the system may occur between the O—H of water and a N in b-PEI. Therefore, even though b-PEI can hydrogen bond with itself, it was considered that the hydrogen bonding between the polymer and water would be stronger, particularly at relatively low polymer concentrations. In addition, due to the branched structure of b-PEI, polymer-polymer intermolecular interactions were not expected to be strong. Therefore, despite its self hydrogen bonding ability, the osmotic pressure of b-PEI was higher than theoretically predicted. However, b-PEI may begin to hydrogen bond with itself more as a solution becomes more concentrated. While osmotic pressure will increase cubically with concentration, such intra-molecular hydrogen bonding may cause such an increase to be lower.

Figure 10:
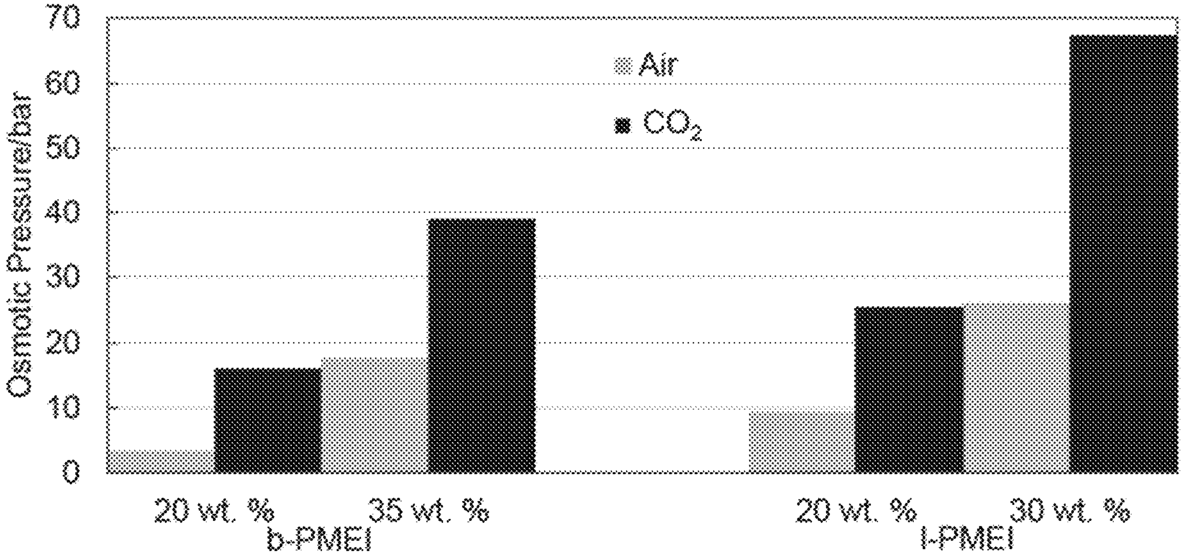
FIG. 10 graphically depicts osmotic pressures of b-PMEI and I-PMEI at various weight percent loadings.

It was observed that the osmotic pressure of I-PMEI in air was higher than that of b-PMEI. It was considered that this may be due to their different molecular weights (9 kDa vs. 33 kDa), as with b-PEI and b-PMEI. Alternatively, it was considered that the difference was due to their different structures. Branching may decrease osmotic pressure by decreasing water interaction with a polymer, due to increased steric hindrance. Osmotic pressure will also be lower if polymer chains encounter less repulsion from each other; since branched polymers have a decreased hydrodynamic radius, they likely experience less repulsion than their linear counterparts at the same concentration. Under $CO_2$, osmotic pressure of the amine polymers was expected to be dominated by bicarbonate anions. As there were the same number of units of protonatable nitrogen atoms in I- and b-PMEI, the osmotic pressures in $CO_2$ at the same weight percent were expected to be comparable. However, the observed osmotic pressure in $CO_2$ of I-PMEI was higher than that of b-PMEI. Osmotic pressures of b-PMEI and I-PMEI were tested at higher concentrations (35 wt. % and 30 wt. % respectively; see FIG. 10). It was observed that the osmotic pressures of I-PMEI were consistently higher than that of b-PMEI.

Example 2—Osmotic Pressures of Switchable Polymer Draw Solutes for Forward Osmosis The polymers considered were linear poly(N-methylethylenimine) (I-PMEI), branched poly(N-methylethylenimine) (b-PMEI), linear-poly(N-methylproylenimine) (PMPI), and poly(N,N-dimethylallylamine) (PDMAAm):

Scheme 16

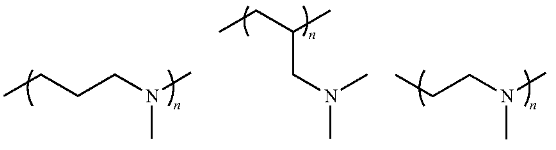

PMPI PDMAAm I-PMEI

-continued

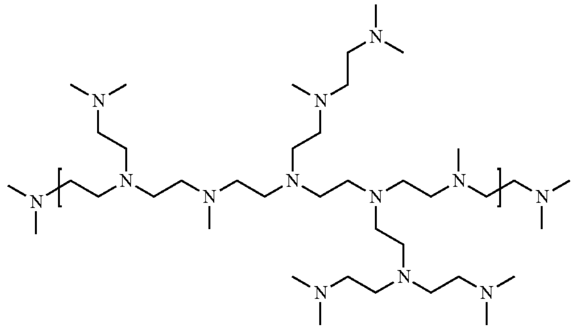

b-PMEI

Experimental

Detailed synthetic procedures were as outlined in Example 1. Obtaining reliable molecular weights for these polymers by gel permeation chromatograph (GPC) was a reoccurring challenge. It has been considered that this is due to the highly polar nature of the polymers, and interactions with the GPC columns. Samples were run at 1 mg/ml in 0.3 wt. % LiBr and 0.3M formic acid in HPLC grade water. The GPC was calibrated with PVP standards. Molecular weight and $pK_{aH}$ of the above-delineated polymers used as measured are listed in

TABLE 5

| Polymer | Molecular Weight/kDa | $pK_{aH}$ |
|---|---|---|
| b-PMEI | 33† | 7.6 ± 0.2 |
| I-PMEI | 9 | 7.4 ± 0.2 |
| PMPI | 15 | — |
| PDMAAm | 42 | 7.72 ± 0.06 |

Unless otherwise specified, these values were measured in lab.

Osmotic Pressure Measurement

Osmotic pressures of I-PMEI, b-PMEI, PMPI, and PDMAAm were measured at various concentrations following the protocols outlined in Example 1. Some results were as follows:

TABLE 6

| Polymer | Osmotic pressure in $CO_2$/bar | Osmotic pressure in air/bar | Loading/wt. % |
|---|---|---|---|
| b-PMEI | 55 | 18 | 35 |
| I-PMEI | 69 | 26 | 30 |
| PMPI | 18 | 6 | 20 |
| PDMAAm | 46 | 4 | 30 |

Figure 11:
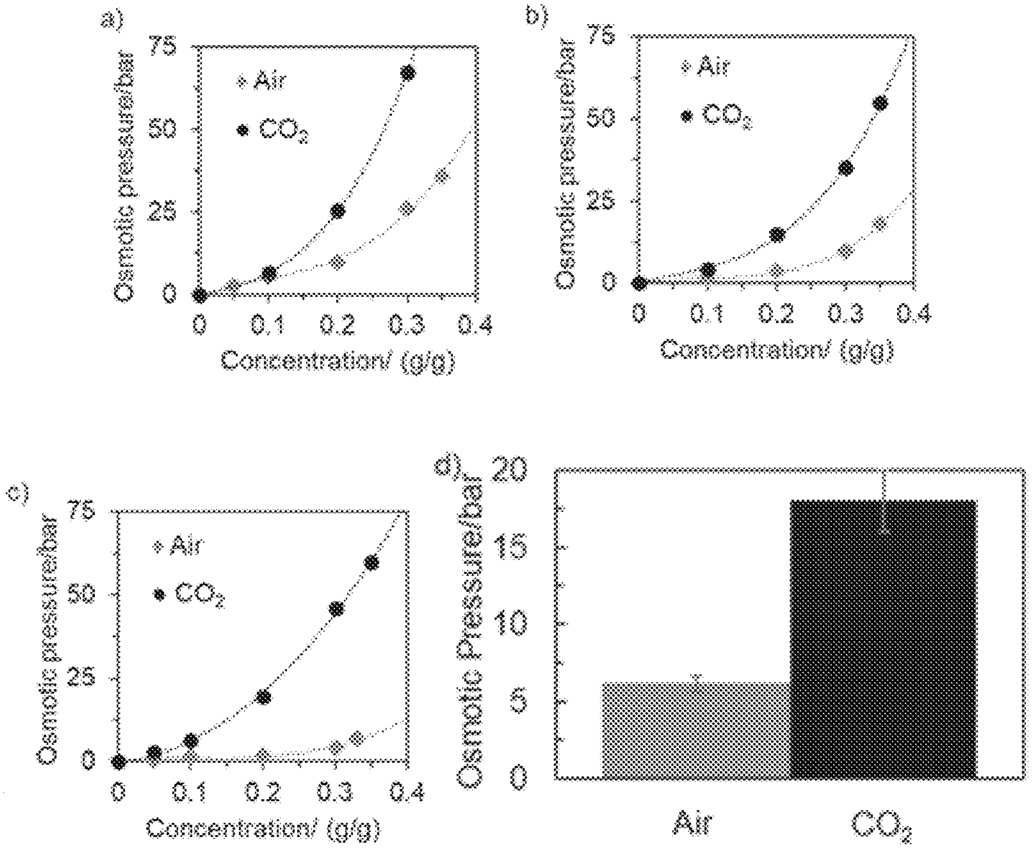
FIG. 11 graphically depicts osmotic pressures vs. concentration for a) I-PMEI, b) b-PMEI, c) PDMAAm, d) PMPI.

Plots of osmotic pressure vs. concentration for each polymer is depicted in FIG. 11.

It can be seen that PDMAAm has a much higher ration between the osmotic pressure in $CO_2$ and the osmotic pressure in air.

Osmotic pressures of polymer solutions with loadings up to 35 wt. % were measured by direct membrane osmometry. Please note that PMPI was found to be a challenging synthesis, and only a limited amount was available and a full curve could not be measured. The observed positive cubic relationship between osmotic pressure and concentration is typical of polymer solutions; the upwards curve is considered to be due to increased polar repulsion between polymer chains, which is heightened above a critical concentration. The critical concentration is a concentration where polymer chains begin to overlap in solution. It can be determined by measuring viscosities of polymer solutions with increasing concentration. The critical concentration is the point where a viscosity vs concentration curve increases in slope.

The relationship between osmotic pressure and I-PMEI concentration is presented in FIG. 11*a*). The trend of $\pi_{air}$ vs concentration of PMEI resembles that of PEI and PEG, reported previously in C. J. Van Oss, K. Arnold, S. Ohki, R. J. Good, K. Gawrisch, Interfacial tension and the osmotic pressure of solutions of polar polymers, *J. Macromol. Sci. Part A—Chem.* 27 (1990) 563-580. doi:10.1080/00222339009349643 and B. M. Jun, T. P. N. Nguyen, S. H. Ahn, I. C. Kim, Y. N. Kwon, The application of polyethyleneimine draw solution in a combined forward osmosis/nanofiltration system, *J. Appl. Polym. Sci.* 132 (2015) 1-9. doi:10.1002/app.42198. The highest $\pi_{CO2}$ measured in this work was 67 bar at 30 wt %, which is high enough to be promising for desalination, being 2.5 times higher than the osmotic pressure of the common benchmark seawater (27 bar). Unfortunately, I-PMEI also exhibits high $\pi_{air}$ (26 bar at 30 wt. %), making it likely too energy intensive to remove from clean water by UF. On average, the $\pi_{CO2}$ is 2.5 times higher than the $\pi_{air}$ at high loadings, an insufficient ratio for industrial applications.

The highest osmotic pressure in $CO_2$ measured was with I-PMEI at 30 wt %, which had a pressure of 69 bar in $CO_2$ and 26 bar in air. This osmotic pressure in $CO_2$ surpasses that of seawater by a factor of 2.5. The best ratio of osmotic pressure in $CO_2$ and air was 15 with PDMAAm at 20 wt. %, (which exerted a pressure of 15 bar in $CO_2$ and approximately 1 bar in air). For comparison, a maximal osmotic pressure of 46 bar [converting from osmolality via the van't Hoff equation, at 20° C. as an approximation] at 40 wt. % was previously reported for poly(N,N-dimethylaminoethyl methylmethacrylate) (PDMAEMA) [Cai et al. (2013). *Chem Commun,* 49, 8377-8379, incorporated herein by reference]. The highest ratio of osmotic pressure in $CO_2$ and air was observed to be approximately 5.5 at 20 wt. % PDMAEMA. It was further noted that PDMAAm exhibits a cloud point, which could facilitate its removal after filtration, similar to PDMAEMA. The cloud point of PDMAAm is approximately 34° C. under basic conditions. PDMAAm does not exhibit a cloud point when protonated.

The relationship between osmotic pressure and b-PMEI concentration is presented in FIG. 11*b*). Branching was expected to reduce both the $\pi_{air}$ and viscosity. In fact, branched-PMEI exhibited lower $\pi_{air}$ and $\pi_{CO2}$ than I-PMEI. In addition, the $\pi_{CO2}$:$\pi_{air}$ for b-PMEI is 3.5, which is higher than that of I-PMEI. Despite the reduction, the $\pi_{air}$ remains high enough to be prohibitive for FO.

The difference in $\pi_{air}$ and $\pi_{CO2}$ between I- and b-PMEI could potentially be attributed to their different molecular weights, percent protonations, or structures. However, while the branched and linear PMEI had different molecular weights (Mw=33 and 25 kDa respectively), both polymers also had large dispersities, making the difference in molecular weights less significant. Furthermore, previous work has shown that the effect of molecular weight on osmotic pressure becomes less significant with higher molecular weights. Given that I- and b-PMEI have similar pKaH values, the difference in osmotic pressure is not likely to be due to different degrees of protonation. Rather, the difference in $\pi_{air}$ and $\pi_{CO2}$ may be attributed to differences in the polymer structures. Branching results in smaller hydrodynamic radii compared to their linear counterparts of the same molecular weight, resulting in lower $\pi_{CO2}$ and $\pi_{air}$, as proposed in C. J. Van Oss, K. Arnold, S. Ohki, R. J. Good, K. Gawrisch, Interfacial tension and the osmotic pressure of solutions of polar polymers, *J. Macromol. Sci. Part A—Chem.* 27 (1990) 563-580. doi:10.1080/00222339009349643 and A. Striolo, Osmotic second virial coefficient for linear and star poly(ethylene oxide), *Polymer* (*Guildf*). 42 (2002) 4773-4775. doi:10.1016/s0032-3861(00) 00649-2, incorporated herein by reference.

It is worth noting that the $\pi_{CO2}$ values of b-PMEI reported in this work are 20-30% lower than the osmotic pressure of protonated b-PEI reported in M. Cho, S. H. Lee, D. Lee, D. P. Chen, I. C. Kim, M. S. Diallo, Osmotically driven membrane processes: Exploring the potential of branched polyethyleneimine as draw solute using porous FO membranes with NF separation layers, *J. Memb. Sci.* 511 (2016) 278-288. doi:10.1016/j.memsci.2016.02.041 and B. M. Jun, T. P. N. Nguyen, S. H. Ahn, I. C. Kim, Y. N. Kwon, The application of polyethyleneimine draw solution in a combined forward osmosis/nanofiltration system, *J. Appl. Polym. Sci.* 132 (2015) 1-9. doi:10.1002/app.42198, incorporated herein by reference. A lower percentage of protonation would result from using a weaker acid (hydrated $CO_2$) as opposed to the HCl used in in M. Cho, S. H. Lee, D. Lee, D. P. Chen, I. C. Kim, M. S. Diallo, Osmotically driven membrane processes: Exploring the potential of branched polyethyleneimine as draw solute using porous FO membranes with NF separation layers, *J. Memb. Sci.* 511 (2016) 278-288. doi:10.1016/j.memsci.2016.02.041, incorporated herein by reference. Unlike HCl, $CO_2$ can be used to switch the polymer between the protonated and neutral states without accumulating salts, but has the disadvantages of achieving a lower degree, i.e., lower percentage of protonation of the polymeric amine.

The relationship between osmotic pressure and PDMAAm concentration is presented in FIG. 11*c*). In contrast to the previous polymers, PDMAAm has an exceptionally low $\pi_{air}$, and high $\pi_{CO2}$:$\pi_{air}$ ratio of 10 between 30-35 wt. %. The $\pi_{CO2}$:$\pi_{air}$ increases with polymer loading. At 35 wt. % PDMAAm exhibited a $\pi_{CO2}$ of 59.7 bar and a $\pi_{air}$ of 6.0 bar. Additionally, uncharged PDMAAm exhibits a cloud point at 35° C. (over 10° C. higher than the temperature of the $\pi$ measurements), which can facilitate the removal of the polymer from purified water.

The difference in the $\pi_{air}$ exhibited by PDMAAm compared to I-PMEI may be caused by the polymer's percent protonation under $CO_2$, its structure and/or its hydrophilicity. Although PDMAAm, compared to I-PMEI, has fewer protonatable nitrogen atoms per gram of polymer, the amines it contains are more basic, and consequently have a higher degree, i.e., percentage of protonation under the same pressure of $CO_2$, for example, 1 atm of $CO_2$. Differences in polymer structure may also be relevant; the nitrogen in PDMAAm is more accessible to protonation (being a pendant off the backbone) than the nitrogens in both I- and b-PMEI, which are hindered by the polymer backbone. Additionally, PDMAAm has a lower N:C ratio than PMEI (1:5 vs. 1:3 respectively) and is consequently less hydrophilic than PMEI. This decrease in polarity can be noted by the polymer's higher log P values (Table 7). This decreased hydrophilicity could lower the $\pi_{uncharged\ polymer}$, and therefore the $\pi_{air}$ of PDMAAm compared to PMEI. This illustrates the balance that must be achieved in the N:C ratio; too low a ratio may give a low $\pi_{CO2}$, but too high a ratio risks an excessively high $\pi_{air}$.

TABLE 7

| Calculated log P values† of studied polymers in their neutral form | | | |
|---|---|---|---|
| Polymer‡ | Log P | Monomer | Log P |
| PEG | −0.11 | EG | 0.59 |
| PMEI | 2.01 | MEI | 1.18 |
| PDMAAm | 5.89 | DMAAm | 2.03 |

†Log P values were calculated using ALOPGS 2.1 software.
‡Log P values calculated for a decamer with methyl end groups.

Figure 12:
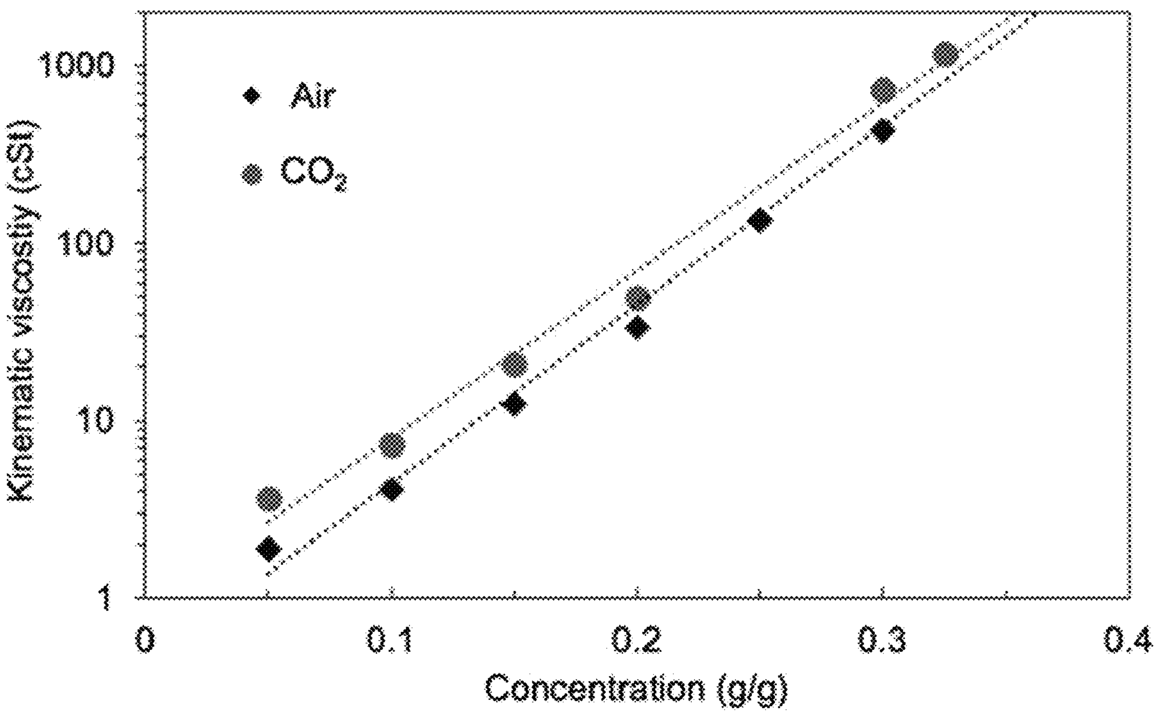
FIG. 12 shows the dependence of kinematic viscosity on the concentration of aqueous solutions of PDMAAm under air or $CO_2$ at 25° C.
Figure 13:
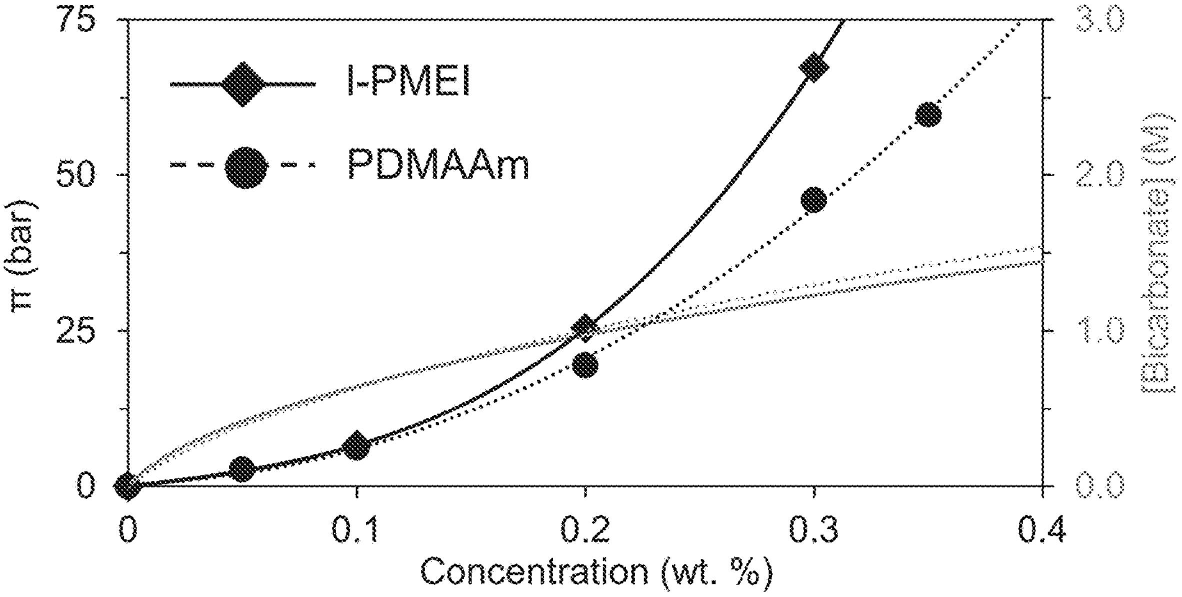
FIG. 13 shows the measured $\pi_{CO2}$ (black lines, filled circles with dotted trendline for PDMAAm, diamonds for I-PMEI) and the calculated concentration of bicarbonate in the solution (line without symbols).

One remaining limitation of PDMAAm as a draw solute is viscosity, which increases above 25 wt. % (FIG. 12). Low viscosity is a desirable property of a draw solution. High viscosities can reduce flux, increase concentration polarization, and increase the energy required to pump the draw solution through the FO apparatus.

In order for a draw solute to be practical and effective, a high $\pi_{CO2}$ is desirable. In some embodiments, the $\pi_{CO2}$ is over 15, 20, 30, 40, 50 or even 100 bar. It is worth noting that as the concentration of the polymer increases (and consequently the pH of the solution), the percent protonation of the polymer will decrease. This phenomenon is illustrated in FIG. 5 where the measured osmotic pressures of I-PMEI and PDMAAm are plotted along side the bicarbonate concentration. It is clear that as the osmotic pressure is not increasing proportionally with the bicarbonate concentration and must be therefore dominated by the protonated polymer chain.

A rudimentary estimation of $\pi_{bicarbonate}$ can be calculated from the concentration of bicarbonate present (G. N. Lewis, *J. Am. Chem. Soc.* 30 (1908) 668-683. doi:10.1021/ja01947a002), and the Lewis equation (equation 3) (A. K. Alshamrani, J. R. Vanderveen, P. G. Jessop, *Phys. Chem. Chem. Phys.* 18 (2016) 19276-19288. doi:10.1039/C6CP03302D). At all concentrations, the measured $\pi_{CO2}$ is less than the calculated $\pi_{bicarbonate}$. Intriguingly, the observed pH values of the solutions were close or equal to the predicted pH values. This indicates that, while the number of bicarbonates predicted from theory are indeed being formed, those bicarbonate anions are not producing as high a $\pi_{CO2}$ as expected. One possible explanation for this is that the bicarbonates may be engaged in intermolecular interactions, which would reduce the $\pi_{CO2}$. Examples of these interactions include strong ionic bonding between the bicarbonate and the cationic amine, bicarbonate hydrogen bonding with unprotonated amines, and bicarbonate dimerization. The latter is akin to the decreased osmotic pressure of benzoic acid in solution due to the dimerization of carboxylic acids units. Dimerization and strong ionic attraction may be similarly enhanced within the relatively non-polar environment of the polymer coil. It is expected that this effect is enhanced with polymeric amines, as the amines are fixed close together by the polymer backbone.

Dialysis

Dialysis was performed on each polymer sample to remove any residual salts. It was observed that the molecular weight cut off (MWCO) in dialysis affected osmotic pressures measured. Larger MWCO tubing removes more small chains, which is necessary to help maintain the osmotic pressure of the switchable polymer as low as possible when in the presence of air, as small molecules and oligomers can significantly contribute to the osmotic pressure in the presence of air (e.g., the absence of an ionizing trigger). Therefore, osmotic pressure in air of samples measured with three different MWCO tubings (1 kDa 3.5 kDa, and 10 kDa MWCO tubing) were found to be different. Previous work has shown that osmotic pressures in $CO_2$ will not be significantly affected by the presence of small chains, as it is overwhelmingly caused by the bicarbonate anions.

While it is considered that all chains contribute approximately equally, on a per gram basis, to osmotic pressure in the presence of an ionizing trigger such as $CO_2$, smaller chains contribute more to the osmotic pressure in the absence of an ionizing trigger, such as in air. As such, the osmotic pressure in air may be lowered by removing small chains by dialysis. Samples of PDMAAm were dialyzed with 1, 3.5, and 10 kDa MWCO dialysis tubing, and their osmotic pressures in air were measured, as shown in the table below.

TABLE 8

| MWCO/kDa | $\pi_{air,\ 20\%}$/bar |
|---|---|
| 1 | 2.5 |
| 3.5 | 1.8 |
| 10 | 0.8 |

All measurements were taken at 20 wt. % in deionized water. Dialysis time was the same for all three samples.

It was found that using a higher MWCO dialysis tubing for shorter periods of time was more effective than using smaller MWCO tubing for longer periods of time. Lower osmotic pressures with higher MWCO tubing were attributed to loss of salts and lower molecular weight chains. However, the longer samples were dialyzed with 10 kDa MWCO tubing, the more viscous they became, and took longer to dissolve in water.

Dialysis tubing contains pores of a defined size, or molecular weight cut off (MWCO). A tubing with 1 kDa MWCO will retain any materials with a molecular weight greater than 1 kDa. The higher the MWCO, the more small chains will be lost from a sample. This is also a kinetic phenomenon; the larger the pore size, the faster small molecules will diffuse out of a dialysis bag or tubing. As such, if a large MWCO tubing is used, impurities can be removed faster than if a smaller MWCO tubing is used. Further, low molecular weight chains can reduce viscosity of polymer samples. As a sample is dialyzed with a large MWCO tubing (e., 10 kDa), these low molecular weight chains are lost from the sample, and the sample can become more and more viscous.

Example 3—Osmotic Pressures of Consumables

Following the membrane osmometry/osmotic pressure measurement protocols outlined in Example 1, it was found that the osmotic pressure of maple syrup was approximately 138 bar; and, the osmotic pressure of concentrated (75%) orange juice was approximately 45 bar.

Example 4—Investigation into Osmotic Pressures and $pK_{aH}$s

Measured osmotic pressures of two switchable polymers (PDMAEMA, PDMAPMAM) with different $pK_{aH}$s were as follows:

TABLE 9

| Polymer | $pK_{aH}$ | % protonation* | Measured $\pi_{CO2}$*/bar | Theoretical $\pi_{CO2}$*/bar[1] |
|---|---|---|---|---|
| PDMAEMA | 7.4 | 44 | 11.5 | 14 |
| PDMAPMAm | 8.8 | 90 | 13.5 | 26 |

*Of a 20 wt. % solution

[1]Theoretical osmotic pressure was calculated using pKaH and base concentration to calculate theoretical number of bicarbonates present. Concentration of bicarbonates was used to calculate osmotic pressure via van't Hoff's equation. This provided a rough estimate for the osmotic pressure exerted by the bicarbonate anions.

There did not appear to be a relationship between $pK_{aH}$ and measured osmotic pressure, contrary to expectation. To investigate this further, the pH of a carbonated PDMAPMAM solution (20 wt. %) was measured and compared to a calculated, theoretical value. The measured and calculated values were close (7.5 and 7.8 respectively), indicating that the polymer was being protonated to an extent predicted from theoretical calculations. However, the measured osmotic pressure was lower than expected, based on theoretical values predicted by the Lewis Equation.

Figure 14:
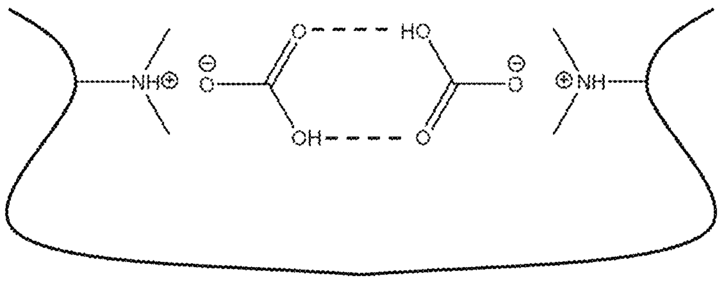
FIG. 14 shows a schematic of a switchable polymer bicarbonate exhibiting ion pairing and forming a dimer at high concentrations.

Without wishing to be bound by theory, it was considered that the observed lower osmotic pressures exhibited by the switchable polymers may have been due to ion pairing. It has been previously theorized that bicarbonates dimerize at high concentrations. Without wishing to be bound by theory, it was considered that the nature of the switchable polymers may enhance this concentration effect, as units are forced close together by the backbone (see FIG. 14). The bicarbonates dimerizing may reduce observed osmotic pressures, as they can effectively act like one species in solution rather than two.

Example 5—Concentrating of Apple Juice by FO Using PDMAAm as the Draw Solute In this experiment, 22.1 grams of apple juice was used as the feed solution and 13 grams of 33 wt % aqueous solution of ionized PDMAAm was used as the draw solution. The feed solution and the draw solution were separated by a semi-permeable membrane in the FO system of this disclosure. The solutions were left in the FO system for about 60 hours at room temperature and atmospheric pressure. This resulted in 11.7 grams of apple juice and 21.2 grams of aqueous solution of ionized PDMAAm. 8.2 grams of water is calculated to have transferred from the apple juice to the aqueous solution of ionized PDMAAm. There was no detectable polymer in the apple juice. On the other hand, there was a leakage of 2.2 grams and some fructose was detected in the aqueous solution of ionized PDMAAm. As such, the apple juice was concentrated.

Prophetic Example 1—Concentration of Apple Juice by FO Using b-PDMAAm as the Draw Solute 22.1 grams of apple juice is used as the feed solution and 13 grams of 33 wt % aqueous solution of ionized b-PDMAAm is used as the draw solution. The feed solution and the draw solution are separated by a semi-permeable membrane in the FO system of this disclosure. The solutions are left in the FO system for about 60 hours at room temperature and atmospheric pressure. This results in 11 grams of apple juice and 22 grams of aqueous solution of ionized PDMAAm. 9 grams of water is calculated to have transferred from the apple juice to the aqueous solution of ionized PDMAAm. There is no detectable polymer in the apple juice. On the other hand, there is a leakage of 2.2 grams and some fructose is detected in the aqueous solution of ionized b-PDMAAm. As such, the apple juice is concentrated.

Prophetic Example 2—Concentration of Apple Juice by FO Using PDMAPAAm as the Draw Solute 25 grams of 15 wt. % aqueous solution of ionized PDMAPAAm is used as the draw solution and 20 grams of apple juice is used as the feed solution in the FO system of this disclosure. The solutions are left in the FO system for about 40 hours at room temperature. This results in about 31 grams of diluted draw solution and 14 grams of concentrated apple juice. No polymer is detected in the concentrated apple juice.

After the concentrated apple juice is removed, the diluted draw solution is subject to agitation for about 1 hour such that $CO_2$ is removed. Water is then removed from the dilute draw solution to reduce the amount of the draw solution to about 25 grams. The resulting draw solution is then reused for FO as the draw solution.

Prophetic Example 3—Concentration of Apple Juice Using Poly(N-methylbutyleneimine) (PMBI) As the Draw Solute 25 grams of 20 wt. % aqueous solution of ionized PMBI is used as the draw solution and 20 grams of apple juice is used as the feed solution. The feed solution and the draw solution are disposed in the FO system of this disclosure, separated by a semi-permeable membrane selectively permeable to water. The solutions are left under atmospheric pressure at room temperature for 60 hours, resulting in 30 grams of diluted draw solution and 15 grams of concentrated apple juice. The diluted draw solution may be recovered as described in this disclosure.

Prophetic Example 4—Poly(N-methylpropenimine) (PMPI) As the Draw Solute 25 grams of 20 wt. % PMPI solution using the PMPI polymer as prepared in Example 1 is disposed in a draw chamber and $CO_2$ is fed into the draw chamber from a $CO_2$ source of a pressure of 5 bar. 50 g of apple juice is disposed in the feed chamber. The draw chamber and the feed chamber are separated by a semi-permeable membrane that is selectively permeable to water. After 20 hours at atmospheric pressure and room temperature, the amount of apple juice is concentrated to 34 g, while the draw solution becomes diluted, weighing 37 g. there is 4 g of leakage. No polymer is detected in the remaining apple juice. Trace amount of fructose is detected in the diluted draw solution.

The concentrated apple juice is removed. The draw chamber is subject to reduced pressure of about 20 mbar such that $CO_2$ and at least a portion of the water are removed. After 30 minutes, the dilute draw solution is disposed in a RO system and water is removed from the dilute draw solution such that the draw solution becomes about 50 g, which may be reused for concentrating apple juice with FO.

Prophetic Example 5—Concentration of Apple Juice by FO Using Poly(N,N-dimethylvinylamine) (PDMVAm)

25 grams of 20 wt. % aqueous solution of PDMVAm is used as the draw solution. $CO_2$ is bubbled through the draw solution for 30 minutes to ionize the PDMVAm. The ionized PDMVAm solution is disposed in FO system of this disclosure, separated from 20 grams of apple juice as the feed solution by a semi-permeable membrane that is selectively permeable to water. The solutions are left at atmospheric pressure and room temperature for 60 hours, resulting in 28 grams of diluted draw solution and 17 grams of concentrated apple juice. After the concentrated draw solution is removed, the diluted draw solution may be recovered as described in this disclosure.

Prophetic Example 6—Concentration of Apple Juice by FO Using pDAMAm as the Draw Solute 25 grams of 20 wt. % aqueous solution of ionized pDAMAm is used as the draw solution and 20 grams of apple juice is used as the feed solution in the FO system of this disclosure. The solutions are left under atmospheric pressure at room temperature for 60 hours, resulting in 27.5 grams of diluted draw solution and 17.5 grams of concentrated apple juice. After the concentrated apple juice is removed, the diluted draw solution may be recovered as described in this disclosure.

Prophetic Example 7—Concentration of Apple Juice by FO Using Poly(tert-butylaminoethylamino methacrylate) (P(tBAEMA)) As the Draw Solute 25 grams of 20 wt. % aqueous solution of ionized P(tBAEMA) is used as the draw solution and 20 grams of apple juice is used as the feed solution in the FO system of this disclosure. The solutions are left under atmospheric pressure and room temperature for 60 hours, resulting in 26 grams of diluted draw solution and 19 grams of concentrated apple juice. After removing the concentrated apple juice, the draw solution may be recovered as described in this disclosure.

Prophetic Example 8—Concentration of Apple Juice by FO Using Reduced-Poly(N,N-dimethylaminopropyl methacrylamide) (red-PDMAPMAm) As the Draw Solute 25 grams of 20 wt. % aqueous solution of ionized red-PDMAPMAm is used as the draw solution and 20 grams of apple juice is used as the feed solution in the FO system of this disclosure. The solutions are left under atmospheric pressure at room temperature for 60 hours, resulting in 25.5 grams of diluted draw solution and 19.5 grams of concentrated apple juice. After removal of the concentrated apple juice, the draw solution may be recovered as described in this disclosure.

Prophetic Example 9—Concentration of Apple Juice by FO Using Poly (N,N,N',N'-tetramethyl-2-butene-1,4-diamine) (PTMBD) As the Draw Solute 25 grams of 20 wt. % aqueous solution of ionized PTMBD is used as the draw solution and 20 grams of apple juice is used as the feed solution in the FO system of this disclosure. The solutions are left under atmospheric pressure at room temperature for 60 hours, resulting in 35 grams of diluted draw solution and 10 grams of concentrated apple juice. After the concentrated apple juice is removed, the draw solution may be recovered as described in this disclosure.

Prophetic Example 10—Concentration of Apple Juice by FO Using $N^1,N^{1'}$-(butane-1,4-diyl)bis($N^1$-(3-(dimethylamino) propyl)-$N^3,N^3$-dimethylpropane-1,3-diamine) (DGEN1) As the Draw Solute 25 grams of 20 wt. % aqueous solution of ionized DGEN1 is used as the draw solution and 20 grams of apple juice is used as the feed solution in the FO system of this disclosure. The solutions are left at atmospheric pressure and room temperature for 60 hours, resulting in 32 grams of diluted draw solution and 13 grams of concentrated apple juice. After the concentrated apple juice is removed, the draw solution may be recovered as described in this disclosure.

Prophetic Example 11—Concentration of Apple Juice by FO Using $N^1,N^{1'}$, $N^{1''},N^{1'''}$-((Butane-1,4-diylbis(azanetriyl))tetrakis(propane-3,1-diyl))tetrakis ($N^1$-(3 (dimethylamino)propyl)-$N^3,N^3$-dimethylpropane-1,3-diamine) (DGEN2) As the Draw Solute 25 grams of 20 wt. % aqueous solution of ionized DGEN2 is used as the draw solution and 20 grams of apple juice is used as the feed solution in the FO system of this disclosure. The solutions are left under atmospheric pressure at room temperature for 60 hours, resulting in 37 grams of diluted draw solution and 8 grams of concentrated apple juice. After the concentrated apple juice is removed, the draw solution may be recovered as described in this disclosure.

In the preceding description, for purposes of explanation, numerous details are set forth in order to provide a thorough understanding of the embodiments. However, it will be apparent to one skilled in the art that these specific details are not required. The above-described embodiments are intended to be examples only. Alterations, modifications and variations can be effected to the particular embodiments by those of skill in the art. The scope of the claims should not be limited by the particular embodiments set forth herein, but should be construed in a manner consistent with the specification as a whole. All patents, patent applications, journal articles, publications, etc. that are referred to throughout this disclosure are explicitly incorporated herein in their entireties.

What is claimed is:

1. A process of forming a treated switchable polymer, comprising:

providing a switchable polymer that is switchable between a first form and a second form, the switchable polymer comprising switchable moieties, each switchable moiety being switchable between a neutral form associated with the first form of the switchable polymer, and an ionized form associated with the second form of the switchable polymer, the switchable polymer:

having ≥3 mmol switchable moieties per gram of switchable polymer, having a $pK_aH$ of about 7 to about 14, and being resistant to hydrolysis; and treating the switchable polymer to remove non-polymeric and oligomeric contaminants to form the treated switchable polymer;

the treated switchable polymer is switchable between a third form and a fourth form, the neutral form of each switchable moiety being associated with the third form of the treated switchable polymer, and the ionized form of each switchable moiety being associated with the fourth form of the treated switchable polymer, the third form of the treated switchable polymer having a first osmotic pressure in aqueous solution, and the fourth form of the treated switchable polymer having a second osmotic pressure in aqueous solution, the ratio of the second osmotic pressure to first osmotic pressure being at least 6:1;

the treated switchable polymer being substantially water soluble in the fourth form;

wherein the switchable polymer is poly(N-methyl-N,N-diallylamine) (PDMAAm), poly(N-methylpropenimine) (PMPI), poly(diallylmethylamine) (PDAMAm), poly(N-[3-(dimethylamino)propyl]-methacrylamide), poly(N,N-dimethylallylamine) (PDMAPMAm), poly (1,4-bis(dimethylamino)-2-butene), poly(N,N-di(N',N'-dimethylbutylamine)allylamine), poly(N,N,N',N'-tetramethyl-1,2-ethylenediamine), poly(N-methylbutyleneimine), poly(N-tertbutylallylamine), or a copolymer thereof.

2. The process of claim 1, further comprising preparing the switchable polymer by a controlled polymerization method.

3. The process of claim 1, wherein the switchable polymer has about 3 mmol to about 18 mmol of switchable moieties per gram of switchable polymer; or, about 5.5 mmol to about 18 mmol of switchable moieties per gram of switchable polymer.

4. The process of claim 1, wherein the switchable polymer is resistant to hydrolysis by not comprising a hydrolysable moiety, wherein (i) the hydrolysable moiety includes acid chlorides, carbonate esters, epoxides, or imines; or (ii) the hydrolysable moiety includes esters, amidines, or guanidines.

5. The process of claim 1, wherein the fourth form of the treated switchable polymer has a viscosity in aqueous solution of about 1 cP to about 100 cP; or about 20 cP to about 100 cP.

6. The process of claim 1, wherein the switchable polymer switches to or is maintained in the second form when the switchable moieties are exposed to $CO_2$ at an amount sufficient to maintain the switchable moieties in the ionized form, and wherein the switchable polymer switches to or is maintained in the first form when $CO_2$ is removed or reduced to an amount insufficient to maintain the switchable moieties in the ionized form.

7. The process of claim 1, wherein the treated switchable polymer switches to or is maintained in the fourth form when the switchable moieties are exposed to $CO_2$ at an amount sufficient to maintain the switchable moieties in the ionized form, and wherein the treated switchable polymer switches to or is maintained in the third form when $CO_2$ is removed or reduced to an amount insufficient to maintain the switchable moieties in the ionized form.

8. The process of claim 1, wherein the ratio of the second osmotic pressure to first osmotic pressure being at least 10:1; or, about 15:1; or, at least 15:1.

9. The process of claim 1, wherein the switchable polymer is poly(N-methyl-N,N-diallylamine) (PDMAAm).

10. The process of claim 1, wherein the switchable polymer is poly(N-methylpropenimine) (PMPI).

11. The process of claim 1, wherein the switchable polymer is poly(diallylmethylamine) (PDAMAm).

12. The process of claim 1, wherein the switchable polymer is poly(N-[3-(dimethylamino) propyl]-methacrylamide).

13. The process of claim 1, wherein the switchable polymer is poly(N,N-dimethylallylamine) (PDMAPMAm).

14. The process of claim 1, wherein the switchable polymer is poly(1,4-bis(dimethylamino)-2-butene).

15. The process of claim 1, wherein the switchable polymer is poly(N,N-di(N',N'-dimethylbutylamine) allylamine).

16. The process of claim 1, wherein the switchable polymer is poly(N,N,N',N'-tetramethyl-1,2-ethylenediamine).

17. The process of claim 1, wherein the switchable polymer is poly(N-methylbutyleneimine).

18. The process of claim 1, wherein the switchable polymer is poly(N-tertbutylallylamine).

* * * * *